US012801754B2

(12) United States Patent
Panwar et al.

(10) Patent No.: US 12,801,754 B2
(45) Date of Patent: Nov. 17, 2026

(54) INSTANCE HEARTBEAT

(71) Applicant: Oracle International Corporation, Redwood Shores, CA (US)

(72) Inventors: Kanishk Panwar, Seattle, WA (US); Swagnik Mitra, Austin, TX (US); Sneha Pathrose, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 308 days.

(21) Appl. No.: 18/633,074

(22) Filed: Apr. 11, 2024

(65) Prior Publication Data

US 2025/0322077 A1 Oct. 16, 2025

(51) Int. Cl.

*G06F 21/57* (2013.01)
*G06F 21/55* (2013.01)
*H04L 41/046* (2022.01)
*H04L 43/06* (2022.01)

(52) U.S. Cl.

CPC .......... *G06F 21/577* (2013.01); *G06F 21/552* (2013.01); *H04L 41/046* (2013.01); *H04L 43/06* (2013.01)

(58) Field of Classification Search

CPC ...... G06F 21/577; G06F 21/552; G06F 21/57; G06F 21/55; H04L 41/046; H04L 43/06; H04L 41/46
USPC .......................................................... 709/224
See application file for complete search history.

(56) References Cited

U.S. PATENT DOCUMENTS

| | | | | |
|---|---|---|---|---|
| 7,181,743 | B2 * | 2/2007 | Werme | H04L 67/1008 709/219 |
| 9,559,904 | B2 * | 1/2017 | Billore | H04L 41/0816 |
| 10,761,870 | B2 * | 9/2020 | Hassine | G06F 11/30 |
| 10,761,875 | B1 * | 9/2020 | Burgin | G06F 9/485 |
| 10,896,104 | B2 * | 1/2021 | Sanakkayala | G06F 11/0757 |
| 11,301,280 | B2 * | 4/2022 | Kandula | G06F 9/45558 |
| 12,260,208 | B2 * | 3/2025 | Caine | G06F 8/65 |
| 12,407,560 | B1 * | 9/2025 | Panwar | G06F 8/61 |
| 2014/0025759 | A1 * | 1/2014 | Miller | G06Q 10/107 709/206 |

(Continued)

OTHER PUBLICATIONS

U.S. Appl. No. 18/633,056, titled “Agent Management in a Cloud Environment”, filed Apr. 11, 2024.

*Primary Examiner* — Sargon N Nano
(74) *Attorney, Agent, or Firm* — Mughal Gaudry & Franklin PC

(57) ABSTRACT

A method for monitoring a plurality agents operating within a plurality compute instances of a tenancy of a cloud environment is disclosed. The method includes receiving a plurality of messages from each of the plurality of agents operating within the plurality of compute instances. The method further includes updating a table that identifies the plurality of agents and the corresponding plurality of compute instances; and reading a list of compute instances, wherein each compute instance on the list is enabled to have an agent installed therewithin. The method further includes comparing the plurality of compute instances within the table against the list of compute instances. The method further includes determining, based on the comparing, that a compute instance within the list of compute instances is missing in the plurality of compute instances of the table; and transmitting a request to reinstall or install an agent within the compute instance.

20 Claims, 21 Drawing Sheets

(56) References Cited

U.S. PATENT DOCUMENTS

| | | | | |
|---|---|---|---|---|
| 2017/0083358 | A1* | 3/2017 | Zada | G06F 11/30 |
| 2018/0095855 | A1* | 4/2018 | Sanakkayala | G06F 11/0757 |
| 2019/0190771 | A1* | 6/2019 | Fang | H04L 41/40 |
| 2020/0341835 | A1* | 10/2020 | Chopra | G06F 11/1464 |
| 2020/0344135 | A1* | 10/2020 | Guo | G06F 9/45558 |
| 2022/0197623 | A1* | 6/2022 | Nadin Pinheiro | G06F 8/61 |
| 2023/0011241 | A1* | 1/2023 | Vavrick | G06F 9/445 |
| 2024/0111513 | A1* | 4/2024 | Caine | G06F 9/452 |

* cited by examiner

Agent inventory information 150

Identification of deployable versions of Agent 116a

1. Platform type 206a (for OS 170a) of agent 116a
   - version 204aa1 at memory location 158a-aa1, version 204aa2 at memory location 158a-aa2

2. Platform type 206b (for OS 170b) of agent 116a
   - version 204ab1 at memory location 158b-ab1, version 204ab2 at memory location 158b-ab1)

3. Platform type 206c (for OS 170c) of agent 116a
   - version 204ac1 at memory location 158c-ac1

Identification of deployable versions of Agent 116b

1. Platform type 206a (for OS 170a) of agent 116b
   - version 204ba1 at memory location 158a-ba1

2. Platform type 206b (for OS 170b) of agent 116b
   - version 204bb1 at memory location 158b-bb1, version 204bb2 at memory location 158b-bb2

3. Platform type 206c (for OS 170c) of agent 116b
   - version 204bc1 at memory location 158c-bc1

. . .

Identification of deployable versions of Agent 116n

1. Platform type 206a (for OS 170a) of agent 116n
   - version 204na1 at memory location 158a-na1

2. Platform type 206b (for OS 170b) of agent 116n
   - version 204nb1 at memory location 158b-nb1

3. Platform type 206c (for OS 170c) of agent 116n
   - version 204nc1 at memory location 158c-nc1

FIG. 2

Table 1052

| Agent ID | Agent platform type and version | Instance ID | Compartment ID | Tenancy ID | Timestamp for most recent message received from an agent |
|---|---|---|---|---|---|
| Agent-ID_1012a | Platform type 1206a, version 2.5 | Instance-ID_1008a | Comp_ID_x | Tenancy_ID_1004 | 18:05 AM, 3/14/2024 |
| Agent-ID_1012b | Platform type 1206a, version 2.5 | Instance-ID_1008b | Comp_ID_x | Tenancy_ID_1004 | 10:05 AM, 3/15/2024 |
| Agent-ID_1012c | Platform type 1206b, version 2.0 | Instance-ID_1008c | Comp_ID_x | Tenancy_ID_1004 | 10:23 AM, 3/15/2024 |
| | | | | . . . | |
| Agent-ID_1012p | Platform type 1206a, version 2.0 | Instance-ID_1008p | Comp_ID_y | Tenancy_ID_1004 | 10:03 AM, 3/15/2024 |

Current date and time: 11:30 AM, 3/15/2024

FIG. 12

List 1060 of enabled instances

| Instance ID | Compartment ID | Tenancy ID | Instance creation timestamp |
|---|---|---|---|
| Instance-ID_1008a | Comp_ID_x | Tenancy_ID_1004 | 4:45 PM, 3/14/2024 |
| Instance-ID_1008b | Comp_ID_x | Tenancy_ID_1004 | 5:05 PM, 1/12/2023 |
| Instance-ID_1008c | Comp_ID_x | Tenancy_ID_1004 | 5:05 PM, 1/12/2023 |
| | | . . . | |
| Instance-ID_1008p | Comp_ID_y | Tenancy_ID_1004 | 6:07 PM, 6/2/2023 |
| Instance-ID_1008q | Comp_ID_y | Tenancy_ID_1004 | 5:15 PM, 3/13/2024 |

Current date and time: 11:30 AM, 3/15/2024

FIG. 13

Instance status report 1078 for agent installation
Details of enabled instance(s) from which no message has been received (agent either not installed, or not operational as intended)

| Instance ID | Compartment ID | Tenancy ID | Instance creation timestamp |
| --- | --- | --- | --- |
| Instance-ID_1008q | Comp_ID_y | Tenancy_ID_1004 | 5:15 PM, 3/13/2024 |

Report generation timestamp: 11:30 AM, 3/15/2024

FIG. 14

Instance status report 1080 for agent operation
Details of enabled instance(s) from which no message has been received in the last 24 hours

| Agent ID | Instance ID | Compartment ID | Tenancy ID | Last message received timestamp | Time of report generation | Time elapsed from last received message |
| --- | --- | --- | --- | --- | --- | --- |
| Agent-ID_1012a | Instance-ID_1008a | Comp_ID_x | Tenancy_ID_1004 | 18:05 AM, 3/14/2024 | 11:30 AM, 3/15/2024 | 26 hours, 25 minutes |

Report generation timestamp: 11:30 AM, 3/15/2024

FIG. 15

Agent inventory information 1050

| Agent type | Agent platform type | Acceptable agent versions |
| --- | --- | --- |
| Agent 1012 | Platform type 1206a | version 2.5, version 3.0 |
| Agent 1012 | Platform type 1206b | version 3.0 |
| Agent 1012 | Platform type 1206c | version 3.0 |

FIG. 16

Agent version status report 1082 identifying agents that need updating

| Agent ID | Installed agent platform type and version | Instance ID | Compartment ID | Tenancy ID | Acceptable agent platform type and versions | Memory location(s) from where agent object(s) corresponding to the acceptable version(s) are retrievable |
| --- | --- | --- | --- | --- | --- | --- |
| Agent-ID_1012c | Platform type 1206b, version 2.0 | Instance-ID_1008c | Comp_ID_x | Tenancy_ID_1004 | Platform type 1206b, version 3.0 | Memory location xxx |

Current date and time: 11:30 AM, 3/15/2024

FIG. 17

INSTANCE HEARTBEAT

BACKGROUND

A cloud provider provides on-demand, scalable computing resources (e.g., a cloud environment) to its cloud customers. Cloud customers generally desire to run their cloud resources without monitoring, scanning, or other interference by the cloud provider. Therefore, the cloud provider offers "tenancies" to its cloud customers. A tenancy is an isolated partition within the cloud environment, such that resources in different tenancies are isolated from each other unless explicitly shared. Each tenancy runs a plurality of virtual machine compute instances.

However, cloud customers desire visibility into their cloud infrastructure in order to maintain a strong security posture. Further, the cloud provider needs visibility into the cloud customers' cloud infrastructure in order to maintain a strong security posture. For example, there is a need for compute instance, host, and/or container monitoring (visibility into running processes and configurations), system integrity protection (ensuring only trusted packages are running), behavioral monitoring (generating alerts on unexpected or suspicious actions), and optional anti-malware protection/scanning at runtime.

In order to gain such visibility into customer-owned compute instances, provider-owned agents, and even third party owned agents, are installed on customer-owned compute instances to facilitate tracking. Various such agents may be installed in each virtual machine compute instance within the customer tenancy. Such agents have to be installed, periodically updated, and uninstalled, if needed, in multiple such compute instances within the customer tenancy. Managing the life cycle of all such agents, including installing, updating, and/or uninstalling, is a non-trivial task.

In an example, for security purposes, cloud provider-owned services may want to participate (such as control or at least monitor) in the agent lifecycle management. Yet, the cloud provider has limited access to the customer-owned compute instances in the customer-owned tenancies on which these agents are installed.

BRIEF SUMMARY

A method for managing agents in a cloud environment is disclosed. The method includes receiving a first request and a second request for agent inventory information. In an example, the first request and the second request are received by an agent management service in a first tenancy of a cloud environment, the first request is received from a first compute instance in a second tenancy of the cloud environment, the second request is received from a second compute instance in the second tenancy of the cloud environment, and the cloud environment comprises one or more cloud computing resources. In an example, the method further includes transmitting the agent inventory information to the first compute instance and the second compute instance, wherein the agent inventory information identifies a plurality of platform types of an agent that are available for deployment. In an example, the method further includes receiving a third request from the first compute instance and for a first agent object of a first platform type from the plurality of platform types of the agent that are available for deployment. In an example, the method further includes receiving a fourth request from the second compute instance and for a second agent object of a second platform type from the plurality of platform types of the agent that are available for deployment; transmitting the first agent object to the first compute instance; and transmitting the second agent object to the second compute instance.

In an example, a platform type of the plurality of platform types comprises one or more of a type of operating system or a type of hardware architecture. In an example, the first platform type and the second platform type are different; and the first compute instance is associated with the first platform type and the second compute instance is associated with the second platform type.

In an example, the agent inventory information further identifies a respective one or more versions of the agent for each of the plurality of platform types of the agents; the third request is for the first agent object that is a most recent version of the agent of the first platform type; and the fourth request is for the second agent object that is a most recent version of the agent of the second platform type.

In an example, the first platform type and the second platform type are same; the agent inventory information further identifies a plurality of versions of the agent for the first platform type; and the third request is for the first agent object that is a first version of the agent of the first platform type; and the fourth request is for the second agent object that is a second version of the agent of the first platform type.

In an example, the agent inventory information further identifies a second plurality of platform types of a second agent that are available for deployment; and the method further includes receiving a fifth request from a third compute instance and for a third agent object of a third platform type from the second plurality of platform types of the second agent that are available for deployment.

In an example, the method further includes receiving a fifth request for agent inventory information, wherein the fifth request is received by the agent management service in the first tenancy, and the fifth request is received from a third compute instance in a third tenancy of the cloud environment.

In an example, the first request and the third request are received from a plugin executing on the first compute instance, and the second request and the fourth request are received from the plugin executing on the second compute instance. In an example, the third request and the fourth request are received by an object storage service different than the agent management service, and wherein the first request and the second request are received by a data plane of the agent management service. In an example, the first agent object comprises code corresponding to the first platform type of the agent.

In an example, the agent inventory information further identifies a respective memory location within a data repository from where agent objects associated the plurality of platform types of the agent are retrievable, and the third request includes identification of a first memory location for retrieving the first agent object, and the fourth request includes identification of a second memory location for retrieving the first agent object.

In an example, the method further includes receiving a third agent object corresponding to a third platform type; receiving information identifying a set of one or more attributes of the third agent object; storing the third agent object in a data repository from where the third agent object is retrievable; and updating the agent inventory information based on the set of one or more attributes.

In an example, agent objects of different platform types are stored in different buckets of a data repository, and the third request is for the first agent object from a first bucket of the data repository, and the fourth request is for the second agent object from a second bucket of the data repository.

In an example, the method further includes receiving a token associated with the first request, wherein transmitting the agent inventory information to the first compute instance is responsive at least to verifying the token. In an example, the method further includes receiving a token request from the first compute instance; determining (i) whether the second tenancy comprising the first compute instance is associated with the agent management service, and/or (ii) whether a compartment within the second tenancy is associated with the agent management service, wherein the compartment includes the first compute instance; and responsive to determining that the second tenancy and/or the compartment are associated with the agent management service, granting the token to the first compute instance.

Also disclosed is a non-transitory computer-readable medium including instructions that when executed by one or more processors, cause the one or more processors to perform operations including: transmitting a first request for agent inventory information to an agent management service in a first tenancy in a cloud environment, wherein the first request is transmitted by a compute instance in a second tenancy of the cloud environment; receiving the agent inventory information by the compute instance, wherein the agent inventory information identifies a plurality of platform types of an agent that are available for deployment; identifying runtime information of the compute instance, the runtime information including a first platform type of the first compute instance; transmitting a third request for a first agent object of the first platform type from the plurality of platform types of the agent that are available for deployment; receiving the first agent object; and installing the first agent object.

In an example, the operations further include subsequent to receiving the first agent object, fetching license information for installing the first agent object, where the first agent object is installed based on the license information. In an example, the agent inventory information further identifies a respective one or more versions of the agent for each of the plurality of platform types of the agents.

Also disclosed is a system for managing agents in a cloud environment. In an example, the system includes one or more processors; a first storage repository for storing agent inventory information; a second storage repository for storing a first agent object and a second agent object; and one or more non-transitory computer-readable media storing instructions, which, when executed by the system, cause the system to perform a set of actions including: receiving a first request and a second request for the agent inventory information, wherein: the first request and the second request are received by an agent management service in a first tenancy of a cloud environment, the first request is received from a first compute instance in a second tenancy of the cloud environment, the second request is received from a second compute instance in the second tenancy of the cloud environment, and the cloud environment comprises one or more cloud computing resources. In an example, the set of actions further includes transmitting the agent inventory information to the first compute instance and the second compute instance, wherein the agent inventory information identifies a plurality of platform types of an agent that are available for deployment; receiving a third request from the first compute instance and for the first agent object of a first platform type from the plurality of platform types of the agent that are available for deployment; receiving a fourth request from the second compute instance and for the second agent object of a second platform type from the plurality of platform types of the agent that are available for deployment; transmitting the first agent object to the first compute instance; and transmitting the second agent object to the second compute instance. In an example, the first agent object comprises code corresponding to the first platform type of the agent, and the second agent object comprises code corresponding to the second platform type of the agent.

Further disclosed is a method for monitoring of a plurality agents operating within a plurality compute instances of a tenancy of a cloud environment. In an example, the method includes receiving a plurality of messages from each of the plurality of agents operating within the plurality of compute instances of the cloud environment; updating a table that identifies the plurality of agents and the corresponding plurality of compute instances, wherein the updating is done when any of a plurality of messages is received from any of the plurality of agents; reading a list of compute instances, wherein each compute instance on the list of compute instances is enabled to have an agent installed therewithin; comparing the plurality of compute instances within the table against the list of compute instances, to determine whether each compute instance within the list of compute instances is also included in the plurality of compute instances of the table; determining that a compute instance within the list of compute instances is missing in the plurality of compute instances of the table; and transmitting a request to reinstall or install an agent within the compute instance.

In an example, the method further includes generating a report indicating that the compute instance is enabled to have the agent installed, without the agent being installed within the compute instance or without the agent being operational as intended. In an example, each of the plurality of agents is configured to perform queries respectively on each of the compute instances, and to send query results to a data plane for determining whether the query results are associated with anomalous characteristics. In an example, the compute instance is a first compute instance, and the agent is a first agent; the plurality of messages includes a message received from a second agent operating within a second compute instance; and the message includes security related information associated with the second compute instance, which is generated based on the second agent monitoring an operation of the second compute instance.

In an example, the plurality of compute instances are managed by a cloud customer, and transmitting the request to reinstall or install the agent is performed by a security assurance administrator. In an example, the security assurance administrator is a provider of the cloud environment.

In an example, the list is a first list, and the method further includes reading a second list that identifies a plurality of cloud resources of the cloud environment; filtering the plurality of cloud resources identified in the second list, to identify a subset of the plurality of cloud resources that are enabled to have the agent installed; and updating the first list of compute instances with the identified subset of the plurality of cloud resources.

In an example, the method further includes receiving an identification of a compartment of the tenancy, wherein the compartment includes one or more of compute instances; determining that the compartment is enabled for agent installation; and updating the list of compute instances to include the one or more compute instances of the compartment.

In an example, the compute instance is a first compute instance; a message of the plurality of messages is received from a second agent operating within a second compute instance; and the message of the plurality of messages includes one or more of (i) a type of the second agent, (ii) an identifier of the second agent, (iii) a version of the second agent, and (iv) an identifier of the second compute instance within which the second agent is operating.

In an example, the method further includes maintaining a timestamp for each message of the plurality of received messages. In an example, the compute instance is a first compute instance, wherein the agent is a first agent, and wherein the method further includes reading a timestamp of a most recent message received from a second agent operating within a second compute instance of the plurality of compute instances; determining a time difference between (i) a current time and (ii) a time indicated by the timestamp; and in response to the time difference exceeding a threshold duration of time, generating a report indicating that no message has been received from the second agent operating within the second compute instance for at least the threshold duration of time. In an example, the method further includes transmitting a request to reinstall or update the second agent within the second compute instance. In an example, the timestamp is a first timestamp, the time difference is a first time difference, the threshold duration of time is a first threshold duration of time, and wherein the method further includes reading a second timestamp of a most recent message received from a third agent operating within the second compute instance of the plurality of compute instances; determining a second time difference between (i) the current time and (ii) a time indicated by the second timestamp; and in response to the second time difference exceeding a second threshold duration of time, generating a report indicating that no message has been received from the third agent operating within the second compute instance for at least the second threshold duration of time. In an example, the first threshold duration of time is different from the second threshold duration of time. In an example, the second agent is configured to transmit a stream of messages, such that two consecutive messages from the second agent is configured to have a first time gap; the third agent is configured to transmit another stream of messages, such that two consecutive messages from the third agent is configured to have a second time gap; the first time gap is less than the second time gap; and the first threshold duration of time is less than the second threshold duration of time, responsive at least in part to the first time gap being less than the second time gap.

In an example, the compute instance is a first compute instance, and wherein the method further includes reading a message of the plurality of messages that is from a second agent operating within a second compute instance; determining an installed version number of the second agent within a second compute instance, based at least in part on reading the message; comparing the installed version number of the second agent with one or more acceptable version numbers for the second agent; determining that the installed version number of the second agent is not within the one or more of acceptable version numbers for the second agent; generating a report indicating that the second agent operating within the second compute instance has to be updated; and transmitting a request to update the second agent operating within the second compute instance to one of the one or more of acceptable version numbers for the second agent.

In an example, comparing the installed version number of the second agent with the one or more of acceptable version numbers for the second agent includes reading an agent inventory information that identifies at least one acceptable version number of the second agent for each of a plurality of platform types; determining that the second compute instance has a first platform type, based at least in part on reading the message, wherein the agent inventory information identifies the one or more acceptable version numbers for the first platform type of the second agent; identifying the one or more acceptable version numbers of the first platform type for the second agent from the agent inventory information; and using the identified one or more acceptable version numbers of the second platform type for the second agent for the comparison.

Also disclosed is a non-transitory computer-readable medium including instructions that when executed by one or more processors, cause the one or more processors to perform operations including: receiving a plurality of messages from each of a plurality of agents operating within a plurality of compute instances of a cloud environment; updating a table that identifies the plurality of agents and the corresponding plurality of compute instances, wherein the updating is done when any of a plurality of messages is received from any of the plurality of agents; reading a list of compute instances, wherein each compute instance on the list of compute instances is enabled to have an agent installed therewithin; comparing the plurality of compute instances within the table against the list of compute instances, to determine whether each compute instance within the list of compute instances is also included in the plurality of compute instances of the table; determining that a compute instance within the list of compute instances is missing in the plurality of compute instances of the table; and transmitting a request to reinstall or install an agent within the compute instance. In an example, each of the plurality of agents is configured to perform queries respectively on each of the compute instances, and to send query results to a data plane for determining whether the query results are associated with anomalous characteristics.

Further disclosed is a system for monitoring of a plurality agents operating within a plurality compute instances of a tenancy of a cloud environment. In an example, the system includes one or more processors; a storage repository for storing a list of compute instances; and one or more non-transitory computer-readable media storing instructions, which, when executed by the system, cause the system to perform a set of actions including: receiving a plurality of messages from each of the plurality of agents operating within the plurality of compute instances of the cloud environment; updating a table that identifies the plurality of agents and the corresponding plurality of compute instances, wherein the updating is done when any of a plurality of messages is received from any of the plurality of agents; reading the list of compute instances from the storage repository, wherein each compute instance on the list of compute instances is enabled to have an agent installed therewithin; comparing the plurality of compute instances within the table against the list of compute instances, to determine whether each compute instance within the list of compute instances is also included in the plurality of compute instances of the table; determining that a compute instance within the list of compute instances is missing in the plurality of compute instances of the table; and transmitting a request to reinstall or install an agent within the compute instance. In an example, the set of actions further includes: receiving an identification of a compartment of the tenancy, wherein the compartment includes one or more of compute instances; determining that the compartment is enabled for agent installation; and updating the list of compute instances to include the one or more compute instances of the compartment.

Also disclosed in another method for monitoring an agent operating within a compute instance of a cloud environment. In an example, the method includes receiving one or more of messages from the agent operating within the compute instance of the cloud environment; updating a table that identifies a timestamp of a most recent message of the one or more messages received from the agent; determining a time difference between (i) a current time and (ii) a time indicated by the timestamp of the most recent message received from the agent; and in response to the time difference exceeding a threshold duration of time, transmitting a request to reinstall or update the agent within the compute instance.

In an example, the agent is a first agent, the one or more of messages is a first one or more of messages, the timestamp is a first timestamp, the time difference is a first time difference, the threshold duration of time is a first threshold duration of time, and wherein the method further includes receiving a second one or more of messages from a second agent operating within the compute instance; updating the table that identifies a second timestamp of a most recent message of the second one or more messages received from the second agent; determining a second time difference between (i) the current time and (ii) a time indicated by the second timestamp of the most recent one of the second one or more messages received from the second agent; and in response to the second time difference exceeding a second threshold duration of time, transmitting another request to reinstall or update the second agent within the compute instance. In an example, the first threshold duration of time is different from the second threshold duration of time. In an example, the first agent is configured to transmit a stream of messages, such that two consecutive messages from the first agent is configured to have a first time gap; the second agent is configured to transmit another stream of messages, such that two consecutive messages from the second agent is configured to have a second time gap; the first time gap is less than the second time gap; and the first threshold duration of time is less than the second threshold duration of time, responsive at least in part to the first time gap being less than the second time gap.

In an example, each message of the one or more messages includes one or more of (i) a type of the agent, (ii) an identifier of the agent, (iii) a version of the agent, and (iv) an identifier of the compute instance within which the agent is operating. In an example, the method includes generating a report indicating that the agent within the compute instance has not sent any message for at least the threshold duration of time. In an example, the agent is configured to perform queries on the compute instance, and to send query results to a data plane for determining whether the query results are associated with anomalous characteristics. In an example, the one or more messages includes security related information associated with the compute instance, which is generated based on the agent monitoring an operation of the compute instance.

In an example, the compute instance is managed by a cloud customer, and transmitting the request to reinstall or update the agent is performed by a security assurance administrator. In an example, the security assurance administrator is a provider of the cloud environment.

Also disclosed is a method for monitoring an agent operating within a compute instance of a cloud environment. In an example, the method includes receiving one or more messages from the agent operating within the compute instance, wherein at least one of the one or more messages identifies an installed version number of the agent; determining the installed version number of the agent, based at least in part on one or more messages; comparing the installed version number of the agent with one or more acceptable version numbers of the agent; determining that the installed version number of the agent is not within the one or more of acceptable version numbers of the agent; and transmitting a request to update the agent operating within the compute instance to one of the one or more of acceptable version numbers of the agent.

In an example, comparing the installed version number of the agent with the one or more of acceptable version numbers of the agent includes reading an agent inventory information that identifies one or more acceptable version number of the agent; and using the identified one or more acceptable version numbers of the agent for the comparison.

In an example, comparing the installed version number of the agent with the one or more of acceptable version numbers of the agent includes reading an agent inventory information that identifies at least one acceptable version number of the agent for each of a plurality of platform types; determining that the compute instance has a first platform type, wherein at least one of the one or more messages identifies the first platform type of the compute instance, and wherein the agent inventory information identifies the one or more acceptable version numbers for the first platform type of the agent; identifying the one or more acceptable version numbers of the first platform type of the agent from the agent inventory information; and using the identified one or more acceptable version numbers of the platform type for the agent for the comparison. In an example, a platform type of the plurality of platform types comprises one or more of a type of operating system or a type of hardware architecture.

In an example, the request to update the agent operating within the compute instance to one of the one or more of acceptable version numbers of the agent includes an identification of a memory location, wherein an agent object for one of the one or more of acceptable version numbers of the agent is retrievable from the identified memory location.

In an example, the compute instance is within a first tenancy of the cloud environment; and the request to update the agent operating within the compute instance is transmitted from a second tenancy of the cloud environment, the second tenancy being different from the first tenancy. In an example, the compute instance is within a first tenancy managed by a cloud customer; and the request to update the agent operating within the compute instance is transmitted from a service tenancy managed by a security assurance administrator. In an example, the security assurance administrator is a provider of the cloud environment.

In an example, the method includes generating a report indicating that the agent operating within the compute instance needs updating. In an example, the agent is configured to perform queries on the compute instance, and to send query results to a data plane for determining whether the query results are associated with anomalous characteristics.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 2 illustrates example agent inventory information for managing various agents being executed within a plurality of compute instances of a customer tenancy.

FIG. 12 illustrates an example instance information table that is updated by a data plane within a service tenancy, based on receiving messages from a plurality of agents operating with a corresponding plurality of compute instances in a customer tenancy.

FIG. 13 illustrates a list of currently enabled compute instances within a cloud environment.

FIG. 14 illustrates an instance status report for agent installation, as generated by an agent monitoring service of a service tenancy.

FIG. 15 illustrates an instance status report for agent operations, in which one or more compute instances are identified, wherein no messages have been received by a data plane from agents operating within the identified compute instances for at least a threshold period of time.

FIG. 16 illustrates an example agent inventory information that is read by an agent monitoring service within a service tenancy.

FIG. 17 illustrates an agent version status report generated by an agent monitoring service, wherein the agent version status report identifies zero, one, or more agents within corresponding compute instances that need updating.

DETAILED DESCRIPTION

Agent Management in Cloud Environment

Figure 1A:
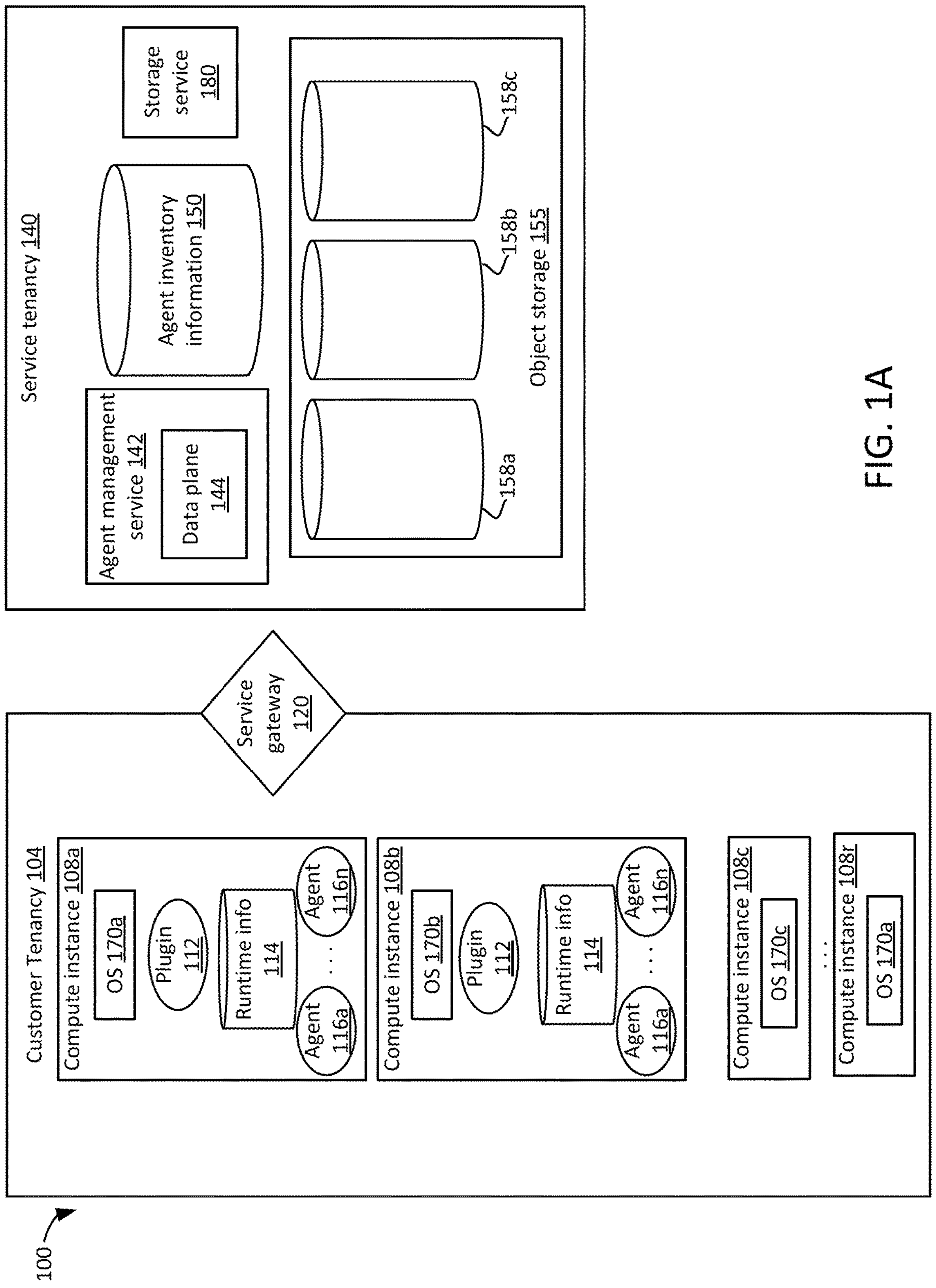
FIG. 1A illustrates a block diagram of a cloud environment in which management (such as installation, updating, and/or uninstallation) of agents within compute instances of a customer tenancy of the cloud environment is performed at least in part using an agent inventory information provided by an agent management service in a service tenancy.

A cloud environment includes one or more customer tenancies and at least one a service tenancy. As described above, a tenancy is an isolated partition within the cloud environment, such that resources in different tenancies are isolated from each other unless explicitly shared. Each tenancy runs a plurality of virtual machine compute instances. A customer tenancy is rented out to a cloud customer, and the service tenancy is used by the provider of the cloud environment to provide one or more services to one or more customer tenancies. In an example, an agent management service in a provider-owned service tenancy, along with a plugin installed in individual customer compute instances within a customer tenancy, manage the life cycle of one or more software agents operating on the customer compute instances. The software agents (also referred to herein as agents) operating on the customer compute instances may include one or more provider-owned agents, and may also include one or more third-party agents.

The plugin executes within individual customer-owned compute instances. In an example, the plugin is developed and owned by the cloud provider. For some compute instances, the plugin may be installed as a part of the host image for the compute instances. For some other compute instances, the plugin may be installed via a script. The plugin is also referred to as a "unified agent manager," as the plugin within a compute instance manages the lifecycle of one or more agents operating within the compute instance.

In an example, each compute instance executes one of a plurality of OSs, and is thus associate with a corresponding platform type of a plurality of platform types. Merely as an example, a first compute instance may execute a Windows® operating system configured to run on a Windows® platform, and has a Windows® platform type; a second compute instance may execute a MacOS® configured to run on a Mac® platform, and has a Mac® platform type; and so on. Thus, each compute instance is associated with a corresponding platform type, and applications running on a compute instance has to be compiled for the corresponding platform type.

As described above, the agent management service executes in the provider-owned service tenancy, and includes a data plane. In an example, the data plane maintains or has access to an "agent inventory information", which indicates, among other things, for each agent, (i) a plurality of platform types, and (ii) for each platform type, one or more deployable versions of the agent.

Each agent has different "platform types", where each platform type of an agent is compiled for a particular platform type of the compute instance. Thus, the plurality of platform types may be, merely as examples, Windows® platform type, Mac® platform type, Linux® platform type, and/or the like. Thus, a Windows® platform type of an agent is developed to execute on a compute instance executing a Windows® OS, for example.

For a given agent and a given platform type, "versions" are different compilations of the agent. Thus, for a first platform type of a first agent, there may be a version 1.0, a version 1.5, a version 2, and so on. The version of a given agent and a given platform type are periodically updated, and the agent inventory information identifies, for each agent and each platform type, one or more current versions of the agent that are ready to be deployed to one or more compute instances.

The versions identified by the agent inventory information are the latest or most updated versions available. Thus, versions identified by the agent inventory information are considered to be "deployable" or ready for deployment to one or more compute instances. There are multiple agents supported by the data plane and the agent inventory information, and each agent has one or more deployable versions for each platform type.

The "agent inventory information" may be a file, a log, a message, or another data structure that stores identifiers of the various deployable various versions of the various agents. In an example, the agent inventory information comprises a software bill of material (SBOM) of the various deployable versions of various platform types of various agents, including identifiers of the various versions, and/or memory locations from where the corresponding deployable agent objects (described below) can be retrieved. In an example, the agent inventory information comprises a manifest file that includes the SBOM.

For each version of each platform type of an agent, the corresponding code used to update and/or install the agent is referred to as an "agent object." Thus, each deployable version of an agent has a corresponding agent object. Thus, there are a plurality of agent objects corresponding to the plurality of deployable versions identified by the agent inventory information. The agent objects are also ready for deployment, and hence, are considered deployable agent objects.

The service tenancy further includes an object storage that includes a plurality of object storage repositories or buckets for the plurality of deployable agent objects. For example, a first object storage repository stores deployable agent objects that are for versions of a first platform type; a second object storage repository stores deployable agent objects that are for versions of a second platform type; a third object storage repository stores deployable agent objects that are for versions of a third platform type; and so on.

Thus, for example, an agent has a first version of a first platform type, and a corresponding first agent object is stored in the first object storage repository; the same agent has a second version of a second platform type, and a corresponding second agent object is stored in the second object storage repository; and the same agent has a third version of a third platform type, and a corresponding third agent object is stored in the third object storage repository.

In an example, the agent inventory information stores, for each deployable version, a corresponding memory location where the corresponding agent object is stored. Thus, for the above example, the agent inventory information stores identifiers of memory locations from where the first agent object, the second agent object, and the third agent object can be retrieved.

In an example, the data plane also maintains information, or has access to information on which compute instances have been enabled to receive the agent inventory information and have the agents installed therewithin. A compute instance being "enabled" implies that the compute instance is authorized, instructed, requested, and/or should have the agents installed and updated, and is associated with the agent management service. This doesn't necessarily mean that the enabled compute instance actually has the agents installed and updated.

For example, a cloud customer of a tenancy or a compartment within a tenancy may have defined a rule to enable all compute instances within the tenancy or the compartment. A compartment within a tenancy is a logical group of cloud resources within the tenancy. Thus, a compartment may include one or more compute instances of the tenancy. Appropriate rules regarding enablement of the compute instances at the tenancy level and/or at the compartment level may be preconfigured and known to the data plane.

In operation, the plugin within a compute instance requests the data plane for authorization to receive the agent inventory information. The data plane determines whether the compute instance, from which the request is received, is enabled. If the compute instance is enabled, the data plane grants the token to the plugin. If the compute instance is not enabled, then the data plane transmits back information indicating the rejection. In an example, if the plugin is unable to obtain the token for at least a threshold number of times and/or at least a threshold duration of time, then the plugin uninstalls the one or more agents currently installed within the compute instance.

If the plugin receives the token from the data plane, the plugin requests the data plane for the current set of the agent inventory information. The request is submitted along with the token that the plugin received earlier from the data plane.

Note that the request for the agent inventory information from the plugin to the data plane, and subsequent reception of the agent inventory information may be performed periodically. In an example, the token may be valid for receiving the agent inventory information only once. In another example, the token may be valid for receiving the agent inventory information for at least a threshold number of times. In another example, the token may be valid for receiving the agent inventory information during at least a threshold period of time (e.g., valid for 24 hours).

In response to the request for the agent inventory information, the data plane transmits a communication to the plugin. The communication includes at least a portion of the agent inventory information. For example, the agent inventory information may indicate the platform types of the agents, deployable versions of the agents that have been made available within a current time frame (e.g., within the past 12 months), and memory locations from where the corresponding deployable agent objects can be retrieved.

As described above, the agent inventory information includes, for each agent, identifiers of deployable versions of a plurality of platform types, and also identifiers of memory locations where the corresponding agent objects are stored. Thus, the agent inventory information is agnostic of the OS installed within the compute instance and the platform type of the compute instance, and sends the agent inventory information for multiple platform types supported by the data plane. Accordingly, there is no need to generate different agent inventory information for different platform types, and the data plane need not be aware of the platform types of a compute instance.

Upon receiving the agent inventory information, the plugin selects zero, one, or more agents for updating; the plugin selects zero, one, or more agents for installation; and the plugin selects zero, one, or more currently installed agents for uninstallation.

For example, the plugin has access to runtime information of the compute instance, where the runtime information is indicative of a platform type of the compute instance. Thus, the plugin filters out versions of agents that are for different platform types, and reads the deployable versions of agents that are for specifically the platform type of the compute instance.

In an example, the runtime information also includes the version number of various agents installed within the compute instance. The plugin compares the version number of various agents installed within the compute instance with the deployable version numbers indicated by the agent inventory information. For example, if for a given agent, the installed version for the agent is different from the deployable version(s) for the agent, the agent is selected for updating. The updating may include an upgrade or a downgrade. The plugin performs this similar operation for one or more other agents (such as all agents) that are included in the runtime information, to select zero, one, or more agents for updating.

Similarly, the plugin selects zero, one, or more agents for installation within the compute instance, based on the agent inventory information. As an example, first, the plugin identifies runtime information, such as the type and version information of currently executing agents. Second, the plugin compares this runtime information with the agent inventory information. The plugin determines whether there is any agent identified in the agent inventory information that is not installed or executed in the compute instance. If any such agent(s) are identified, the plugin selects such zero, one, or more identified agents for installation.

The plugin receives the deployable agent objects of the selected agents for updating and installation from the corresponding object storage repository, e.g., from memory locations identified by the agent inventory information. As described above, there may be multiple such object storage repositories for multiple platform types, and the plugin receives the deployable agent objects from the object storage repository that corresponds to the platform type of the compute instance. The plugin then updates the selected agents within the compute instance with the deployable agent object, and/or installs the deployable agent object within the compute instance.

Note that if the agent is a third-party developed or owned agent, license information may be needed for installing and/or updating the agent. The license information may be stored in a license vault that is outside of the provider-owned service tenancy. The license vault may be within the customer tenancy in which the compute instance is located, or within another customer tenancy different from the customer tenancy in which the compute instance is located, or within a tenancy of the third party, or may be within a storage maintained by the third party (or the cloud customer) and accessible through a public network such as the Internet. Prior to installation and/or updating the third-party agent, the plugin fetches the license information from the license vault.

Similarly, the plugin selects zero, one, or more agents currently installed within the compute instance for uninstallation, based on the agent inventory information. As an example, first, the plugin identifies runtime information, such as the platform type and version information of currently executing agents. Second, the plugin compares this runtime information with the agent information. The plugin determines whether there is any executing agent that is not included in the agent inventory information. The plugin uninstalls executing agents that are not included in the agent inventory information.

In an example, to prevent accidental uninstallation, safeguards may be implemented. As an example, a plugin may check the agent inventory information multiple times, and if a particular installed agent is missing from the agent inventory information for a minimum number of checks (e.g., three times), the plugin uninstalls the missing agent. As another example, a plugin may check the agent inventory information over the course of a time period, and if a particular agent is missing from the agent inventory information for a minimum duration (e.g., 24 hours), the plugin uninstalls the missing agent.

Thus, the agent management service including the data plane, along with the plugin installed in individual customer compute instances, manages the life cycle of the agents operating on the customer compute instances. Agents operating within a compute instance can be used for a plethora of tasks, such as providing security related information and/or other relevant information of the compute instance to the cloud provider or another trusted technology provider. In an example, the agents facilitate the cloud provider or the trusted technology provider to gain some visibility and insights into the customer-owned compute instances.

FIG. 1A illustrates a block diagram of a cloud environment 100 in which management (such as installation, updating, and/or uninstallation) of agents 116 within compute instances 108 of a customer tenancy 104 of the cloud environment 100 is performed at least in part using an agent inventory information 150 provided by an agent management service 142 in a service tenancy 140.

Each compute instance 108 is configured to execute a corresponding operating system (OS) 170. For example, compute instances **108*a*, 108*r* are illustrated to execute an OS 170*a*; compute instance 108*b* is illustrated to execute an OS 170*b*; compute instance 108*c* is illustrated to execute an OS 170*c*, and so on. Thus, each of OSs 170*a*, 170*b*, 170*c* is executed in one or more of compute instances of the cloud environment 100. Although three OSs 170*a*, 170*b*, 170*c* are illustrated to be executed in various compute instances 108 of the cloud environment 100, there may be a different number of OSs (such as one, two, four, or higher) operating in the various compute instances 108 of the cloud environment 100**.

In an example, the plurality of OSs 170_a_, 170_b_, 170_c_ run natively on a plurality of platforms. Merely as an example, the OS 170_a_ may be a Windows® operating system configured to run on a Windows® platform, the OS 170_b_ may be a LINUX® operating system configured to run on a LINUX® platform, and the OS 170_c_ may be a MacOS® configured to run on a MAC® platform. Thus, each compute instance 108 is associated with a corresponding platform type, and applications running on a compute instance has to be compiled for the corresponding platform type.

Note that in an example, the OS 170_a_ may be an appropriate version of the Windows® operating system, such as Windows 10® operating system, or Windows 11® operating system, or another appropriate version of the Windows® operating system. Similarly, the OS 170_b_ may be an appropriate version of the LINUX operating system, and so on.

Figure 1B:
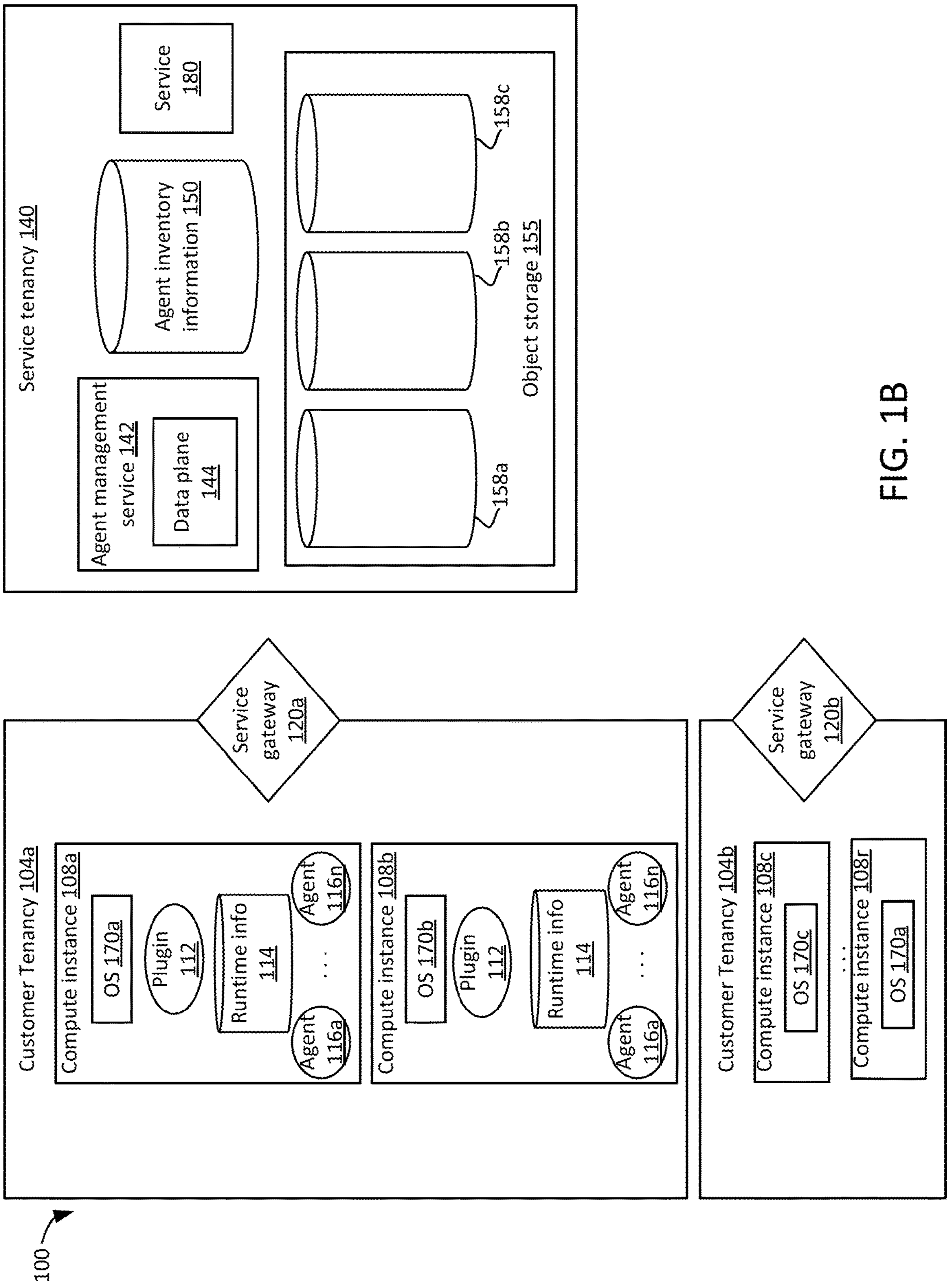
FIG. 1B illustrates two different customer tenancies including corresponding plurality of compute instances.

Note that in FIG. 1A, all the compute instances 108_a_, . . . , 108_r_ are illustrated to be within a single customer tenancy 104. However, the principles of this disclosure are applicable to compute instances that are in different customer tenancies as well. For example, FIG. 1B illustrates two different customer tenancies 104_a_ and 104_b_ including corresponding plurality of compute instances. For example, in FIG. 1B, the tenancy 104_a_ includes the compute instances 108_a_, 108_b_, and the tenancy 104_b_ includes the compute instances 108_c_, . . . , 108_r_. The compute instances 108_a_, . . . , 108_r_ may be distributed among a single tenancy 104 as seen in FIG. 1A, or among two different tenancies 104_a_ and 104_b_ as seen in FIG. 1B, or may be distributed among more than two tenancies. Furthermore, the distribution of the compute instances 108 among the different tenancies may be done in any appropriate manner (e.g., whether the tenancy 104_a_ has more or less compute instances than tenancy 104_b_).

As illustrated in FIG. 1A, each of the compute instances 108_a_, . . . , 108_r_ executes one or more of a plurality of software agents 116_a_, . . . , 116_n_, where the software agents 116_a_, . . . , 116_n_ are also referred to simply as agents henceforth. Although FIG. 1A illustrates each of the compute instances 108_a_ and 108_b_ executing the same set of agents 116_a_, . . . , 116_n_, this may not necessarily be the case. For example, each agent 116 may not be executed in each of the compute instances 108_a_, . . . , 108_r_. The agents 116_a_, . . . , 116_r_ being executed in the compute instances 108_c_, . . . , 108_r_ are not illustrated in FIG. 1A for purposes of illustrative clarity.

Each agent 116 is configured to perform a corresponding task. Merely as an example, the agent 116_a_ may be a workload protection agent (WLP) configured to protect a workload of the corresponding compute instance in which the agent 116_a_ is being executed.

In an example, to protect the workload of a compute instance, the corresponding agent 116_a_ may act as a query agent or a security agent within the compute instance, e.g., to implement a query service at the compute instance. For example, the agent 116_a_ reads a list of queries to perform on the compute instance. In an example, the list of queries may be preconfigured within the agent 116_a_, and may be updated with each new update of the agent 116_a_. In another example, the agent 116_a_ receives the list of queries from a data plane (or from another component within the service tenancy). The agent 116_a_ queries the compute instance. In an example, the query of the compute instance by the agent 116_a_ may be in the form of Osquery®, or another appropriate form of query. In an example, the Osquery® is an open-source query program that is supported by Windows®, MacOS®, Linux OS®, and/or other OSs. In an example, the query may be repeated at periodic or aperiodic intervals. The nature of the query can vary from one implementation to the next, and may include querying about security related information associated with the compute instance, querying about operations of the compute instance, querying about information related to protecting an integrity of the compute instance, and/or the like. The agent 116_a_ collets information about the compute instance through such queries, and transmits the collected information (e.g., query results) to the data plane within the service tenancy. In an example, the collected information may be processed and analyzed in the service tenancy, e.g., to gain some visibility on an operation of the compute instance 108.

In the context of software assurance and detection, the role of an assurance administrator is added into the cloud environment 100. The assurance administrator utilizes at least some visibility into the cloud infrastructure in order to assure that a cloud customer of the customer tenancy 104 is abiding by certain restrictions. The assurance administrator is not necessarily the same entity as the provider of the cloud environment 100 (also referred to as the cloud provider), but where they are the same entity, the entity may be referred to as a "trusted technology provider" (TTP). In an example, the agents 116_a_ operating in various compute instances 108 may be owned by a provider of the cloud environment 100, and/or another trusted technology provider. Thus, in order to gain such visibility into customer-owned compute instances, cloud provider-owned agents (such as the agents 116_a_ installed in one or more or all the compute instances 108_a_, . . . , 108_r_) are to be installed on customer-owned compute instances to facilitate tracking. As described above, the agent 116_a_ reports query results back to a component controlled by the cloud provider. The query results are later analyzed, e.g., to ensure that the compute instances 108 are operating as expected, without any security issues or malicious operations.

As described above, in an example, the agents 116_a_ in various compute instances may be developed, provided, updated, and/or maintained by the provider of the cloud environment 100. For example, updates to the agent 116_a_ in a compute instance are supplied from within the service tenancy 140 of the provider of the cloud environment 100. Accordingly, the agent 116_a_ is also referred to herein as a "cloud provider agent." There may be one or more other agents (such as agent 116_b_, merely as an example) that are cloud provider agents.

In contrast, one or more of the remaining agents 116_c_, . . . , 116_n_ (such as agent 116_c_, merely as an example) may be a "third-party agent" developed by a third party that is neither the cloud customer nor the cloud provider, as described herein below. In an example, for updating a third-party agent, license information has to be obtained from outside the service tenancy 140 of the provider of the cloud environment 100.

Example tasks performed by the agent 116 are described above. One or more of the other agents 116_b_, . . . , 116_n_ may perform various other types of tasks, such as monitoring of the host and/or container on which a compute instance is being executed, e.g., to gain visibility into running processes and configurations.

In an example, one or more of the agents 116_b_, . . . , 116_n_ may also perform system integrity protection, e.g., to ensure only trusted packages are running with the corresponding compute instance. In yet another example, one or more of the agents 116_b_, . . . , 116_n_ may perform behavioral monitoring, such as generating alerts on unexpected or suspicious actions within the compute instance. In a further example, one or more of the agents 116*b*, . . . , 116*n* may perform anti-malware protection and/or scanning tasks. The scope of this disclosure is not limited by a type and/or working of any of the agents 116*a*, . . . , 116*n*.

Furthermore, in an example, an agent 116, such as the agent 116*c* being executed in some or all the compute instances 108*a*, . . . , 108*n* may be a security related software, such as Qualys®, which is an enterprise cyber risk and security platform agent. This may be an example of a third-party agent developed by a third party that is neither the cloud customer nor the cloud provider. As described below, license information and/or updates for such third-party agents (such as the agent 116*c*) are supplied from outside the service tenancy 140 of the provider of the cloud environment 100.

Note that the compute instances 108*a*, . . . , 108*r* operate different OSs 170, as described above. Accordingly, each agent 116 may also be based on the corresponding OS of the compute instance in which the agent is being executed.

Thus, each agent 116, such as the agent 116*a*, has different "platform types," each of which is also referred to herein as a "platform type of an agent." Each platform type of an agent is compiled to run on the corresponding platform type, the corresponding OS of the compute instance, and/or for the corresponding hardware architecture. For example, the agent 116*a* may have (i) a Windows® platform type configured to run on compute instances operating a Windows® operating system, (ii) a Mac® platform type configured to run on compute instances operating a MacOS®, (iii) a LINUX® platform type configured to run on compute instances operating a LINUX® operating system, and/or one or more other appropriate platform types. Similarly, agent 116*b* has different platform types, agent 116*c* has different platform types, and so on.

Note that the platform type may also be based on hardware architecture of an underlying host on which a compute instance is operating. Merely as an example, a 32-bit Windows® machine may have a first platform type, and a 64-bit Windows® machine may have a second platform type.

For a given agent (such as agent 116*a*) and for a given platform type of the agent, "versions" represent different compilations of the agent. For example, for the Windows® platform type of the agent 116*a*, there may be a version 1, a version 1.5, a version 2, etc., where the version 1.5 may be an update to the version 1, the version 2 may be an update to the version 1.5, and so on.

In FIG. 1A, compute instances 108*a*, 108*r* are illustrated to execute on a platform of the OS 170*a*; compute instance 108*b* is illustrated to execute on a platform of the OS 170*b*; compute instance 108*c* is illustrated to execute on a platform of the OS 170*c*, and so on. Accordingly, a specific version of a first platform type (e.g., corresponding to the OS 170*a*) of the agent 116*a* is installed in the compute instance 108*a*; another version of a second platform type (e.g., corresponding to the OS 170*b*) of the agent 116*a* is installed in the compute instance 108*b*; and another version of a third platform type (e.g., corresponding to the OS 170*c*) of the agent 116*a* is installed in the compute instance 108*c*. A version of a specific platform type of a given agent that is installed in a compute instance is referred to as an "installed version" of the platform type of the agent.

As illustrated in FIG. 1A, each of the compute instances 108*a*, . . . , 108*r* executes a plugin 112, although the plugin 112 is not illustrated for the compute instances 108*c*, . . . , 108*r* for purposes of illustrative clarity. The plugin 112 is also referred to as an "unified security agent manager," or also as an "unified agent manager," because the plugin 112 manages one or more of or all the plurality of agents 116*a*, . . . , 116*r* being executed within the compute instances 108*a*, . . . , 108*r*. In an example, the plugin 112 manages a lifecycle of one or more of the agents 116*a*, . . . , 116*r*, such as facilitates in installation, updating, and/or uninstalling of one or more of the agents 116*a*, . . . , 116*r* within one or more of, or each of, the compute instances 108*a*, . . . , 108*r*.

In an example, for a given compute instance 108, the plugin 112 may be a part of the host image of the compute instance 108, and may automatically execute once the compute instance 108 is operational. In another example, for another given compute instance 108, the plugin 112 may be installed via a script.

In an example, each compute instance 108 also stores corresponding runtime information 114 within a database or storage of the compute instance. The runtime information 114 of the compute instances 108*c*, . . . , 108*r* are not illustrated for purposes of illustrative clarity.

The runtime information 114 within a compute instance includes metadata identifying a type of the OS/platform type of the compute instance, a list of one or more of the agents 116*a*, . . . , 116*n* installed in the compute instance, a list of installed versions and platform types of each agent in the compute instance, and/or the like.

Referring again to FIG. 1A, in an example, the cloud environment 100 further includes the service tenancy 140 that provides one or more services to the customer tenancy 104, such as services associated with managing the agents 116*a*, . . . , 116*n* in various compute instances 108*a*, . . . , 108*r*. The cloud environment 100 further includes a service gateway 120 through which the customer tenancy 104 communicates with the service tenancy 140.

The service tenancy 140 includes an agent management service 142 comprising a data plane (DP) 144 configured to generate and/or update an agent inventory information 150, and communicate with the plugins 112 of the various compute instances, as described below. The agent inventory information 150 is stored in a repository within the service tenancy 140, and the agent inventory information 150 is described in further detail below with respect to FIG. 2.

The service tenancy 140 further includes an object storage 155 that includes a plurality of object storage repositories 158*a*, 158*b*, 158*c*. Note that for each version of each platform type of an agent, the corresponding code used to update and/or install the agent is referred to as an "agent object." Thus, a version 1.5 of the Windows® platform type an agent 116*a* has a corresponding agent object, and this agent object may be stored in the object storage repository 158*a*. This agent object may be used to install and/or update the corresponding agent in a compute instance. Similarly, a version 1.0 of a Mac® platform type of the agent 116*a* has another corresponding agent object, and this agent object may be stored in the object storage repository 158*b*.

Each object storage repository 158 is a bucket for storing deployable agent objects for various versions of agents for a corresponding platform type. For example, the object storage repository 158*a* stores deployable agent objects corresponding to deployable versions (such as latest versions) of various agents 116*a*, . . . , 116*n* that are of a first platform type (such as compiled for the OS 170*a*). Similarly, the object storage repository 158*b* stores deployable agent objects corresponding to deployable versions of various agents 116*a*, . . . , 116*n* that are of a second platform type (such as compiled for the OS 170*b*). Similarly, the object storage repository 158*c* stores deployable agent objects corresponding to deployable versions of various agents 116*a*, . . . , 116*n* that are of a third platform type (such as compiled for the OS 170*c*).

In the example cloud environment 100 illustrated in FIG. 1A, only three OSs 170*a*, 170*b*, 170*c* for three corresponding platform types are described, and accordingly, three such object storage repositories 158*a*, 158*b*, 158*c* are illustrated in FIG. 1A. However, in another example, the cloud environment 100 may support a different or higher number of OSs, and hence, a different or a higher number of platform types. In such an example, a different or a higher number of the object storage repositories may be included within the service tenancy 140.

In an example, the service tenancy 140 further includes a storage service 180 for storing and/or updating the agent inventory information 150 within the corresponding repository, and/or storing agent objects for the various versions of the various agents 116*a*, . . . , 116*n* within the various object storage repositories 158*a*, 158*b*, 158*c*, as described below in further detail.

FIG. 2 illustrates an example agent inventory information 150 for managing various agents 116*a*, . . . , 116*n* being executed within the compute instances 108*a*, . . . , 108*r* of the customer tenancy 104. The agent inventory information 150 stores identifiers of deployable one or more versions of different platform types of different agents 116*a*, . . . , 116*r*, and stores identifiers of memory locations from where the corresponding deployable agent objects are retrievable (e.g., memory locations form where the agent objects or can be downloaded).

In an example, the agent inventory information 150 may be a file, a log, a message, or another data structure that stores identifiers of the various versions of the various agents for various platform types, and corresponding memory locations of the agent objects. In an example, the agent inventory information 150 comprises a software bill of material (SBOM) of the various versions of various platform types of the various agents, including identifiers of the memory locations from where the corresponding deployable agent objects are retrievable. In an example, the agent inventory information 150 comprises a manifest file that includes the SBOM.

Referring to FIG. 2, for the agent 116*a*, the agent inventory information 150 identifies (i) a platform type 206*a* of the agent 116*a*, where the platform type 206*a* is compiled for the OS 170*a*, (ii) a platform type 206*b* of the agent 116*a*, where the platform type 206*b* is compiled for the OS 170*b*, and (iii) a platform type 206*c* of the agent 116*a*, where the platform type 206*c* is compiled for the OS 170*c*. Similarly, platform types for various other agents are also identified.

Furthermore, the agent inventory information 150 identifies, for each platform type of the agent 116*a*, one or more versions that are deployable to a compute instance. For example, the agent inventory information 150 identifies a version 204*aa*1 and a version aa2 of the platform type 206*a* of the agent 116*a*. For example, both the versions 204*aa*1 and 204*aa*2 may be acceptable for deployment, although the version 204*aa*2 may be more recent than 204*aa*1. Thus, if a compute instance has the version 204*aa*1 of the agent 116*a* installed, the compute instance need not update to the version 204*aa*2. However, if the compute instance has a version that is older than version 204*aa*1 of the agent 116*a* installed, the compute instance has to update to either of the versions 204*aa*1 or 204*aa*2, may be preferably update to the version 204*aa*2 (as the version 204*aa*2 may be more recent than the version 204*aa*1).

The versions identified in the agent inventory information 150 are "deployable versions," as agent objects corresponding to these versions are ready for deployment to the various compute instances. Note that as described above, for each deployable version, there is a corresponding agent object that is deployable. The agent objects are stored in the object storage repositories 158*a*, 158*b*, 158*c*, as also described above.

The agent inventory information 150 further identifies, for each deployable version, a memory location from which the corresponding agent object is retrievable or can be downloaded. For example, the agent inventory information 150 identifies that the agent object for the deployable version 204*aa*1 is stored at memory location 158*a*-*aa*1, the agent object for the deployable version 204*aa*2 is stored at memory location 158*a*-*aa*2, and so on.

Similarly, for the platform type 206*b* of the agent 116*a*, the agent object identifies (i) a deployable version 204*ab*1, and a memory location 158*b*-*ab*1 storing the corresponding agent object, and (ii) a deployable version 204*ab*2, and a memory location 158*b*-*ab*2 storing the corresponding agent object. Examples of various other deployable versions of various other platform types of various other agents and the corresponding memory locations storing the corresponding agent objects, as illustrated in FIG. 2, will be apparent, based on the above description.

Figure 3:
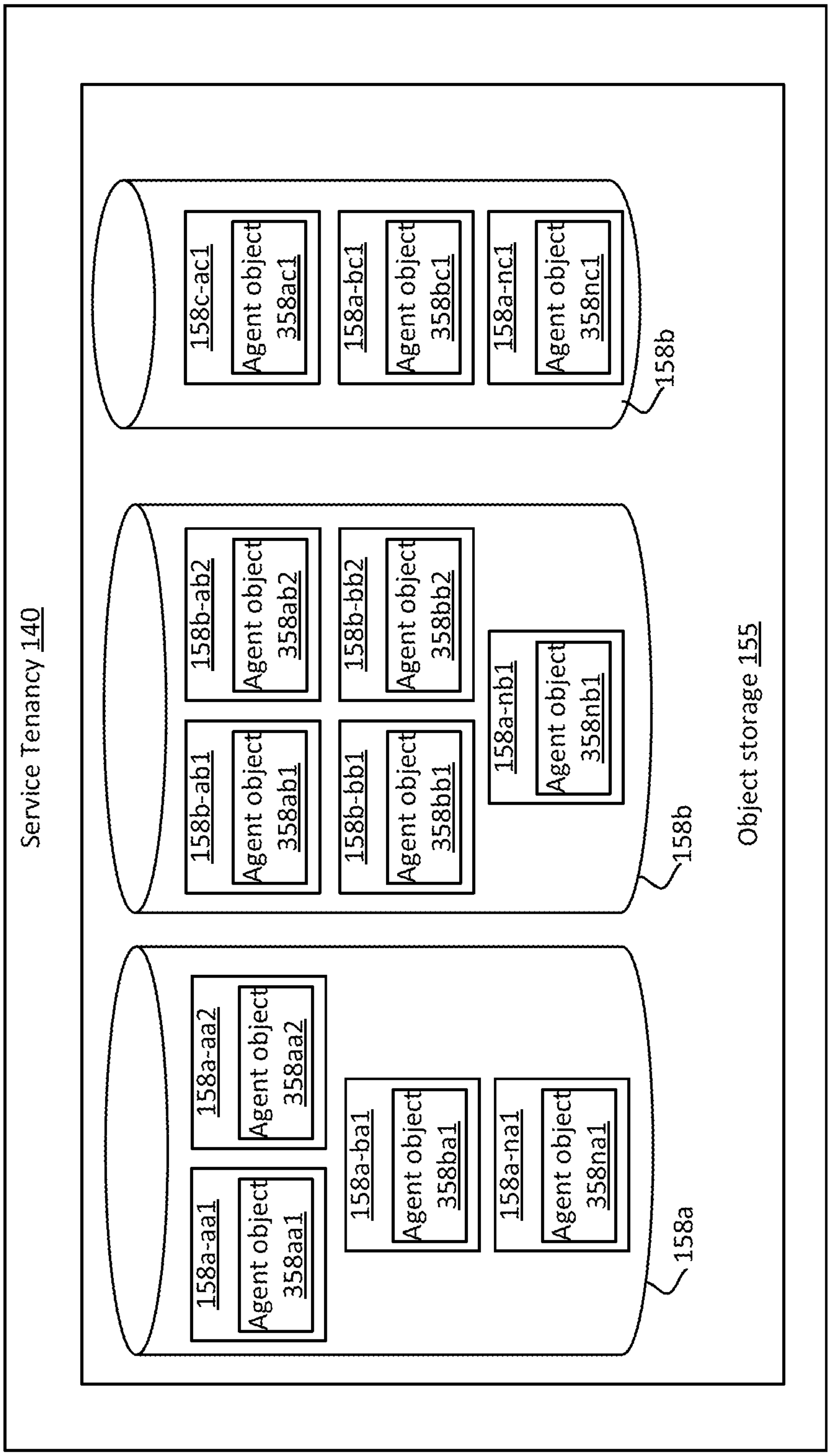
FIG. 3 illustrates a plurality of object storage repositories of an object storage of a service tenancy storing various deployable agent objects corresponding to various versions of various agents identified by an agent inventory information.

FIG. 3 illustrates the object storage repositories 158*a*, 158*b*, 158*c* of the object storage 155 of the service tenancy 140 storing various deployable agent objects corresponding to the various versions of various agents identified by the agent inventory information 150. For example, referring to both FIGS. 2 and 3, deployable agent objects corresponding to various deployable versions of various agents of the platform type 206*a* are stored in the object storage repository 158*a*; deployable agent objects corresponding to various deployable versions of various agents of the platform type 206*b* are stored in the object storage repository 158*b*; and deployable agent objects corresponding to various deployable versions of various agents of the platform type 206*c* are stored in the object storage repository 158*b*.

For example, in FIG. 2, the agent inventory information 150 identifies that for the platform type 206*c* of the agent 116*a*, the agent object for the version 204*ac*1 is stored at a memory location 158*c*-*ac*1. In FIG. 3, the agent object 358*ac*1 for the version 204*ac*1 is stored at this memory location 158*c*-*ac*1. Similarly, in another example, in FIG. 2, the agent inventory information 150 identifies that for the platform type 206*a* of the agent 116*n*, the agent object for the version 204*an*1 is stored at a memory location 158*a*-*na*1. In FIG. 3, the agent object 358*na*1 for the version 204*an*1 is stored at this memory location 158*a*-*na*1. Examples of various other deployable agent objects, as illustrated in FIG. 3, will be apparent, based on the above description.

Figure 4:
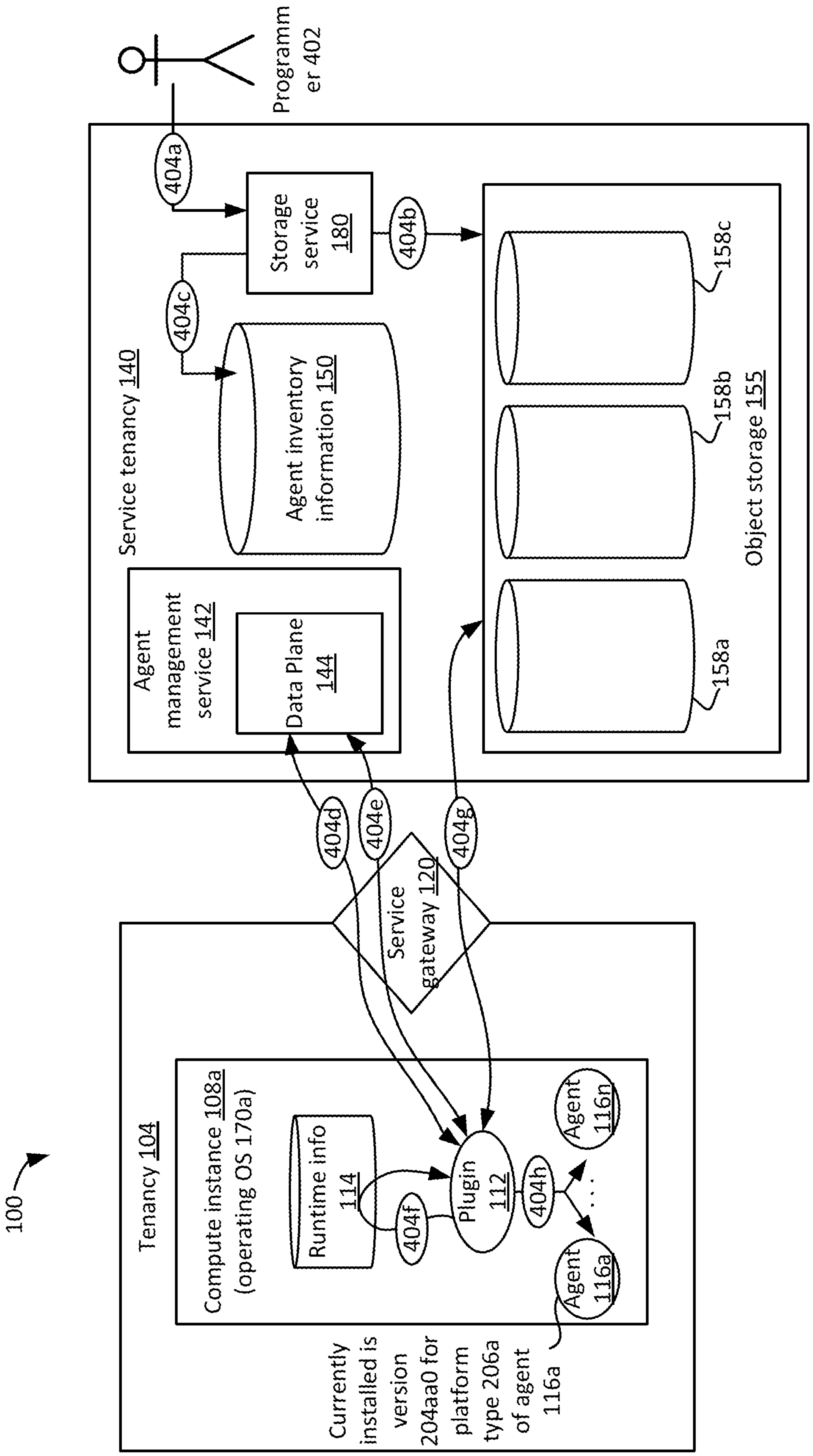
FIG. 4 illustrates a process flow for managing (such as installing, updating, and/or deleting) a plurality of agents being executed within an example compute instance of a customer tenancy of a cloud environment.

FIG. 4 illustrates a process flow for managing (such as installing, updating, and/or deleting) the various agents 116*a*, . . . , 116*n* being executed within an example compute instance 108*a* of the customer tenancy 104 of the cloud environment 100. Note that while the process flow is for managing agents 116*a*, . . . , 116*n* of one example compute instance 108*a*, such a process flow may also be used for managing agents 116*a*, . . . , 116*n* of one or more other compute instances (such as all compute instances) within one or more of customer tenancies.

At 404*a*, a programmer 402 stores the agent inventory information 150 to the storage service 180, where the agent inventory information 150 includes identifiers of various deployable versions of different platform types of various agents, and memory locations from where the corresponding deployable agent objects are retrievable, as illustrated in FIG. 4. In an example, at 404*a*, the programmer 402 also stores the various deployable agent objects corresponding to the various versions to the storage service 180, as also illustrated in FIG. 4.

At 404*b*, the storage service 180 pushes the various deployable agent objects to the corresponding object storage repositories 158*a*, 158*b*, 158*c*. For example, the agent objects 358*aa*1, 358*aa*2 for the versions 206*aa*1, 206*aa*2 of the platform type 206*a* of the agent 116*a* is pushed to the object storage repository 158*a* (e.g., pushed to the memory locations 158*a*-*aa*1, and 158*a*-*aa*2, respectively), as described above with respect to FIGS. 2 and 3. In an example, only the storage service 180, which is owned by the cloud provider, has write permission to the object storage repositories 158*a*, 158*b*, 158*c*.

At 404*c*, the storage service 180 uploads the agent inventory information 150 to the repository (or updates the agent inventory information 150 within the repository), as illustrated in FIG. 4. In an example, only the storage service 180, which is owned by the cloud provider, has write permission to the repository storing the agent inventory information 150; and only the data plane 144 has read permission from this repository.

At 404*d*, the plugin 112 within the compute instance 108*a* of the customer tenancy 104 transmits a request for a token to the data plane 144, through the service gateway 120. The token will later be used to access the agent inventory information 150. Thus, the request for the token is a request to access the agent inventory information 150. Upon receiving the request for the token, the data plane 144 checks to see if the compute instance 108*a* has been "enabled" to install one or more of the agents 116*a*, . . . , 116*n*.

Note that a compute instance being "enabled" to have one or more of the agents 116*a*, . . . , 116*n* installed implies that the compute instance is associated with the agent management service 142, and is authorized, instructed, requested, and/or should have the agents installed and updated. This doesn't mean that the enabled compute instance actually has the agents installed and updated.

For example, a cloud customer of a tenancy or a compartment within a tenancy may have defined a rule to enable all compute instances within the tenancy or the compartment. Note that a compartment within a tenancy is a logical group of cloud resources within the tenancy. Thus, a compartment may include one or more compute instances of the tenancy. Appropriate rules regarding enablement of the compute instances at the tenancy level or at the compartment level may be preconfigured and known to the data plane 144. Thus, the data plane 144 checks to see if the compute instance 108*a* has been enabled to install one or more of the agents 116*a*, . . . , 116*n*, e.g., by checking rules associated with the tenancy and/or the compartment that includes the compute instance 108*a*.

If the compute instance 108*a* is enabled, also at 404*d*, the data plane 144 (or another identity and access management component within the service tenancy 140) assigns a unique identity to the plugin 112 of the compute instance 108*a*, and the data plane 144 transmits a token to the compute instance 108*a*. The token is indicative that the compute instance 108*a* is enabled to receive updates for the agents 16*a*, . . . , 116*n*. If not enabled, the data plane 144 doesn't transmit the token to the compute instance 108*a*.

At 404*e*, the plugin 112 transmits a request to the data plane 144 for the agent inventory information 150, where the request is accompanied by the token. Also at 404*e*, the data plane 144 transmits the agent inventory information 150 to the plugin 112.

At 404*f*, the plugin 112 reads the runtime information 114 and the agent inventory information 150, to identify (i) zero, one, or more agents that have to be updated, (ii) zero, one, or more agents that have to be deleted or uninstalled, and/or (iii) zero, one, or more of agents that have to be installed. Thus, the plugin 112 can select agents for updating, uninstalling, and/or installing.

For example, the runtime information 114 specifies an OS of the compute instance 108*a*, which in this case is the OS 170*a*. Note that the agent inventory information 150 includes list of a plurality of deployable versions corresponding to a plurality of platform types supported by the agent inventory information 150. The plugin 112 filters the versions that are compiled specifically for the platform type of the compute instance 108*a* (such as a platform type for the OS 170*a* running within the compute instance 108*a*).

Once the platform type is selected, for a given agent, the plugin compares (i) the deployable version(s) for the agent, as identified by the agent inventory information 150, and (ii) the version installed within the compute instance 108*a*, as identified by the runtime information 114.

Merely as an example, as illustrated in FIG. 4, for the agent 116*a*, the currently installed version is 204*aa*0, while the deployable versions for this agent 116*a* and for the platform type 26*a* are 204*aa*1, 204*aa*2. Thus, the plugin 112, based on such comparison, decides to update the agent 116*a* from the version 204*aa*0 to any of the deployable versions 204*aa*1, 204*aa*2. Because the version 204*aa*2 is more current than the version 204*aa*1, the plugin 112 may decide to update the agent 116*a* to the version 204*aa*2.

Also at 404*f*, the plugin 112 may decide to install a new agent. For example, assume that an agent 116*b* is not installed within the compute instance 108*a*, whereas the agent inventory information 150 includes identification of versions 204*bb*1 and 204*bb*2 for this agent 116*b*. Accordingly, the plugin 112 decides to install the agent 116*b*, and also decides to install the latest version 204*bb*2 of this agent 116*b*.

Also at 404*f*, the plugin 112 may also decide to uninstall an agent. For example, assume that an agent 116*p* is installed within the compute instance 108*a*, whereas the agent inventory information 150 does not includes identification of this agent 116*p*. Accordingly, the plugin 112 decides to uninstall or delete the agent 116*p*.

In an example, to prevent or reduce chances of accidental uninstallation, safeguards may be implemented. As an example, the plugin 112 may check the agent inventory information 150 multiple times, and if a particular agent (such as the agent 116*p*) is missing from the agent inventory information 150 for a minimum or threshold number of checks (e.g., three times), the plugin 112 uninstalls the missing agent 116*p*. As another example, the plugin 112 may check the agent inventory information 150 over the course of a time period, and if a particular agent (such as the agent 116*p*) is missing from the agent inventory information 150 for at least a threshold time duration (e.g., 24 hours), the plugin 112 uninstalls the missing agent.

At 404*g*, the plugin 112 downloads the agent objects needed for updating the selected zero, one, or more agents specifically from the object storage repository 158*a* of the object storage 155. This is because the compute instance 108*a* executes the OS 170*a*, and the versions for the platform type 206*a* for the OS 170*a* are stored specifically in the object storage repository 158*a* (and not in the object storage repositories 158*b* and 158*c*). Continuing with the above example where the version 204*aa*0 of the platform type 206*a* of the agent 116*a* has to be updated to the deployable version 204*aa*2, the plugin 112 downloads the agent object 358*aa*2 from the memory location 158*a*-*aa*2 of the object storage repository 158*a*. Any other agent object(s) for updating the corresponding agents are also similarly downloaded from the object storage repository 158*a*.

At 404*h*, the agents due for updating are updated with the new and deployable agent objects downloaded from the object storage repository 158*a*. Thus, for example, the agent 116*a* is updated from the version 204*aa*0 to the version 204*aa*2.

Any agent that has to be uninstalled is also uninstalled at 404*h*. For example, as described above, the agent 116*p* is uninstalled, for not being included in the agent inventory information 150 for at least a threshold number of times and/or for at least a threshold duration of time. Similarly, a new agent can also be downloaded at 404*g*, and installed at 404*h*, if needed.

Figure 5:
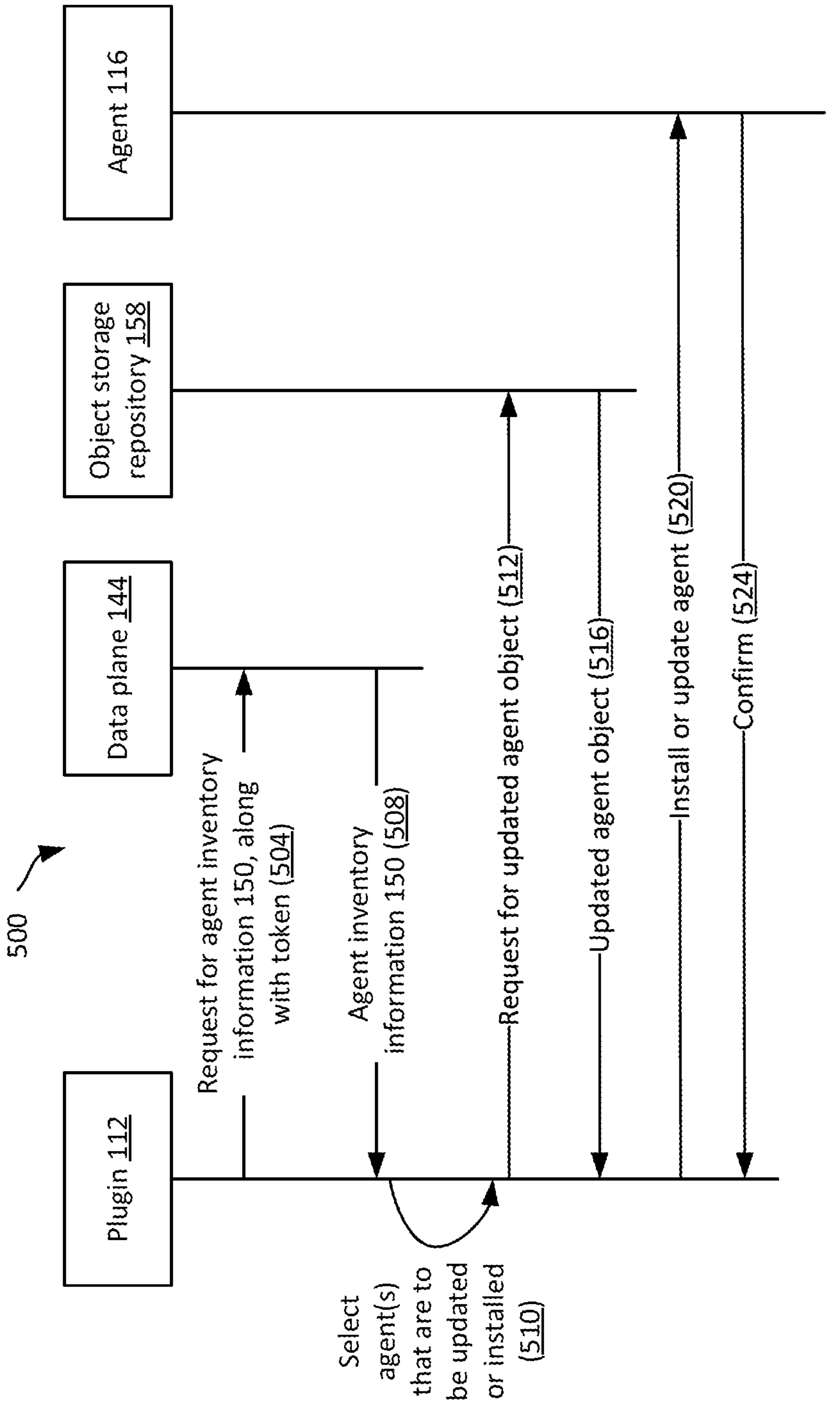
FIG. 5 illustrates a flow diagram depicting communication between a plugin of a compute instance, a data plane, an object storage repository, and an agent of the compute instance, e.g., for installation or updating of the agent.

FIG. 5 illustrates a flow diagram 500 depicting communication between a plugin 112 of a compute instance 108, the data plane 144, an object storage repository 158, and an agent 116 of the compute instance, e.g., for installation or updating of the agent. Initially, at 504, the plugin 112 calls the data plane 144 with a request for the agent inventory information 150, along with the token (see description with respect to FIG. 4 on reception of the token by the plugin 112 and from the data plane 144). At 508, the data plane 144 provides the agent inventory information 150 to the plugin 112.

Subsequently, at 510, the plugin 112 selects zero, one, or more of agents that are to be installed and/or updated, e.g., based on the runtime information 114 and the agent inventory information 150, as also previously described herein. The plugin 112 selects an appropriate one of the object storage repositories 158*a*, 158*b*, 158*c* (e.g., based on the platform type corresponding to the OS the compute instance is executing), and at 512, requests the selected corresponding object storage repository 158 for the deployable agent objects corresponding to the agent(s) that are to be updated or installed. At 516, the plugin 112 receives the requested deployable agent object from the object storage repository 158.

Subsequently, at 520, the plugin 112 requests an agent 116 to be updated (or installs the agent 116). Upon installation or updating, at 524, the plugin 112 receives a confirmation that the agent 116 has been updated or installed.

Figure 6:
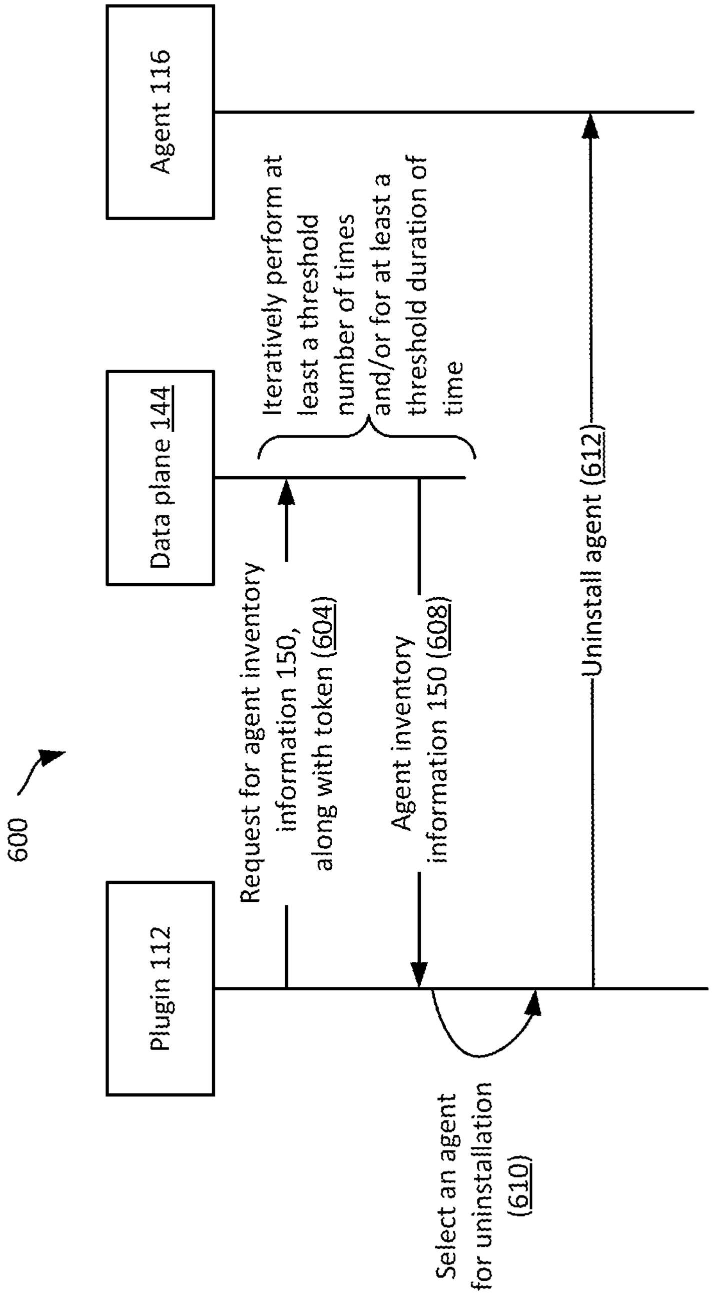
FIG. 6 illustrates a flow diagram depicting communication between a plugin of a compute instance, a data plane, and an agent of the compute instance, e.g., for uninstalling the agent.

FIG. 6 illustrates a flow diagram 600 depicting communication between a plugin 112 of a compute instance 108, the data plane 144, and an agent 116 of the compute instance, e.g., for uninstalling the agent. Initially, at 604, the plugin 112 calls the data plane 144 with a request for the agent inventory information 150, along with a token (e.g., similar to process 504 of FIG. 5). At 608, the data plane 144 provides the agent inventory information 150 to the plugin 112.

As described above, an agent 116 may be missing in the agent inventory information 150. The processes 604 and 608 are iteratively repeated for at least a threshold number of times (e.g., at regular or irregular intervals) and/or for at least a threshold duration of time. If the agent 116 is missing in the agent inventory information 150 for each of the threshold number of times and for at least the threshold duration of time, the agent 116 is selected for uninstallation at 610. Accordingly, at 612, the plugin 112 causes the agent 116 to be uninstalled.

Figure 7:
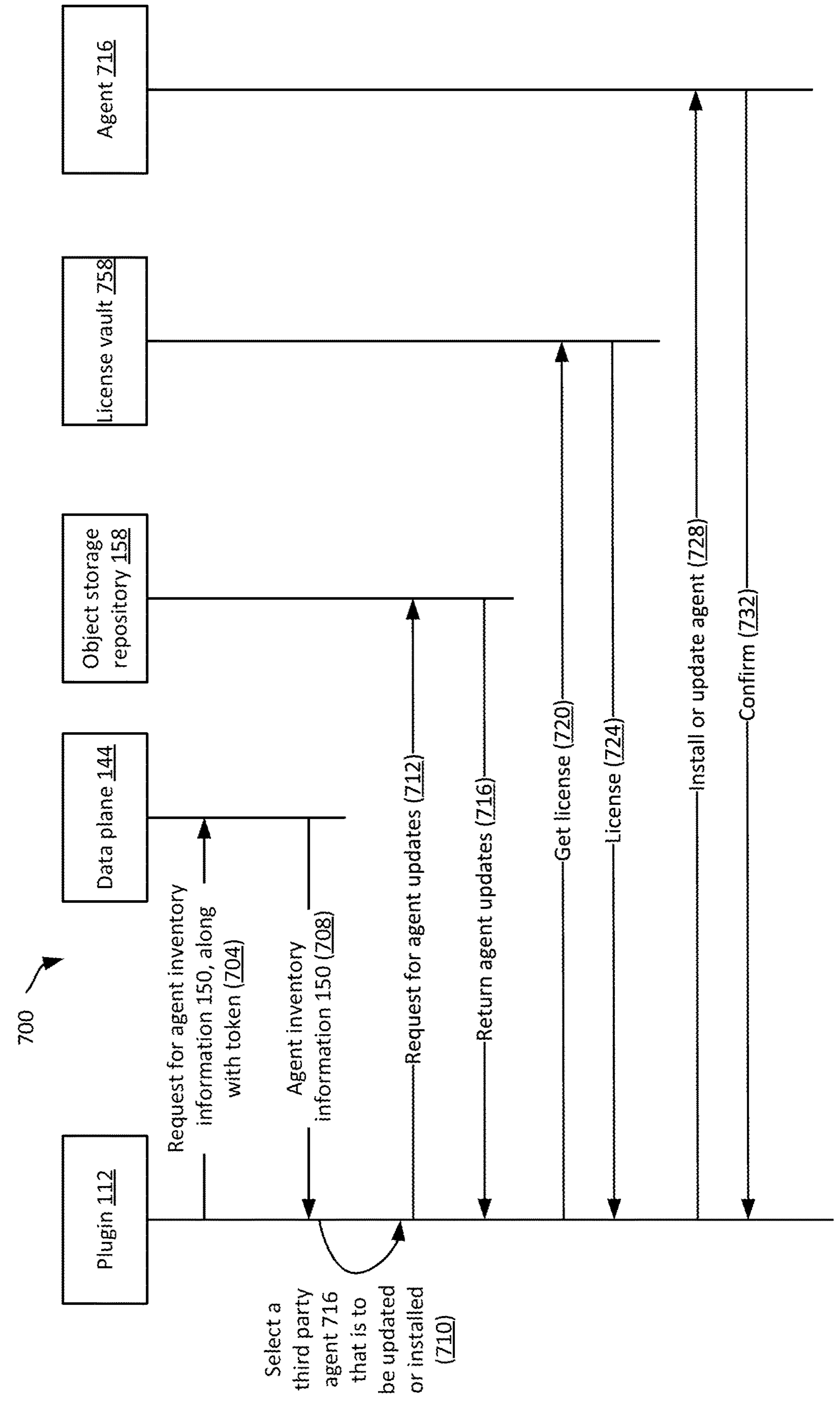
FIG. 7 illustrates a flow diagram depicting communication between a plugin of a compute instance, a data plane, an object storage repository, and a third-party agent of the compute instance, e.g., for installation or updating of the third-party agent.

FIG. 7 illustrates a flow diagram 700 depicting communication between a plugin 112 of a compute instance 108, the data plane 144, an object storage repository 158, and a third-party agent 716 of the compute instance, e.g., for installation or updating of the third-party agent 716. As described above, a third-party agent is developed by a third party that is neither the cloud customer nor the cloud provider. In an example, for updating a third-party agent, license information has to be obtained from outside the service tenancy 140 of the provider of the cloud environment 100. For example, the license information may be saved in a license vault 858. The license vault 858 may be controlled by the cloud customer or the third party. For example, the license vault 858 may be within the customer tenancy 104, within another customer tenancy different from the customer tenancy 104, within a tenancy of the third party, or may be within a storage maintained by the third party (or the cloud customer) and accessible through a public network such as the Internet. Note that in the flow diagram 700, it is assumed that the agent objects for updating the third-party agents are stored in the object storage repositories 158 within the service tenancy 140, although the license information is stored in the license vault 758.

Initially, at 704, the plugin 112 calls the data plane 144 with a request for the agent inventory information 150, along with a token. At 708, the data plane 144 provides the agent inventory information 150 to the plugin 112.

Subsequently, at 710, the plugin 112 of the compute instance 108 selects at least one third party agent 716 that is to be installed and/or updated, e.g., based on the runtime information 114 and the agent inventory information 150, as also previously described herein. The plugin 112 selects an appropriate one of the object storage repositories 158*a*, 158*b*, 158*c* (e.g., based on the OS that the compute instance is executing), and at 712, requests the selected corresponding object storage repository 158 for the deployable agent object corresponding to the third-party agent that is to be installed or updated. At 716, the plugin 112 receives the requested deployable agent object from the object storage repository 158.

Subsequently, at 720, the plugin 112 requests a license for installation and/or updating the third-party agent 716 from the license vault 758, example location of which has been described above. At 724, the plugin 112 receives the license information for installation or updating the agent 716.

At 728, the plugin 112 installs or updates the third-party agent 716, based on the agent object received from the object storage repository 158 and the license information. Upon installation or updating, at 732, the plugin 112 receives a confirmation that the agent 716 has been updated or installed.

Figure 8:
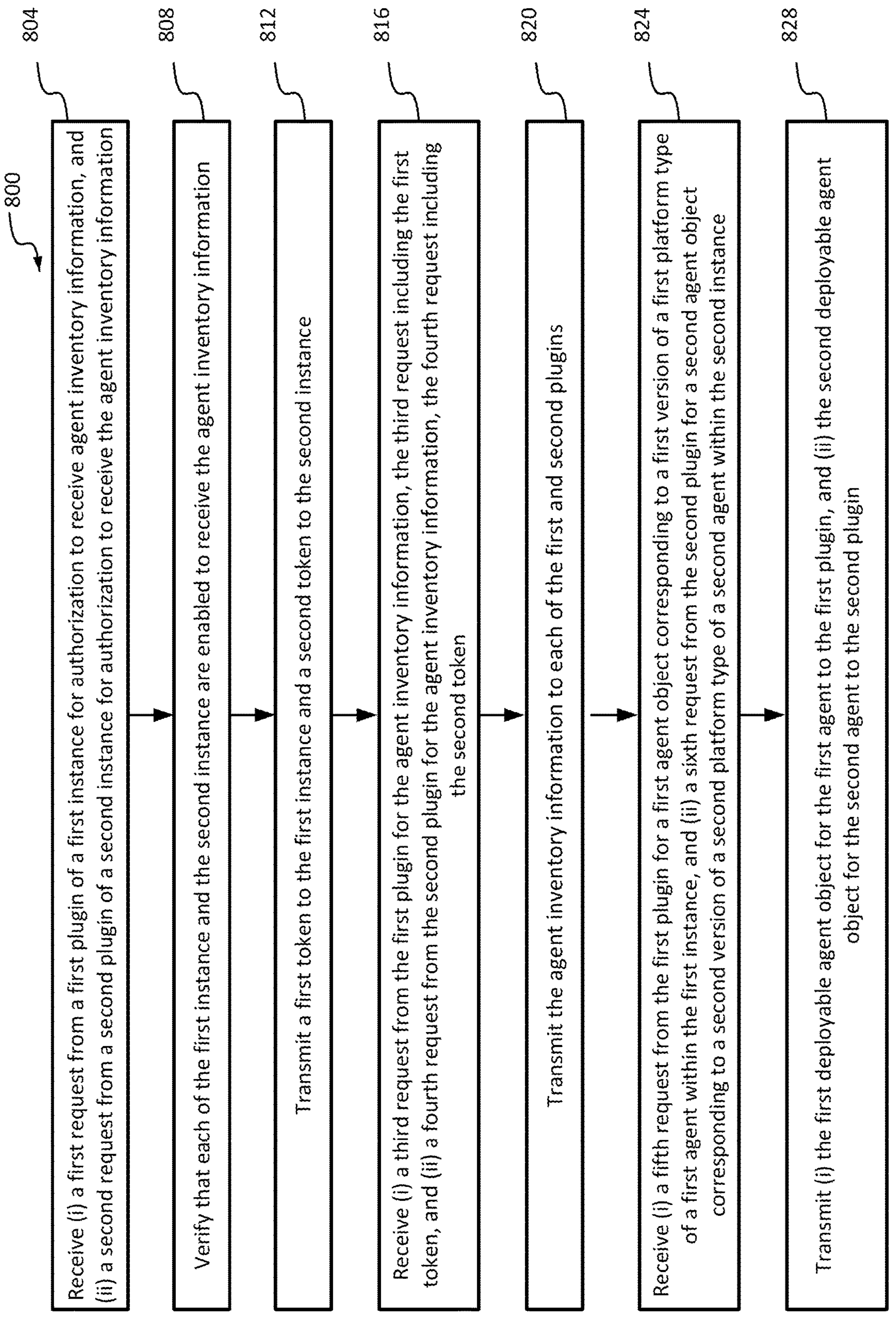
FIG. 8 is a flow diagram depicting a method for transmitting agent objects for installing and/or updating agents within two compute instances of a customer tenancy of a cloud environment.

FIG. 8 is a flow diagram depicting a method 800 for transmitting agent objects for installing and/or updating agents within two compute instances of a customer tenancy of a cloud environment 100. The method 800 includes processes 804-828 from the perspective of various components within the service tenancy 140.

The method 800 includes, at 804, receiving (i) a first request from a first plugin of a first compute instance for authorization to receive agent inventory information, and (ii) a second request from a second plugin of a second compute instance for authorization to receive the agent inventory information. The first and second requests are received by a data plane, such as the data plane 144 of FIGS. 1A and 1B. The first compute instance may be the compute instance 108*a* and the second compute instance may be the compute instance 108*b*. The first plugin may be the plugin 112 within the compute instance 108*a*, and the second plugin may be the plugin 112 within the compute instance 108*b*. The process 804 is described in further detail with respect to process 404*d* of FIG. 4. The agent inventory information may be the agent inventory information 150.

Referring again to FIG. 8, the method 800 proceeds from process 804 to process 808. At process 808, the data plane verifies that each of the first compute instance and the second compute instance are enabled to receive the agent inventory information. As described above, a compute instance being "enabled" implies that the compute instance is authorized, instructed, requested, and/or should have the agents installed and updated. For example, a cloud customer of a tenancy or a compartment within a tenancy may have predefined a rule to enable all compute instances within the tenancy or the compartment. Appropriate rules regarding enablement of the compute instances at the tenancy level or at the compartment level may be preconfigured and known to the data plane. Thus, the data plane checks to see if the first and second compute instances have been enabled to install one or more of the agents, e.g., by checking rules associated with the tenancy and/or the compartment that includes each of the first and second compute instances.

The method 800 proceeds from process 808 to process 812. At 812, upon successful verification that both the first and second compute instances are enabled, the data plane transmit a first token to the first compute instance and a second token to the second compute instance. Each token acts as a validation that the corresponding compute instance is enabled to receive the agent inventory information.

The method 800 proceeds from process 812 to process 816. At 816, a third request is received from the first plugin for the agent inventory information, and a fourth request is received from the second plugin for the agent inventory information. In an example, the third request includes the first token, and the fourth request includes the second token. In an example, the data plane receives the third and fourth requests. The process 816 is described in further detail with respect to process 404*e* of FIG. 4.

The method 800 proceeds from process 816 to process 820. At 820, the data plane transmits the agent inventory information to each of the first and second plugins. The agent inventory information has been described above in detail.

The method 800 proceeds from process 820 to process 824. At 824, (i) a fifth request is received from the first plugin for a first agent object corresponding to a first version of a first platform type of a first agent within the first instance, and (ii) a sixth request is received from the second plugin for a second agent object corresponding to a second version of a second platform type of a second agent within the second instance. The fifth and sixth requests are received by the object storage repository 155. Merely as an example, the object storage repository 158*a* may receive the fifth request, based on the first compute instance having the OS 170*a*; and the object storage repository 158*b* may receive the sixth request, based on the second compute instance having the OS 170*b*. In an example, the fifth request includes a memory location where the first agent object is located, and from where the first agent object is retrievable; and the sixth request includes a memory location where the second agent object is located, and from where the second agent object is retrievable.

In one example, the first agent and the second agent may be the same agent (e.g., agent 116*a*). In one such example where the first and second agents are the same, the first platform type and the second platform type may be the same platform type, whereas the first version may be same as, or different from, the second version. In another such example where the first and second agents are the same, the first platform type and the second platform type may be different. In another example, the first agent and the second agent may be different agents (e.g., agents 116*a* and 116*b*, respectively, for example).

In one example, the first platform type and the second platform type may be the same platform type. In another example, the first platform type and the second platform type may be different platform types.

The method 800 proceeds from process 824 to process 828. At 828, (i) the first deployable agent object for the first agent is transmitted to the first plugin, and (ii) the second deployable agent object for the second agent is transmitted to the second plugin. The transmission is from the object storage 155, e.g., from the object storage repository 158*a* and the object storage repository 158*b*, respectively, for the above-described use case example. The first plugin updates or installs the first agent within the first compute instance, using the first deployable agent object; and the second plugin updates or installs the second agent within the second compute instance, using the second deployable agent object.

Figure 9:
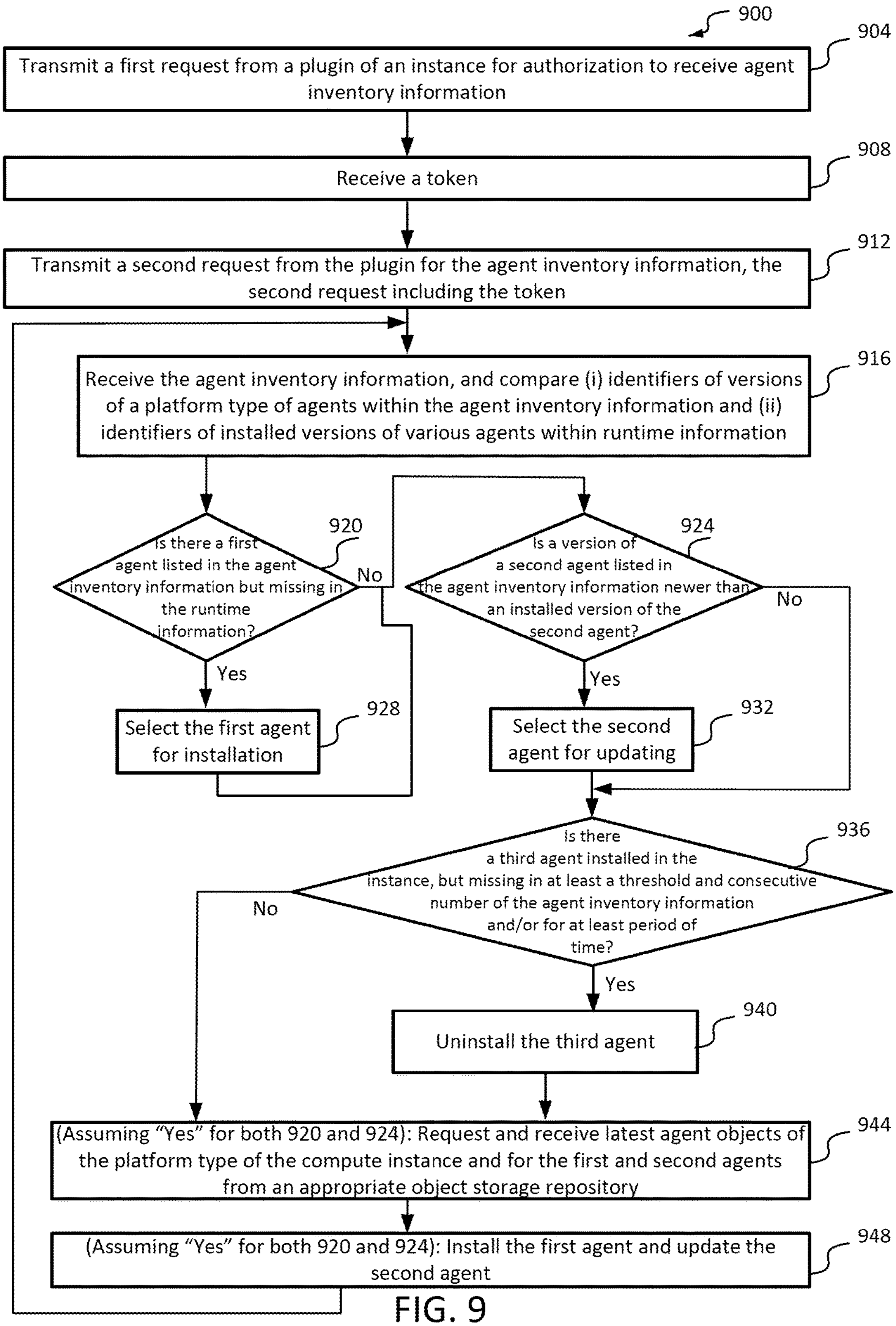
FIG. 9 is a flow diagram depicting another method for receiving deployable agent objects for an agent, and installing and/or updating the agent within a compute instance of a customer tenancy of a cloud environment.

FIG. 9 is a flow diagram depicting another method 900 for receiving deployable agent objects for an agent, and installing and/or updating the agent within a compute instance of a customer tenancy of a cloud environment. The method 900 includes processes 904-948 from the perspective of a plugin within a compute instance.

At process 904 of the method 900, a first request is transmitted from a plugin of a compute instance (such as the plugin 112 of the compute instance 108*a*) for authorization to receive agent inventory information. The first request is transmitted to a data plane, such as the data plane 144.

The method 900 proceeds from process 904 to process 908. At 928, the plugin receives a token from the data plane, where the token implies that the compute instance is enabled to receive the agent inventory information (e.g., as described above with respect to process 812 of FIG. 8).

Note that in an example, if the plugin is unable to obtain the token (e.g., due to the compute instance not being enabled), then the plugin re-requests the token. If the plugin is unable to obtain the token in spite of at least a threshold number of tries (e.g., 10 tries) and/or for at least a threshold duration (such as 72 hours), the plugin may uninstall the one or more agents currently installed within the compute instance.

The method 900 proceeds from process 908 to process 912. At 912, the plugin transmits a second request for the agent inventory information to the data plane, wherein the second request includes the token.

The method 900 proceeds from process 912 to process 916. At 916, the plugin receives the agent inventory information, and compares (i) identifiers of deployable versions of a platform type of various agents within the agent inventory information and (ii) identifiers of installed versions of various agents within runtime information (such as runtime information 114). Note that the platform type here is the platform type of the compute instance, which is based on the OS of the compute instance. The compute instance in the example of FIG. 9 may be the compute instance 108*a* which executes the OS 170*a*. Accordingly, the agent inventory information includes versions of various platform types corresponding to various OSs, and the comparison is done with the versions of the platform type associated with the OS 170*a*. Accordingly, versions mentioned in the methods 900 are versions of the agents that are compiled for the OS 170*a*.

The method 900 proceeds from process 916 to process 920. At 920, the plugin 112 determines if there is at least a first agent that is listed in the agent inventory information but missing in the runtime information. Thus, the plugin 112 determines if there is an agent that should be, but isn't, installed in the compute instance.

If "Yes" at 920, the plugin 112 selects the first agent for installation at 928, and proceeds to 924. If "No" at 920, the plugin 112 proceeds to 924 directly, without selecting the first agent for installation.

At 924, the plugin 112 determines if a deployable version of the platform type a second agent listed in the agent inventory information is newer than an installed version of the second agent, as indicated in the runtime information.

If "Yes" at 924, the plugin 112 selects the second agent for updating at 932, and then proceeds to 936. If "No" at 924, the plugin 112 proceeds to 936 directly, without selecting the second agent for updating.

At 936, the plugin 112 determines if there is a third agent installed in the compute instance, but missing in at least a threshold and consecutive number of the agent inventory information and/or for at least period of time. For example, the processes 916-948 are repeated in a loop. Thus, the process 916 of receiving the agent inventory information may be repeated periodically, e.g., every 1 hour, or every 2 hours, or at another periodic interval. Thus, the process 936 keeps track of consecutive agent inventory information received at 916, and makes the determination whether the third agent is missing in at least a threshold and consecutive number of the agent inventory information and/or for at least period of time, as also described herein above.

If "Yes" at 936, the plugin 112 uninstalls the third agent at 940, and then proceeds to 944. If "No" at 936, the plugin 112 proceeds to 944 directly, without uninstalling the third agent.

At processes 944 and 948, it is assumed that both processes 920 and 924 had an "Yes." If both processes 920 and 924 resulted in a "No," then processes 944 and 948 may be skipped. If process 920 resulted in an "Yes" and process 924 resulted in a "No," then each of processes 944 and 948 may be partially executed, and only actions associated with the first agent may be executed. On the other hand, if process 920 resulted in a "No" and process 924 resulted in an "Yes," the each of processes 944 and 948 may be partially executed, and only actions associated with the second agent may be executed.

At process 944 (assuming "Yes" for both 920 and 024), the plugin 112 requests and receives deployable agent objects for the first and second agents from an appropriate object storage repository, such as the object storage repository 158*a* storing agent objects compiled for OS 170*a* (note that the compute instance of FIG. 9 is the compute instance 108*a* executing the OS 170*a*).

The method 900 proceeds from process 944 to process 948. At 948, the plugin installs the first agent and updates the second agent (assuming "Yes" for both 920 and 024). The method 900 then loops back to process 916, where another agent inventory information is received.

Instance Heartbeat

In an example and as described below, an agent monitoring service in a provider-owned service tenancy, along with a data plane within the provider-owned service tenancy, monitor one or more agents within one or more compute instances within a customer tenancy. For example, the agent monitoring service monitors the agents and the compute instances, e.g., to assure that the agents are installed, up-to-date, and functioning for each customer-owned compute instance that is enabled to have the agents installed. Because the monitoring is being done by the agent monitoring service in the provider-owned service tenancy, any intentional tampering or unintentional actions on an agent within a customer-owned compute instance is noticeable to the cloud provider, and the cloud provider can take remedial actions if needed. This provides an assurance that the agents are installed, up-to-date, and operating as intended.

The monitoring of the agents by the agent monitoring service facilitates in one or more of the following: (i) verifying whether an agent is installed within a compute instance that is enabled to include the agent, (ii) verifying whether an agent installed within a compute instance is alive and operating as intended, and/or (iii) verifying whether an agent installed within a compute instance is up-to-date (e.g., whether the agent has been updated to a minimum acceptable version).

In an example, to facilitate such monitoring, each agent operating within each compute instance are configured to periodically transmit messages to the data plane within the provider-owned service tenancy. These messages can include data gathered by an agent, e.g., by monitoring and/or querying a corresponding compute instance within which the agent is operational. The agent can be of any appropriate type. In one example, the agent is a workload protection agent. In such an example, such an agent is configured to ping the data plane (or another component within the service tenancy) for a list of queries to run, although the agent may be preconfigured with such a list of queries in another example. The agent conducts the queries on the corresponding compute instance, and reports any query results back to the data plane using one or more messages. The data plane and/or one or more other downstream services are configured to receive such query results, and perform data processing and security analysis thereon.

In an example, each of one or more such messages further include metadata associated with (i) the agent transmitting the message, and (ii) the compute instance within which the agent operates. The data plane and the agent monitoring service relies on these messages to monitor the agents within the compute instances of the service tenancy. Example of such metadata derived from a message include one or more of (i) a version of the agent transmitting the message, (ii) a platform type of the agent and the compute instance, (iii) an identifier of the agent, (iv) an identifier of the compute instance, (v) an identifier of the customer tenancy, (vi) an identifier of a compartment including the compute instance, and/or (vii) a timestamp of when message is received at the data plane (or a timestamp of when the message was transmitted by the agent). In an example, the data plane updates an "instance information table" to include the metadata received from the messages from various agents. For example, each time a message is received, the data plane updates the instance information table.

As also described above, a compute instance being "enabled" implies that the compute instance is authorized, instructed, requested, and/or should have one or more agents installed therewithin. This doesn't necessarily mean that the enabled compute instance actually has the agents installed and/or operational. Enablement of a compute instance have been described herein above, and also described below.

In an example, the service tenancy (such as an enabled instance update service within the service tenancy) maintains and periodically updates a list of enabled compute instances. The list may include enabled compute instances within one or more customer tenancies at a given point in time, as described below in further detail.

In an example, to verify whether an agent is installed within a compute instance that is enabled to include the agent, the agent monitoring service compares (i) compute instances listed in the list of enabled compute instances and (ii) the compute instances identified by the instance information table. Note that the instance information table identifies agents from which at least one message has been received, and the corresponding compute instances. Thus, if an agent within a compute instance has sent at least one message, the compute instance is identified by the instance information table. The agent monitoring service identifies zero, one, or more agents that are listed in the list of enabled compute instances, but missing from the instance information table. If a compute instance is listed in the list of enabled compute instances but missing from the instance information table, this indicates that an agent within the compute instance should have sent one or more messages to the data plane, but the data plane hasn't received any message from the agent within the compute instance. This implies that the agent isn't installed within the agent, or is installed but isn't operating as intended (e.g., has failed to send any message to the data plane). Accordingly, the agent monitoring service generates a report identifying zero, one, or more compute instances that are enabled, yet doesn't have an agent installed therewithin (or an installed agent isn't operating as intended). In an example, the agent monitoring service also generates a request to install the agent with the identified compute instance(s).

Note that as described above, the data plane records a timestamp when a message from an agent is received by the data plane. In an example, the data plane maintains in the instance information table a timestamp of a most recent message received from each agent. Thus, such a timestamp is maintained for every agent from which a message has been received. To verify whether an agent installed within a compute instance is alive and operating as intended, the agent monitoring service identifies zero, one, or more compute instances of the cloud environment, where the agents within the identified compute instances are installed and have transmitted messages in the past, but have not transmitted any message for at least a threshold duration of time from the time of the identification. For example, for a given agent operating within a given compute instance, if at least threshold period of time has passed since a most recent message received timestamp, the compute instance is identified to have not transmitted any message for at least the threshold period of time. Accordingly, it can be inferred that the agent within the compute instance was installed in the past (because one or more messages were received form the agent in the past), but the agent isn't operating as intended for at least the threshold period of time. Accordingly, the agent monitoring service generates a report identifying zero, one, or more compute instances of the cloud environment, where the agents within the identified compute instances are installed and have transmitted messages in the past, but have not transmitted any message for at least a threshold duration of time from the time of the identification, and are likely not alive or operational. In an example, the agent monitoring service also generates a request to reinstall or update the agent with the identified compute instance(s).

In an example, to verify whether an agent installed within a compute instance is up-to-date (e.g., whether the agent has been updated to a minimum acceptable version), the agent monitoring service reads agent inventory information, which have been described herein above. Various platform types of an agent are identified in the agent inventory information. Also, for each platform type, the agent inventory information lists one or more acceptable versions of the agent. The "acceptable versions" of an agent is same as the above described "deployable versions" of an agent. Thus, an acceptable version of an agent is a current or recent version that can be deployed in a compute instance, e.g., to install or update the agent within the compute instance. In an example, the agent monitoring service accesses the instance information table and the agent inventory information, and generates an agent version status report. For example, the instance information table identifies platform type and version number of each installed agent in a plurality of compute instances. For a specific agent operating within a specific compute instance, the agent monitoring service compares (i) the installed version of the agent of the corresponding platform type, as identified by the instance information table and (ii) one or more acceptable versions of the agent of the corresponding platform type, as identified by the agent inventory information.

If the installed version of an agent of a platform type is older than the one or more acceptable versions of the agent of the corresponding platform type, the agent is identified as needing an update, and is included in the agent version status report. In an example, the agent version status report further identifies one or more memory locations from where agent object(s) corresponding to the acceptable version(s) are retrievable (agent objects have been described herein above). In an example, a request is generated to update the one or more agents within the identified one or more corresponding compute instances. In an example, the request is transmitted to the identified compute instance(s), and/or to a system administrator of the customer tenancy.

Thus, using these techniques, the agent monitoring service can one or more of (i) verify whether an agent is installed within a compute instance that is enabled to include the agent, (ii) verify whether an agent installed within a compute instance is alive and operating as intended, and/or (iii) verify whether an agent installed within a compute instance is up-to-date (e.g., whether the agent has been updated to a minimum acceptable version). Such monitoring of the agents and/or the instances are made possible by the metadata included in the messages sent by the agents to the data plane, which updates the instance information table each time a message is received. The messages are used to verify the installation, operation, and/or updating of the agents, and serve as "heartbeats" for the agents and the corresponding compute instance. For example, by listening to such heartbeats, the agent monitoring service can monitor the agents and the corresponding compute instance.

In an example, the service tenancy including the data plane and the agent monitoring service may be managed and operated by one of (i) a provider of the cloud environment, or (ii) a security assurance administrator entrusted with monitoring of the agents within the customer tenancy. In an example, the security assurance administrator entrusted with monitoring of the agents within the customer tenancy may be the same as, or a subsidiary of, or employed by, and/or in agreement with, the provider of the cloud environment. The security assurance administrator is different from the cloud customer that rents the customer tenancy from the cloud provider, where the cloud customer manages and operates the compute instances within the customer tenancy. The security assurance administrator uses the monitoring services provided by the data plane and the agent monitoring service, to gain visibility on operations and the agents and/or the corresponding compute instances.

These agents may be used by the security assurance administrator to gain visibility on operations and the agents and/or the corresponding compute instances. Operations of the agents increase the security posture for the customer tenancy, as well as for cloud provider. Operations of the agents allow the security assurance administrator to assure that the cloud customer is abiding by restrictions imposed on it. Furthermore, the various verifications performed by the agent monitoring service, and resultant action taken by the agent monitoring service (such as generation of reports, and/or requests for installation, reinstallation, or updating of the agents) help in managing and ensuring proper operations of the agents within the compute instance. For example, this prevents or at least reduces chances of tampering or breakdown of agents within the compute instances. Given that the cloud provider and the security assurance administrator has limited visibility into customer tenancies, the above-described heartbeat design allows auditing of the agents from outside of the customer tenancy in which the compute instances are running, and taking appropriate remedial actions where anomalies are found.

Figure 10:
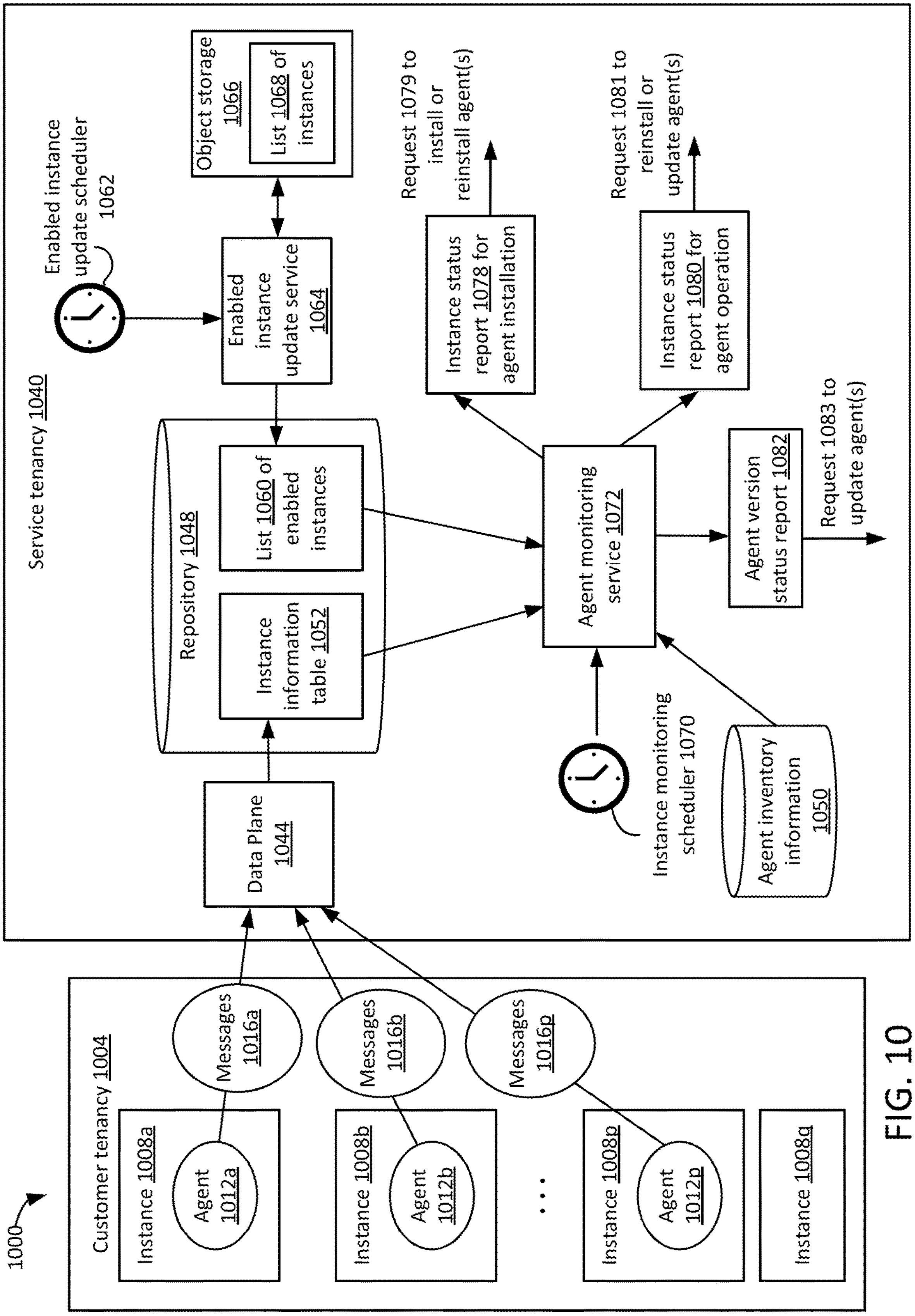
FIG. 10 illustrates a block diagram of a cloud environment in which an agent monitoring service monitors agents operating, or at least supposed to operate, within a plurality of compute instances of a customer tenancy of the cloud environment.

FIG. 10 illustrates a block diagram of a cloud environment 1000 in which an agent monitoring service 1072 monitors agents operating, or at least supposed to operate, within a plurality of compute instances 1008*a*, 1008*b*, . . . , 1008*p*, 1008*q* of a customer tenancy 1004 of the cloud environment 1000.

In FIG. 10, each of the compute instance 1008*a*, . . . , 1008*p*, 1008*q* is configured or enabled to execute an agent 1012 installed therewithin. For example, an agent 1012*a* operates within the compute instance 1008*a*, an agent 1012*b* operates within the compute instance 1008*b*, an agent 1012*p* operates within the compute instance 1008*p*, and so on. As illustrated, the agent 1012 is not installed within the compute instance 1008*q*.

Note that the agents 1012*a*, . . . , 1012*p* are of a same type of agent, and operate in a similar manner. Thus, the same type of agent 1012 is installed in the different compute instances 1008*a*, . . . , 1008*p* as agents 1012*a*, . . . , 1012*p*.

Merely as an example, each of the agents 1012*a*, . . . , 1012*p* may be a workload protection (WLP) agent configured to protect a workload of the corresponding compute instance. In another example, each of the agents 1012*a*, . . . , 1012*p* may be another appropriate type of agent. In any case, in an example, one or more functionalities performed by each of the agents 1012*a*, . . . , 1012*p* may be at least in part the same.

The agents 1012*a*, . . . , 1012*p* are generally referred to herein as an agent 1012 in singular, and agents 1012 in plural. Reference to an agent 1012 may imply any of the agents 1012*a*, . . . , 1012*p* being executed within the compute instances 1008*a*, . . . , 1008*p* respectively, or the same type of agent that may be installed or ready for installation in any other compute instances.

Although a single type of agent 1012 is installed in each of the plurality of compute instances 1008*a*, . . . , 1008*p*, in another example, there may be more than one type of agents per compute instance 1008. The below description is generally directed towards monitoring a single type of agent 1012 in various compute instances 1008, but the principles of this disclosure may be applied to monitoring more than one agent in each compute instance, as will be appreciated based on this disclosure.

As also described above, a compute instance being "enabled" implies that the compute instance is authorized, instructed, requested, and/or should have one or more agents installed therewithin. This doesn't necessarily mean that the enabled compute instance actually has the agents installed.

In an example, a customer tenancy or a compartment within a tenancy may have associated pre-defined rules to enable all or at least some compute instances within the tenancy or the compartment. A compartment within a tenancy is a logical group of cloud resources within the tenancy. Thus, a compartment may include one or more compute instances of the tenancy. Appropriate rules regarding enablement of the compute instances at the tenancy level and/or at the compartment level may be predefined.

For example, each of the compute instances 1008*a*, . . . , 1008*q* may be enabled to have the agent 1012. However, in an example, the compute instance 1008*q* may not have the agent 1012 installed therewithin, as illustrated in FIG. 10. In another example, the compute instance 1008*q* is enabled and the agent 1012 is installed within the compute instance 1008*q*, but the agent 1012 is not operating as intended.

The agent 1012 not being installed in the enabled compute instance 1008*q* or not being operational as intended may be due to any appropriate reason, such as an error condition during the installation of the agent 1012 in the compute instance 1008*q*, a software bug within the compute instance 1008*q* and/or the agent, etc., which may contribute to the agent 1012 not being installed or not being operational as intended. In yet another example, a user of the compute instance 1008 may intentionally or unintentionally prevent installation and/or intended operation of the agent 1012 within the compute instance 1008*q*, or may have intentionally or unintentionally uninstalled the agent 1012 from the compute instance 1008*q*. Other reasons for the agent 1012 not being installed within the compute instance 1008*q* or not being operational as intended may also be possible.

As described below, the cloud environment 1000 (such as the agent monitoring service 1072) is configured to identify compute instances that are enabled to have the agent 1012 installed therewithin, and yet doesn't have the agent 1012 installed and operational therewithin, and is further configured to act to remedy such situations. Thus, as described below, the cloud environment 1000 is configured to identify that the compute instance 1008*q* is enabled, and yet doesn't have the agent 1012 installed and operational therewithin, and acts to cause the agent 1012 to be installed and operate within the compute instance 1008*q*.

Note that in FIG. 10, all the compute instances 108*a*, . . . , 108*r* are illustrated to be within a single customer tenancy 104. However, the principles of this disclosure are applicable to compute instances that are in different customer tenancies as well. The compute instances 1008*a*, . . . , 1008*q* may be within a single tenancy 1004 as seen in FIG. 1A, or may be distributed among two or more different customer tenancies.

Also, although not illustrated in FIG. 10, a tenancy includes one or more compartments, where each compartment includes one or more compute instances. Thus, a compute instance is within a compartment, which is within a tenancy. Enablement of compute instances may be defined at a compartment level, or at a tenancy level.

The cloud environment further includes a service tenancy 1040 different from the customer tenancy 1004. In an example, the service tenancy 1040 provides one or more services to the customer tenancy 1004. In an example, the service tenancy 1040 (or at least the agent monitoring service 1072 within the service tenancy) may be managed and operated by one of (i) a provider of the cloud environment 1000, or (ii) a security assurance administrator entrusted with monitoring of the agents 1012 within the customer tenancy 1004, or (iii) the customer who has rented the customer tenancy 1004 from the cloud provider. In an example, the security assurance administrator entrusted with monitoring of the agents 1012 within the customer tenancy 1004 may be the same as, or a subsidiary of, or employed by and in agreement with, the provider of the cloud environment 1000. The security assurance administrator is different from the cloud customer that rents the customer tenancy 1004 from the cloud provider, where the cloud customer manages and operates the compute instances 1008*a*, . . . , 1008*q* within the customer tenancy 1004.

The service tenancy 1040 includes a data plane 1044. The data plane 1044 receives one or more messages from each of the agents 1012*a*, . . . , 1012*p*. For example, the agent 1012*a* operating with the compute instance 1008*a* transmits one or more messages 1016*a* to the data plane 1044, the agent 1012*b* operating with the compute instance 1008*b* transmits one or more messages 1016*b* to the data plane 1044, the agent 1012*p* operating with the compute instance 1008*p* transmits one or more messages 1016*p* to the data plane 1044, and so on. Note that the compute instance 1008*q* doesn't transmit similar messages to the data plane 1044.

Figure 11:
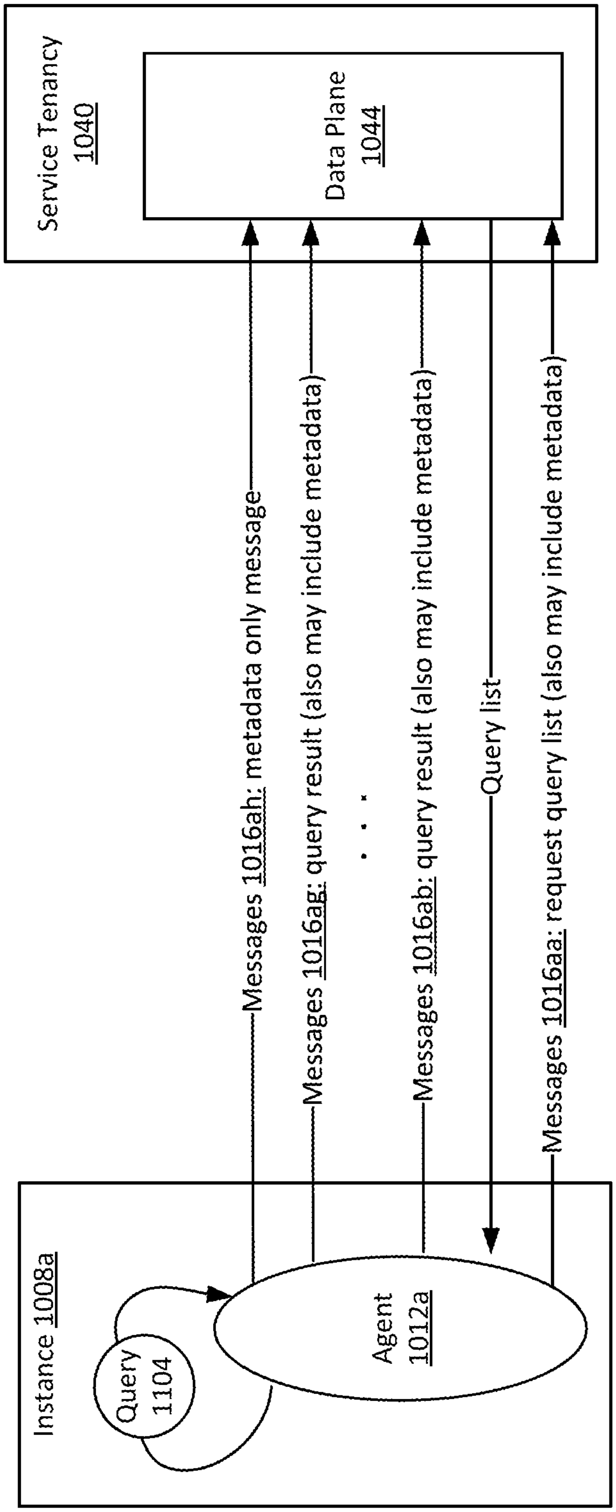
FIG. 11 illustrates an operation of an agent operating within a compute instance of a cloud environment.

FIG. 11 illustrates an operation of the agent 1012*a* operating within the compute instance 1008*a* of the cloud environment 1000. Operation of the other agents 1012*b*, . . . , 1012*p* may be at least in part similar to the operation of the agent 1012*a* described with respect to FIG. 11 (e.g., as the agents 1012*a*, . . . , 1012*p* are of the same type).

In an example, the agent 1012*a* acts as a query agent, to implement a query service at the compute instance 1008*a*. For example, the agent 1012*a* reads a list of queries to perform on the compute instance 1008*a*. In an example, the list of queries may be preconfigured within the agent 1012*a*, and may be updated with each new update of the agent 1012*a*. In another example, the agent 1012*a* receives the list of queries from the data plane 1044 (or from another component within the service tenancy 1040). For example, as illustrated in FIG. 11, the agent 1012*a* transmits a message 1016*aa* to the data plane 1044 requesting a list of queries to perform on the compute instance 1008*a*. The data plane 1044 in response transmits the query list to the agent 1012*a*.

The agent 1012*a* queries the compute instance 1008*a*, labeled symbolically as "query 1104" in FIG. 11. In an example, the query of the compute instance 1008*a* by the agent 1012*a* may be in the form of Osquery®, or another appropriate form of query. In an example, the Osquery® is an open-source query program that is supported by Windows®, MacOS®, Linux OS®, and/or other OSs. In an example, the query may be repeated at periodic or aperiodic intervals.

The nature of the query can vary from one implementation to the next, and may include querying about security related information associated with the compute instance 1008*a*, querying about operations of the compute instance 1008*a*, querying about information related to protecting an integrity of the compute instance 1008*a*, and/or the like.

The agent 1012*a* collets information about the compute instance 1008*a* through such queries, and transmits the collected information (e.g., query results) via one or more messages 1016*ab*, . . . , 1016*ag* to the data plane 1044. For example, the agent 1012*a* periodically queries the compute instance 1008*a*, and transmits the query result from using the messages 1016*ab*, . . . , 1016*ag*. For example, the message 1016*ab* includes information from a first query, the message 1016*ac* includes information from a second query, and so on. The messages 1016*aa*, 1016*ab*, . . . , 1016*ag* are part of the messages 1016*a* illustrated in FIG. 10.

In an example, one or more (or each) the messages 1016*aa*, . . . , 1016*ag* may also include metadata about the agent 1012*a* and/or the compute instance 1008*a*. In an example, the query results and the metadata may be transmitted separately (e.g., in separate messages) by the agent 1012*a*. In another example, the query results and the metadata may be bundled in common message(s), such as the messages 1016*ab*, . . . , 1016*ag*.

In an example, in addition to the messages 1016*aa*, . . . , 1016*ag*, the agent 1012*a* may also transmit metadata only message 1016*ah* to the data plane 1044. Thus, such a message 1016*ah* may lack information gathered from querying the compute instance 1012*a*. The message 1016*ah* may be part of the messages 1016*a* illustrated in FIG. 10.

Thus, FIG. 11 illustrates three types of messages from which the data plane 1044 can periodically receive metadata from the agent 1012*a*: (i) message 1016*aa* that pings the data plane 1044 for a query list, and also includes metadata, (ii) messages 1016*ab* that includes query results, and also includes metadata, and (iii) metadata only message 1016*ah* that lacks any query results.

In an example, the query results are received by the data plane and transmitted to a query analysis service of the service tenancy 1040, where the query analysis service are not illustrated in FIG. 10. The query analysis service analyzes the query results, to gain visibility on an operation of the compute instance 1008*a*. For example, the query analysis service analyzes the query results, to detect anomalous characteristics of operation of the compute instance 1080*a*, such as any security related or another pre-agreed rule violation by the compute instance 1080*a*, any malicious activity undertaken by the compute instance 1080*a*, any suspicious software being executed by the compute instance 1080*a*, and/or any other suspicious activity performed by the compute instance 1080*a*.

Thus, the data plane 1044 receives periodic or aperiodic messages from the agent 1012*a*, where one or more such messages also include metadata about the agent 1012*a* and/or the compute instance 1008*a*. Example of such metadata include one or more of (i) a version of the agent 1012*a*, (ii) a platform type of the agent 1012*a* and the compute instance 1008*a*, (iii) an identifier of the agent 1012*a*, (iv) an identifier of the compute instance 1008*a*, (v) an identifier of the customer tenancy 1004, (vi) an identifier of a compartment including the compute instance 1008*a*, and/or (vii) a timestamp of each message, e.g., as described below with respect to FIG. 12.

Although FIG. 11 illustrates an example operation of the agent 1012*a*, the agent 1012*a* may operate in a different manner in another example.

Referring again to FIG. 10, in an example, the service tenancy 1040 also includes a repository 1048 that stores an instance information table 1052 and a list 1060 of enabled instances. FIG. 12 illustrates an example instance information table 1052 (also referred to herein as table 1052) that is updated by the data plane 1044, based on receiving messages 1016 from a plurality of agents 1012*a*, . . . , 1012*p* operating with a corresponding plurality of compute instances 1008*a*, . . . , 1008*p*.

In an example, the data plane 1044 populates and updates the table 1052 based on metadata included in each of the messages 1016*a*, . . . , 1016*p*. In an example, the data plane 1044 updates the table 1052 each time a message 1016 is received by the data plane 1044 from any of the agents 1012*a*, . . . , 1012*p*. Table 1052 illustrates some example fields, and a higher or a smaller number of fields can be included in the table 1052.

For example, the table 1052 stores, in each row of the table 1052, one or more of: (i) an ID of an agent 1012 from which a message 1016 is received by the data plane 1044, (ii) a platform type and a version number of the installed agent, (iii) an identifier of a compute instance including the transmitting agent 1012, (iv) a compartment ID in which the compute instance is included, (v) an identifier of a tenancy in which the compute instance is included, and/or (vi) a timestamp of a most recent message received from the agent. For example, referring to the first row of the table 1052, one or more messages have been received from an agent having an agent ID of Agent_ID_1012*a*, which corresponds to the agent 1012*a* of FIG. 10. The agent 1012*a* has a platform type 1206*a* (where platform type has been described herein above), and a version number of the installed agent 1012*a* for this platform type is 2.5. The ID of the compute instance including this agent is Instance_ID_1008*a*, which corresponds to the compute instance 1008*a* of FIG. 10. A compartment ID including the compute instance and a tenancy ID including the compartment are also included in the table 1052.

Note that the various IDs within the table 1052 (and various other tables, reports, and other description presented herein) are merely symbolic in nature, and an actual ID in a practical implementation may be different from the IDs presented herein.

Also included in the table 1052 is a timestamp of a most recent message received from an agent. Merely as an example, the most recent message received from the agent 1012*a* is at 9:05 AM, Mar. 14, 2024, see first row of the table 1052. Thus, the last message (which is the most recent message) received from this agent was at 9:05 AM, Mar. 14, 2024. If another message is received from this agent, the timestamp is updated accordingly. Thus, the table 1052 identifies compute instances from which messages have been received, as well as a timestamp of a last received message from each agent.

FIG. 13 illustrates a list 1060 of currently enabled compute instances within the cloud environment 1000 of FIG. 11. In an example, the list 1060 may include enabled compute instances within only the customer tenancy 1004. In another example, the list 1060 may include enabled compute instances within the customer tenancy 1004, as well as one or more other customer tenancies within the cloud environment 1000.

As illustrated in FIG. 13, each row of the list 1060 includes an identifier of an enabled compute instance, an identifier of a compartment within which the enabled compute instance resides, and an identifier of a tenancy within which the enabled compute instance resides. For example, the first row of the list 1060 identifies the compute instance 1008*a* by its identifier Instance_ID_1008*a*, the identifier Comp_ID_x of a compartment including the compute instance 1008*a*, the identifier Tenant_ID_1004 of the customer tenancy 1004 including the identified compartment and the compute instance 1008*a*. In an example, the list 1060 also stores, for each identified compute instance, a timestamp of when the compute instance was created.

Referring again to FIG. 10, the list 1060 is stored in the repository 1048, and generated by an enabled instance update service 1064. In an example, the enabled instance update service 1064 accesses an object storage 1066 storing another list 1068 of cloud resources within the cloud environment 1000 (or within the tenancy 1004 of the cloud environment 1000). The list 1068 of cloud resources includes compute instances, where individual compute instance listed by the list 1068 may or may not be enabled. The enabled instance update service 1064 checks whether each compute instance within the list 1068 is enabled, and stores identifiers of all enabled compute instances from the list 1068 to the list 1060. In an example, the enabled instance update service 1064 filters out the non-enabled compute instances from the list 1068, and stores the remaining enabled compute instances within the list 1060. Thus, the compute instances identified by the list 1064 is a subset of the cloud resources identified by the list 1068.

In an example, a cloud customer of a tenancy or a compartment within a tenancy may have defined a rule to enable all or at least some compute instances within the tenancy or the compartment. A compartment within a tenancy is a logical group of cloud resources within the tenancy. Thus, a compartment may include one or more compute instances of the tenancy. Appropriate rules regarding enablement of the compute instances at the tenancy level and/or at the compartment level may be preconfigured and known to the enabled instance update service 1064, using which the enabled instance update service 1064 may select the enabled instances and may store the corresponding identifiers in the list 1060.

In an example, the enabled instance update service 1064 receives an identifier of a compartment or a tenancy, wherein the compartment or the tenancy has a rule stating that all (or some) compute instances within the compartment or the tenancy is enabled (in other words, the compartment or the tenancy is enabled). Accordingly, the enabled instance update service 1064 updates the list 1060, to include identifiers of compute instances within the enabled compartment or the tenancy.

In an example, an enabled instance update scheduler 1062 requests or causes the enabled instance update service 1064 to update the list 1060 at periodic or aperiodic intervals. For example, the enabled instance update scheduler 1062 maintains a timer, and each time the timer reaches a threshold time, the enabled instance update scheduler 1062 resets the timer and causes the enabled instance update service 1064 to update the list 1060. For example, the enabled instance update service 1064 may update the list 1060 every hour, every 6 hours, every 12 hours, or every 24 hours, or every 48 hours, or at another appropriate time interval.

The service tenancy 1040 further includes an agent monitoring service 1072. The agent monitoring service 1072 monitors the table 1052 and the list 1060, to generate an instance status report 1078 for agent installation. As described below, the instance status report 1078 identifies zero, one, or more compute instances of the cloud environment 1000 that are enabled, but doesn't have the agent 1012 installed therewithin.

In further detail, the agent monitoring service 1072 generates the instance status report 1078 for agent installation by comparing the table 1052 (see FIG. 12) with the list 1060 (see FIG. 13). For example, the table 1052 identifies a plurality of compute instances, where each agent installed within each of the plurality of computing instances of the table 1052 has sent one or more messages to the data plane 1044. Thus, for each of the compute instances identified by the table 1052, the agent 1012 is installed therewithin (e.g., as the installed agent has sent at least one message to the data plane 1044, based on which the agent and the associated compute instance is identified by the table 1052).

Furthermore, the list 1060 identifies compute instances which are enabled to include the agent 1012. Thus, the list 1060 is a list of compute instances in which the agent 1012 should be installed and operational.

The agent monitoring service 1072 identifies zero, one, or more agents that are listed in the list 1060, but missing from the table 1052. For example, the compute instance 1008*q* (having an instance ID of Instance_ID_1008*q*) is listed in the list 1060 of FIG. 13, but missing in the table 1052 of FIG. 12. Also see FIG. 10, in which the agent 1012 is not shown to be installed within the compute instance 1008*q*, and the compute instance 1008*q* doesn't transmit any message 1016 to the data plane 1044. Accordingly, for the example of FIG. 10, the agent monitoring service 1072 identifies the compute instance 1008*q* as being enabled to have the agent 1012 installed, but the data plane 1044 hasn't received any message from an agent within the compute instance 1008*q*. Thus, it can be inferred that either the compute instance 1008*q* doesn't have the agent 1012 installed therewithin, or an installed agent within the compute instance 1008*q* isn't operating as intended (e.g., hasn't transmitting any message to the data plane 1044). Accordingly, the agent monitoring service 1072 generates the instance status report 1078 for agent installation.

FIG. 14 illustrates an instance status report 1078 for agent installation, as generated by the agent monitoring service 1072. Continuing with the above example where the compute instance 1008*q* is enabled but hasn't transmitted any message to the data plane 1044, the instance status report 1078 identifies the instance ID of Instance_ID_1008*q* of the compute instance 1008*q*, along with the corresponding compartment ID and the tenancy ID. Thus, the instance status report 1078 identifies that the compute instance(s) listed in the report 1078 doesn't have an agent installed therewithin, or an installed agent is not operational as intended (e.g., has failed to transmit any message to the data plane 1044).

In an example, the instance status report 1078 also includes a timestamp identifying a time at which the listed compute instance(s) were created. A compute instance that was just created may not have sufficient time to install the agent, and/or for the agent to gather data and transmit a message to the data plane 1044. Accordingly, the agent monitoring service 1072 lists only those compute instances in the report 1078, which were created at least a threshold time before the time of generating the report 1078.

Merely as an example, it may be expected that within 6 hours of creation of a compute instance, the agent operating therewithin should transmit a message to the data plane. Accordingly, the threshold time may be set to at least 6 hours, and can be set to 12 hours, or 24 hours, or another appropriate time duration that is 6 hours or more. Accordingly, after at least threshold time from the creation of a specific compute instance, if the data plane 1044 doesn't receive any message from the compute instance, the agent monitoring service 1072 identifies the compute instance by comparing the table 1052 with the list 1060. Accordingly, the agent monitoring service 1072 reports the compute instance in the instance status report 1078, identifying that the agent either has not been installed within the compute instance, or the agent isn't operating as intended.

In an example, a request 1079 to install or reinstall the agent(s) in the compute instance(s) identified by the report 1078 is also generated. In an example, the request 1079 may be generated by the agent monitoring service 1072 along with the report 1078, or may be generated by another downstream service based on the report 1078. Thus, for the example report 1078 of FIG. 14, the request 1079 is for installing or reinstalling the agent 1012 within the compute instance 1008*q*. In an example, the request 1079 is transmitted to the compute instance 1008*q*, and/or to a system administrator of the customer tenancy 1004. The request 1079 is transmitted from the service tenancy 1040, such as by the agent monitoring service 1072 or by another downstream component within the service tenancy 1040.

Referring again to FIG. 10, the agent monitoring service 1072 further monitors the table 1052, to generate another instance status report 1080 for agent operation. As described below, the instance status report 1080 identifies zero, one, or more compute instances of the cloud environment 1000, where the agents 1012 within the identified compute instances are installed and have transmitted messages 1016 in the past, but have not transmitted any message for at least a threshold duration of time. For example, if at least threshold period of time has passed since a message has been received from an agent operating within a compute instance, the compute instance is identified by the instance status report 1080. Because no message has been received from the agent within the compute instance for at least the threshold period of time, it can be inferred that the agent within the compute instance isn't operating as intended.

For example, the table 1052 of FIG. 12 identifies the plurality of compute instances, as well as a timestamp for a most recent message received from an agent of each compute instance. The table 1052 also identifies a current date and time, which in the example of FIG. 12 is 11:30 AM, Mar. 15, 2024. As seen, the most recent message received from the agent 1012*a* (with agent ID Agent-ID_1012*a*) of the compute instance 1008*a* (with instance Instance-ID_1008*a*) was at 9:05 AM, Mar. 14, 2024. Thus, more than 24 hours have elapsed since the last message was received from the agent 1012*a* of the compute instance 1008*a*. If the threshold period of time for generating the report 1080 is 24 hours, the agent monitoring service 1072 generates the instance status report 1080 indicating that no messages have been received from the agent 1012*a* of the compute instance 1008*a* for at least the threshold period of time, which in this example is set to 24 hours.

FIG. 15 illustrates the instance status report 1080 for agent operations, in which one or more compute instances are identified, wherein no messages have been received by the data plane 1044 from agents operating within the identified compute instances for at least a threshold period of time.

The threshold period of time in the example of FIG. 15 is set to 24 hours. In an example, the threshold period of time is configurable, and may be set based on a criticality of the agent and/or a frequency with which the agent is expected to transmit messages to the data plane. For example, assume that the report 1080 is to be generated for two different types of agents (or two different reports are to be generated for the two different types of agents). One of the two different types of agents may be the agent 1012 illustrated in FIG. 10, and another of the two different types of agents may be an agent not illustrated in FIG. 10. The two different types of agents may perform corresponding different functionalities. Assume that the first type of agent is configured to transmit messages every hour, and the second type of agent is configured to transmit messages once every 24 hours. Accordingly, for the purpose of generation of the instance status report 1080 for agent operation, a first threshold period of time may be set for the first type of agent, and a second threshold period of time may be set for the second type of agent, where the first threshold period of time is smaller than the second threshold period of time. Merely as an example, the first threshold period of time may be set at 6 hours, and the second threshold period of time may be set at 48 hours. Thus, if no messages are received from the first type of agent within a first compute instance for at least 6 hours, the first type of agent within the first compute instance and/or the first compute instance may be reported in the report 1080. In contrast, if no messages are received from the second type of agent within a second compute instance for at least 48 hours, the second type of agent within the second compute instance and/or the second compute instance may be reported in the report 1080.

The example report 1080 of FIG. 15 lists, for each agent/instance pair identified in the report, the last message received timestamp from the agent within compute instance, a time at which the report is generated, and time elapsed from last received message (which is a difference between the current time and the time indicated by the last message received timestamp).

In an example, from the report 1080 it can be inferred that the agent was installed within the identified compute instance (because at least one message was received from the agent), but the agent within the compute instance isn't operating as intended. Accordingly, as illustrated in FIG. 10, a request 1081 is generated to reinstall or update the agent within the compute instance identified by the report 1080.

In an example, the request 1081 may be generated by the agent monitoring service 1072 along with the report 1080, or may be generated by another downstream service based on the report 1080. Thus, for the example report 1080 of FIG. 15, the request 1081 is for reinstalling or updating the agent 1012*a* within the compute instance 1008*a*. In an example, the request 1081 is transmitted to the compute instance 1008*a*, and/or to a system administrator of the customer tenancy 1004. The request 1081 is transmitted from the service tenancy 1040, such as by the agent monitoring service 1072 or by another downstream component within the service tenancy 1040.

Referring again to FIG. 10, in an example, in addition to (or instead of) the reports 1078 and/or 1080, the agent monitoring service 1072 further generates an agent version status report 1082. The agent version status report 1082 indicates if zero, one, or more agents 1012 within corresponding compute instances 1008 have to be updated to one of one or more current or acceptable versions for the agent 1012.

Note that in the cloud environment 100 of FIGS. 1A-1B described above, individual compute instances determine if an agent operating therewithin has to be updated. In contrast, in the cloud environment 1000 of FIG. 10, the centrally located agent monitoring service 1072 within the service tenancy 1040 monitors the plurality of compute instances 1008*a*, . . . , 1008*p*, and determines if an agent operating within one or more of the monitored compute instances have to be updated.

In an example, a combined system can implement the teachings of both the cloud environments 100 and 1000 of FIGS. 1A-1B and FIG. 10, respectively. For example, each compute instance may keep track of whether any agent installed therewithin has to be updated, as described above with respect to the cloud environment 100. Additionally (or alternatively), the agent monitoring service 1072 also monitors the compute instances, and determines if an agent operating within one or more of the monitored compute instances have to be updated, e.g., in case a compute instance fails to identify if an agent has to be updated. This results in a fail-safe backup, where both the compute instances and the agent monitoring service 1072 keep track of agents that need updating, in an example. For example, if a user (or a hacker) of a compute instance intentionally (e.g., with malicious purpose) or unintentionally prevents a compute instance from installing or updating its agents, the agent monitoring service 1072 will identify such rouge compute instances, and generate reports about such compute instances. However, in another example, the cloud environment 1000 of FIG. 10 works differently and independently from the cloud environment 100 of FIGS. 1A-1B.

In an example, to generate the agent version status report 1082, the agent monitoring service 1072 accesses an agent inventory information 1050 stored in a repository within the service tenancy 1040, or otherwise accessible to the agent monitoring service 1072. The agent inventory information 1050 can be same as, at least in part be similar to the above-described agent inventory information 105 of FIG. 2.

FIG. 16 illustrates an example agent inventory information 1050 that is read by the agent monitoring service 1072 of FIG. 10. Note that while the agent inventory information 105 of FIG. 2 was for multiple types of agents 116*a*, . . . , 116*n*, the example agent inventory information 1050 of FIG. 16 is for a single type of agent 1012. The agent inventory information 1050 of FIG. 16 can be expanded to include various other types of agents as well. Although the format of the agent inventory information 105 and the agent inventory information 1050 are different, they both represent at least in part same type of information, and can be used interchangeably.

Referring to FIG. 16, the agent inventory information 1050 is specifically for the agent type 1012, as also described above. Various platform types for the agent 1012 is identified in the agent inventory information 1050, such as platform types 1206*a*, 1206*b*, and 1206*c*. Each platform type of the agent 1012 is compiled for a corresponding OS. Merely as an example, the platform type 1206*a* may be for Windows® OS, the platform type 1206*a* may be for MacOS®, or so on.

Also, for each platform type, the agent inventory information 1050 lists one or more acceptable versions of the agent 1012. The "acceptable versions" of an agent is same as the above described "deployable versions" of an agent. Thus, an acceptable version of an agent is a current or recent version that can be deployed in a compute instance, e.g., to install or update the agent within the compute instance.

For example, for the platform type 1206*a*, versions 2.5 and 3.0 are acceptable versions; for the platform type 1206*b*, version 3.0 is an acceptable version; and for the platform type 1206*c*, version 3.0 is an acceptable version. Note that the version 3.0 of the platform type 1206*a* and the version 3.0 of the platform type 1206*b* and different, as these are compiled for two different platforms.

Referring again to FIG. 10, in an example, the agent monitoring service 1072 accesses the table 1052 and the agent inventory information 1050, and generates the agent version status report 1082. For example, as illustrated in FIG. 12, the table 1052 identifies platform type and version number of each installed agent in a plurality of compute instances. In an example, each message 1016 comprises metadata identifying a platform type of the agent transmitting the message, and a version number of the agent. The data plane 1044, upon receiving a message 1016, updates the table 1052 to include the agent platform type and the version number. Thus, for example, the table 1052 of FIG. 12 identifies version 2.5 of platform type 1206*a* for the agent 1012*a* that is installed and operating within the compute instance 1008*a*; version 2.5 of platform type 1206*a* for the agent 1012*b* that is installed operating within the compute instance 1008*b*; version 2.0 of platform type 1206*b* for the agent 1012*c* that is installed operating within the compute instance 1008*c*; and so on.

For each agent operating within a compute instance, the agent monitoring service 1072 compares (i) the installed version of the agent of the corresponding platform type, as identified by the table 1052 and (ii) one or more acceptable versions of the agent of the corresponding platform type, as identified by the agent inventory information 1050. For example, referring to FIGS. 12 and 16, the agent 1012*a* operating in the compute instance 1008*a* has a platform type of 1206*a* (see FIG. 12), and versions 2.5 and 3.0 are acceptable for the agent of this platform type of 1206*a* (see FIG. 16). Also, the version 2.5 of the agent 1012*a* is installed in the compute instance 1008*a* (see FIG. 12). Accordingly, as the installed version of the agent 1012*a* matches with at least one of the acceptable versions for the platform type 1206*a*, the agent 1012*a* doesn't need updating. Although there is a more recent version 3.0 for the agent 1012*a* for the platform type 1206*a*, as the installed version 2.5 is also acceptable, an agent update is not needed. Similarly, the agents 1012*b* and 1012*p*, as indicated in FIGS. 12 and 16, don't need any updating.

In contrast, the agent 1012*c* operating in the compute instance 1008*c* has a platform type of 1206*b* (see FIG. 12), and version 3.0 is acceptable for the agent of this platform type of 1206*b* (see FIG. 16). Also, version 2.0 of the agent 1012*c* is installed within the compute instance 1008*c* (see FIG. 12). Accordingly, the installed version 2.0 of the agent 1012*c* is lower than the minimum acceptable version 3.0 for the platform type 1206*c*, and hence, the agent 1012*c* needs updating, e.g., from the version 2.0 to the version 3.0 of the platform type 1206*c*.

In an example, the agent monitoring service 1072 generates the agent version status report 1082, which identifies zero, one, or more agents 1012 within corresponding compute instances 1008 that need updating. FIG. 17 illustrates an agent version status report 1082 generated by the agent monitoring service 1072, wherein the agent version status report 1082 identifies zero, one, or more agents 1012 within corresponding compute instances 1008 that need updating. Referring to FIGS. 12, 16, and 17, the agent version status report 1082 identifies the agent 1012*c* (e.g., identifies the agent ID Agent-ID_1012*c*) and identifies the compute instance 1008*c* (e.g., identifies instance ID Instance-ID_1008*c*). The agent version status report 1082 further identifies the platform type and the currently installed version of the agent 1012*c* within the compute instance 1008*c* (e.g., platform type 1206*b*, version 2.0). The agent version status report 1082 further identifies one or more acceptable versions of the agent for this platform type (platform type 1206*b*, version 3.0). Thus, the agent version status report 1082 identifies that the agent 1012*c* has to be updated from version 2.0 to version 3.2.

In an example, the agent version status report 1082 further identifies one or more memory locations from where the agent object(s) corresponding to the acceptable version(s) are retrievable, as illustrated in FIG. 17. Including within an agent inventory information one or more memory locations from where agent objects are retrievable, as illustrated in FIG. 17, have also been described herein above with respect to FIG. 2.

In an example, a request 1083 is generated to update one or more agents within one or more corresponding compute instances. In an example, the request 1083 may be generated by the agent monitoring service 1072 along with the report 1082, or may be generated by another downstream service based on the report 1082. Thus, for the example report 1082 of FIG. 17, the request 1083 is for updating the agent 1012*c* within the compute instance 1008*c* from version 2.0 to version 3.0 of the platform type 1206*b*. In an example, the request 1083 is transmitted to the compute instance 1008*c*, and/or to a system administrator of the customer tenancy 1004. The request 1083 is transmitted from the service tenancy 1040, such as by the agent monitoring service 1072 or by another downstream component within the service tenancy 1040.

In an example, the request 1083 also includes identifiers of one or more memory locations from where the agent object(s) corresponding to the acceptable version(s) are retrievable. This facilitates the compute instances to read the memory locations, and download the agent objects from the identified memory locations.

Figure 18:
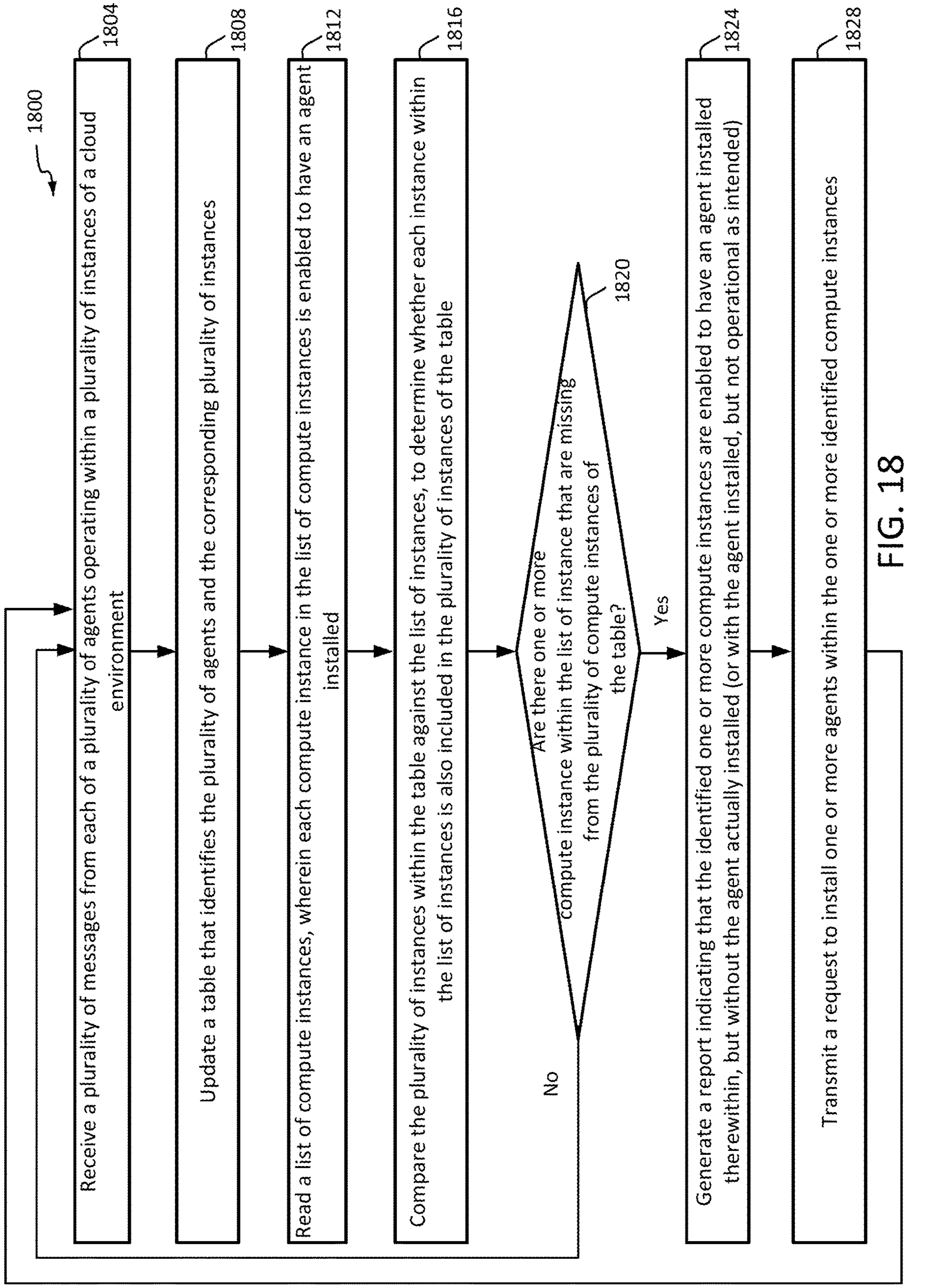
FIG. 18 is a flow diagram depicting a method for (i) identifying zero, one, or more compute instances that are enabled to have an agent installed therewithin, and yet doesn't have the agent installed or operational therewithin, and (ii) transmitting a request to install (or reinstall) the agent within the identified compute instances.

FIG. 18 is a flow diagram depicting a method 1800 for (i) identifying zero, one, or more compute instances that are enabled to have an agent installed therewithin, and yet doesn't have the agent installed or operational therewithin, and (ii) transmitting a request to install (or reinstall) the agent within the identified compute instances.

The method 1800 includes, at 1804, receiving a plurality of messages from each of a plurality of agents operating within a plurality of instances of a cloud environment. For example, referring to FIG. 10, the data plane 1044 receives messages 1016*a*, . . . , 1016*p* from the agents 1012*a*, . . . , 1012*p* operating within the compute instances 1008*a*, . . . , 1008*p* of the cloud environment 1000.

The method 1800 proceeds from 1804 to 1808. At 1808, a table is updated, where the table identifies the plurality of agents from which the messages are received, and the corresponding plurality of instances. For example, the above-described table 1052 identifies the plurality of agents 1012*a*, . . . , 1012*p* from which the messages are received, and the corresponding plurality of compute instances 1008*a*, . . . , 1008*q*. The data plane 1044 updates the table each time the data plane 1044 receives a message.

The method 1800 proceeds from 1808 to 1812. At 1812, a list of compute instances is read, wherein each compute instance in the list of compute instances is enabled to have an agent installed. In an example, the agent monitoring service 1072 reads the list 1060 of enabled compute instances.

The method 1800 proceeds from 1812 to 1816. At 1816, the plurality of instances within the table is compared against the list of instances, to determine whether each instance within the list of instances is also included in the plurality of instances of the table. For example, the agent monitoring service 1072 performs the comparison.

The method 1800 proceeds from 1816 to 1820. At 1820, a determination is made as to whether there are one or more compute instance within the list of instance that are missing from the plurality of compute instances of the table. For example, the agent monitoring service 1072 performs the determination, based on the comparison.

If "No" at 1820, no compute instance within the list of instance are identified, which are missing from the plurality of compute instances of the table. Thus, all enabled compute instances have the agent installed. Accordingly, the method 1800 loops back to 1804, where further messages are received, and the method is repeated in a loop.

If "Yes" at 1820, one or more enabled compute instances within the list of compute instance are identified, which are missing from the plurality of compute instances of the table. Accordingly, the method 1800 proceeds from 1820 to 1824. At 1824, a report is generated, where the report indicates that the identified one or more compute instances are enabled to have an agent installed therewithin, but without the agent actually installed within the compute instances (or with the agent installed, but not operational as intended). For example, the report 1078 of FIG. 14 identifies an instance 1008*q* that is enabled, but either doesn't have the agent 1012 installed therewithin, or has the agent installed therewithin but the agent isn't operating as intended (e.g., isn't transmitting any message to the data plane).

The method 1800 proceeds from 1824 to 1828. At 1828, a request is transmitted to install one or more agents within the one or more identified compute instances. In an example, such a request 1079 may be generated by the agent monitoring service 1072, or may be generated by another downstream service based on the report 1078. In an example, the request 1079 is transmitted to the identified compute instances, and/or to a system administrator of the customer tenancy including the identified compute instances. The request 1079 is transmitted from the service tenancy 1040, such as by the agent monitoring service 1072 or by another downstream component within the service tenancy 1040.

The method 1800 loops back from 1828 to 1804, where further messages are received, and the method 1800 is repeated in a loop.

Figure 19:
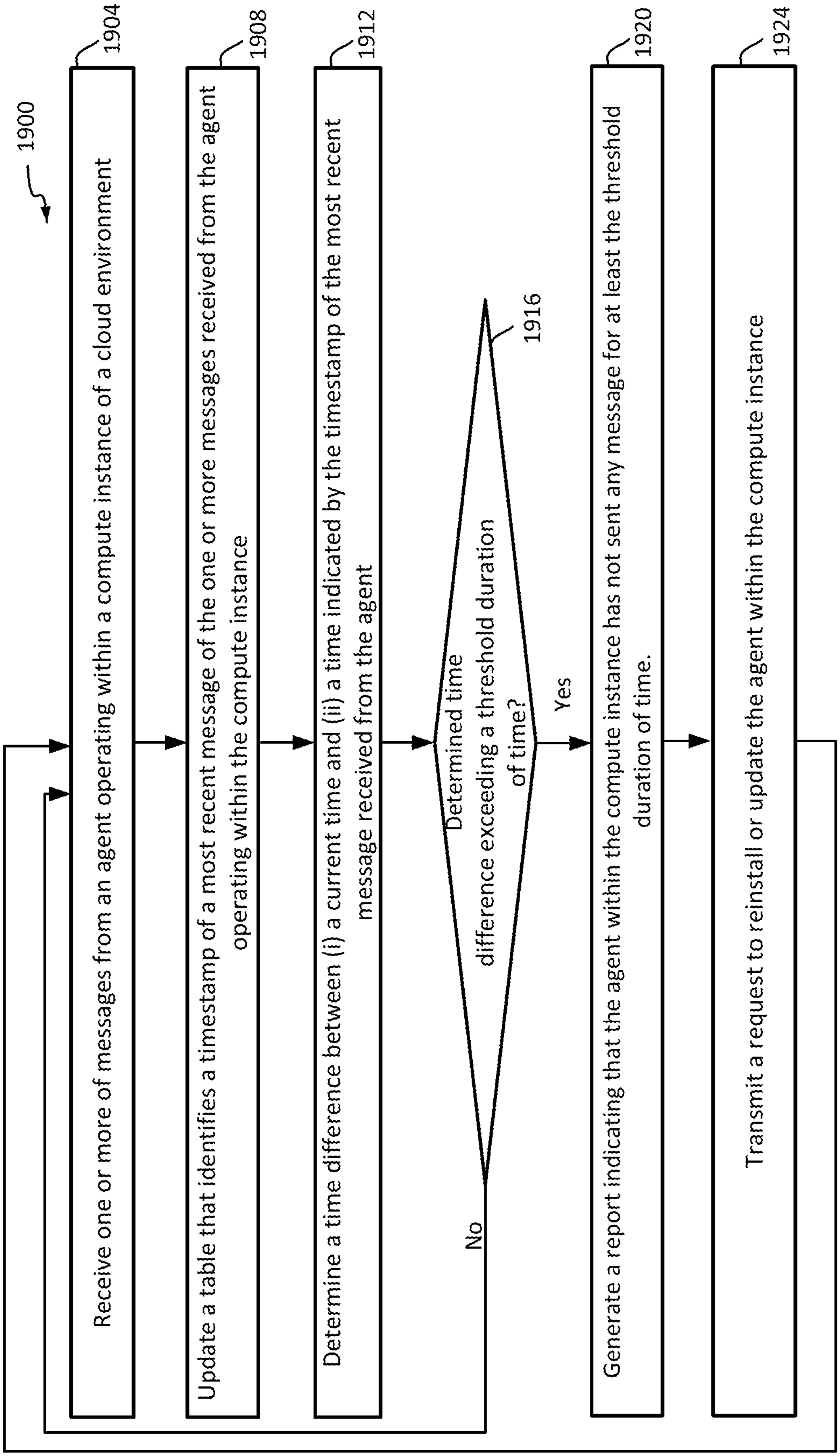
FIG. 19 is a flow diagram depicting a method for identifying whether a compute instances has an agent installed therewithin, but no message has been received from the agent operating within the compute instance for at least a threshold period of time, thereby implying that the installed agent may currently be non-operational.

FIG. 19 is a flow diagram depicting a method 1900 for identifying whether a compute instances has an agent installed therewithin, but no message has been received from the agent operating within the compute instance for at least a threshold period of time, thereby implying that the installed agent may currently be non-operational.

The method 1900 includes, at 1904, receiving one or more of messages from an agent operating within a compute instance of a cloud environment. For example, referring to FIG. 10, the data plane 1044 receives messages 1016*a* from an agent 1012*a* operating within a compute instance 1008*a* of the cloud environment 1000.

The method 1900 proceeds from 1904 to 1908. At 1908, a table is updated, wherein the table identifies a timestamp of a most recent message of the one or more messages received from the agent operating within the compute instance. In an example, the table, including the timestamp, is updated each time a message is received from the agent. Thus, the processes at 1904 and 1908 are performed iteratively (e.g., receive one or more messages, and update the table each time a message is received). For example, the data plane 1044 updates the table 1052, as described above with respect to FIGS. 10 and 12.

The method 1900 proceeds from 1908 to 1912. At 1912, a time difference is determined between (i) a current time and (ii) a time indicated by the timestamp of the most recent message received from the agent. For example, FIG. 12 illustrates the timestamps of the most recent messages received from various agents, and also illustrates the current time. In an example, the time difference is determined by the agent monitoring service 1072.

The method 1900 proceeds from 1912 to 1916. At 1916, a determination is made as to whether the determined time difference exceeds a threshold duration of time. As described above, the threshold duration of time may be configured based on factors like criticality of the agent, and/or a frequency with which the agent is expected to transmit messages.

If "No" at 1916, the last message from the agent was recently received (e.g., received within the threshold duration of time from the current time). Accordingly, the agent within the compute instance is operating as intended, such as transmitting messages as intended. Accordingly, the method 1900 loops back from 1916 to 1904, where further messages are received, and the method 1900 is repeated in a loop.

If "Yes" at 1916, then no messages have been received from the agent for at least the threshold duration of time from the current time. Accordingly, the method 1900 proceeds from 1916 to 1920. At 1920, a report is generated, where the report indicates that the agent within the compute instance has not sent any message for at least the threshold duration of time. This implies that the installed agent may currently be non-operational. In an example, the report may also specify that it is suspected that the agent may currently be non-operational.

The method 1900 proceeds from 1920 to 1924. At 1924, a request is transmitted to reinstall or update the agent within the compute instance. In an example, a request may be generated by the agent monitoring service 1072, or may be generated by another downstream service based on the report. In an example, the request is transmitted to the compute instance, and/or to a system administrator of the customer tenancy including the compute instance. The request is transmitted from the service tenancy 1040, such as by the agent monitoring service 1072 or by another downstream component within the service tenancy 1040.

The method 1900 loops back from 1924 to 1904, where further messages may be received (e.g., after the agent is reinstalled or updated), and the method 1900 is repeated in a loop.

Figure 20:
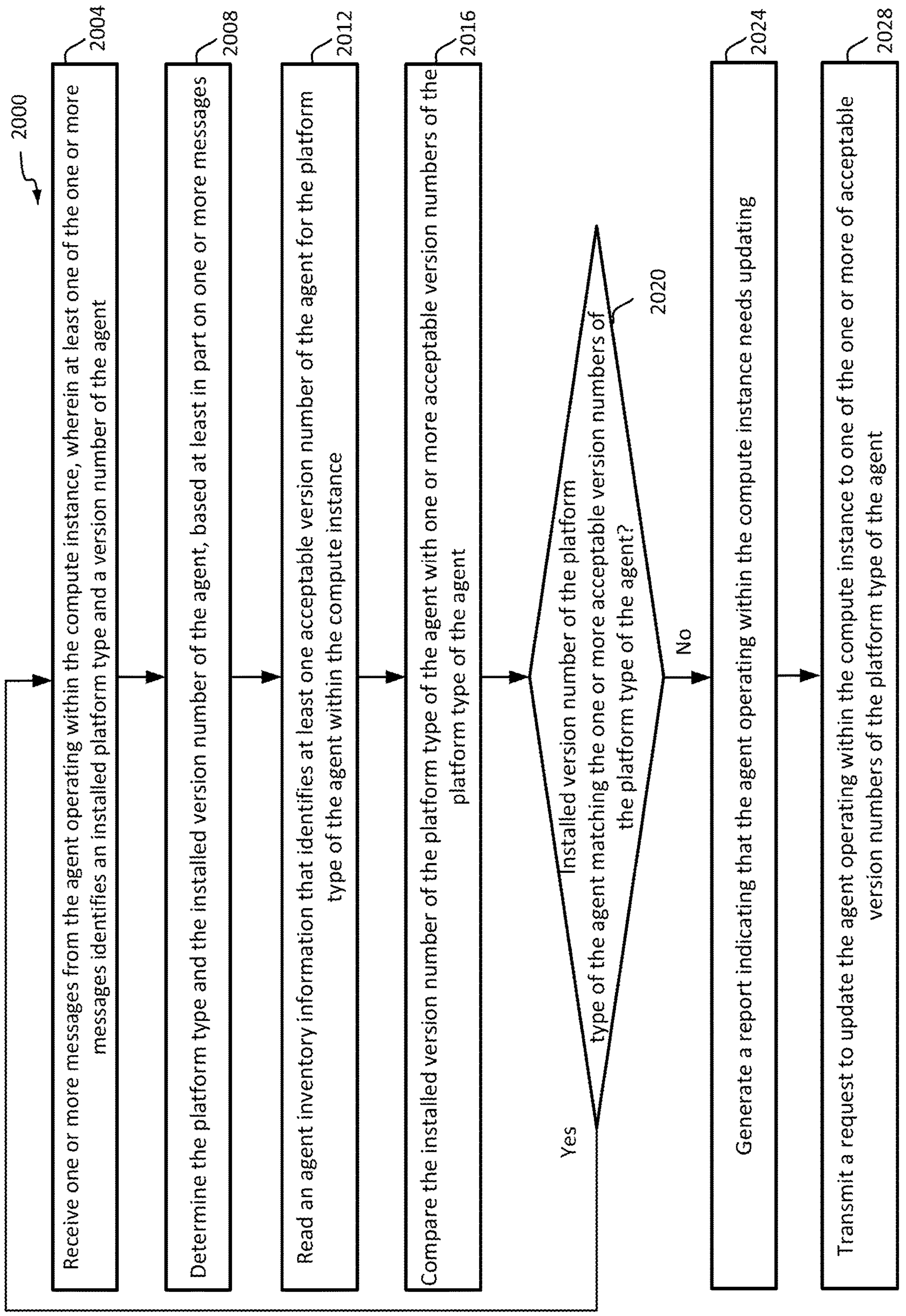
FIG. 20 is a flow diagram depicting a method for identifying whether an agent installed and operating within a compute instance has to be updated.

FIG. 20 is a flow diagram depicting a method 2000 for identifying whether an agent installed and operating within a compute instance has to be updated.

The method 2000 includes, at 2004, receiving one or more messages from the agent operating within the compute instance. In an example, at least one (such as all) of the one or more messages identifies an installed platform type and a version number of the agent. For example, referring to FIG. 10, the data plane 1044 receives messages 1016*c* from an agent 1012*c* operating within a compute instance 1008*c* of the cloud environment 1000, and one or more of the messages 1016*p* identify an installed platform type 1206*b* and a version number 2.0 of the agent 1012*c* (see FIG. 12).

The method 2000 proceeds from 2004 to 2008. At 2028, the platform type and the installed version number of the agent is determined, based at least in part on the one or more received messages. For example, the data plane 1044 updates the table 1052 storing the platform type 1206*b* and the installed version number 2.0 of the agent 1012*c*, see FIG. 12.

The method 2000 proceeds from 2008 to 2012. At 2012, an agent inventory information is read, where the agent inventory information identifies at least one acceptable version number of the agent for the platform type of the agent within the compute instance. For example, the agent inventory information 1050 of FIG. 16 identifies an acceptable version number 3.0 of the agent 1012 of the platform type 1206*b*.

The method 2000 proceeds from 2012 to 2016. At 2016, the installed version number of the platform type of the agent is compared with one or more acceptable version numbers of the platform type of the agent. In an example, the comparison is done by the agent monitoring service 1072.

The method 2000 proceeds from 2016 to 2020. At 2020, a determination is made as to whether the installed version number of the platform type of the agent matches the one or more acceptable version numbers of the platform type of the agent. For example, for the agent 1012*c* operating within the compute instance 1008*c*, the installed version number 2.0 of the platform type 1206*b* of the agent 1012*c* doesn't match the one or more acceptable version numbers 3.0 of the platform type 1206*b* of the agent, see FIGS. 12 and 16 for example.

If "Yes" at 2020, the installed agent in the compute instance has the acceptable or up-to-date version of the agent, and hence, no updating of the agent is needed. Accordingly, the method 2000 loops back from 2020 to 2004, where further messages are received, and the method 2000 is repeated in a loop.

If "No" at 2020, the version of the installed agent in the compute instance doesn't match with one or more acceptable versions of the agent of the platform type that corresponds to the platform type of the compute instance. Accordingly, the method 2000 proceeds from 2020 to 2024. At 2024, a report is generated, where the report indicates that the agent operating within the compute instance needs updating. FIG. 17 illustrates an example of such a report.

The method 2000 proceeds from 2024 to 2028. At 2024, a request is transmitted to update the agent operating within the compute instance to one of the one or more of acceptable version numbers of the platform type of the agent. In an example, such a request may be generated by the agent monitoring service 1072, or may be generated by another downstream service based on the report. In an example, the request is transmitted to the compute instance, and/or to a system administrator of the customer tenancy including the compute instance. The request is transmitted from the service tenancy 1040, such as by the agent monitoring service 1072 or by another downstream component within the service tenancy 1040. In an example, the request also includes identifiers of one or more memory locations from where the agent object(s) corresponding to the acceptable version(s) are retrievable. This facilitates the compute instance to read the memory locations, and download the agent object from the identified memory locations for updating the agent. The method 2000 loops back from 2028 to 2004, where further messages may be received, and the method 2000 is repeated in a loop.

Computer System Architecture

Figure 21:
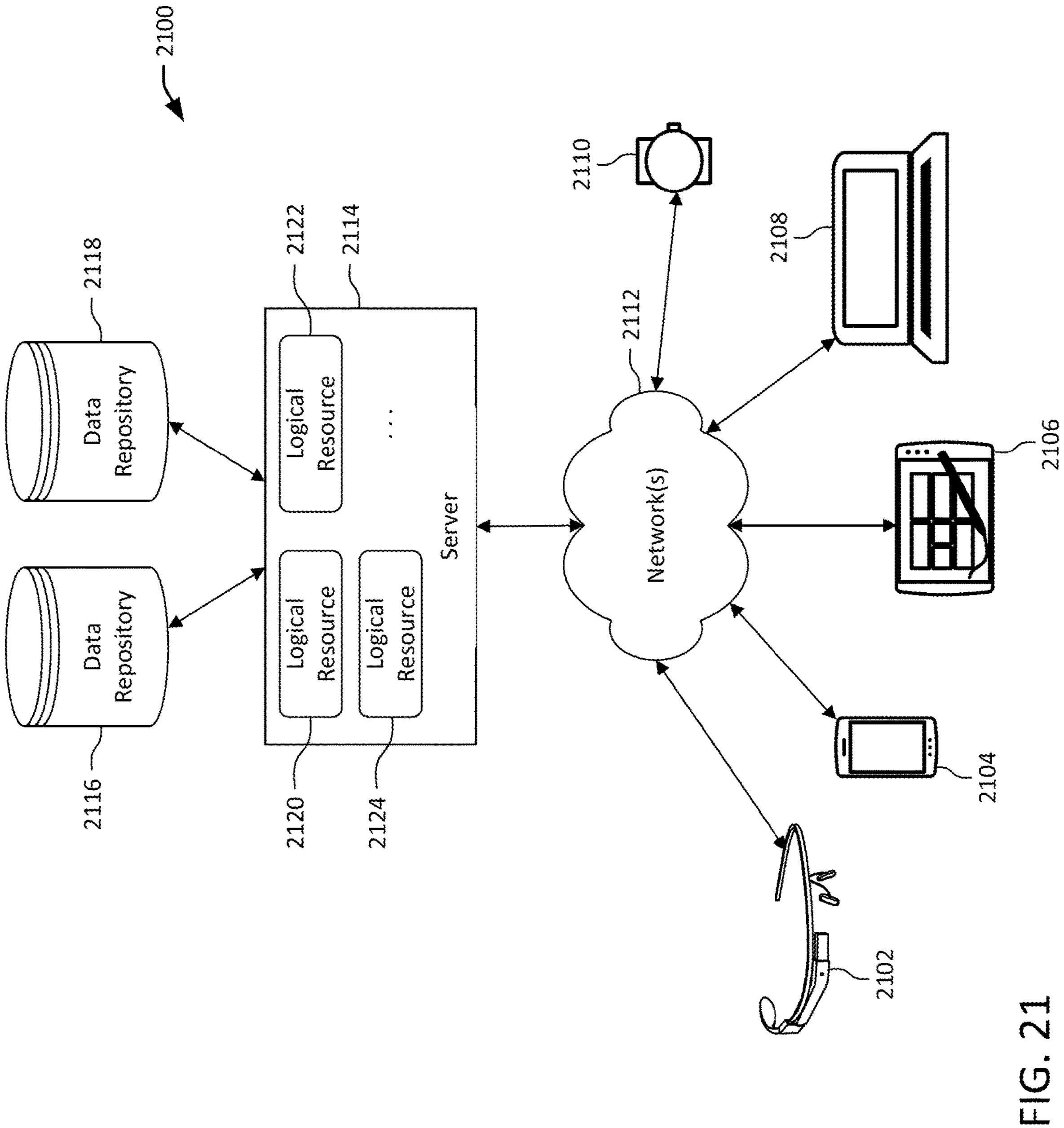
FIG. 21 depicts a simplified diagram of a distributed system for implementing certain aspects.

FIG. 21 depicts a simplified diagram of a distributed system 2100 for implementing an embodiment. In the illustrated embodiment, distributed system 2100 includes one or more client computing devices 2102, 2104, 2106, 2108, and/or 2110 coupled to a server 2114 via one or more communication networks 2112. Clients computing devices 2102, 2104, 2106, 2108, and/or 2110 may be configured to execute one or more applications.

In various aspects, server 2114 may be adapted to run one or more services or software applications that enable techniques for agent management in a cloud environment, and/or for monitoring instance heartbeat and taking actions, if needed.

In certain aspects, server 2114 may also provide other services or software applications that can include non-virtual and virtual environments. In some aspects, these services may be offered as web-based or cloud services, such as under a Software as a Service (SaaS) model to the users of client computing devices 2102, 2104, 2106, 2108, and/or 2110. Users operating client computing devices 2102, 2104, 2106, 2108, and/or 2110 may in turn utilize one or more client applications to interact with server 2114 to utilize the services provided by these components.

In the configuration depicted in FIG. 21, server 2114 may include one or more components 2120, 2122 and 2124 that implement the functions performed by server 2114. These components may include software components that may be executed by one or more processors, hardware components, or combinations thereof. It should be appreciated that various different system configurations are possible, which may be different from distributed system 2100. The embodiment shown in FIG. 21 is thus one example of a distributed system for implementing an embodiment system and is not intended to be limiting.

Users may use client computing devices 2102, 2104, 2106, 2108, and/or 2110 for techniques for agent management in a cloud environment, and/or for monitoring instance heartbeat and taking actions, if needed, in accordance with the teachings of this disclosure. A client device may provide an interface that enables a user of the client device to interact with the client device. The client device may also output information to the user via this interface. Although FIG. 21 depicts only five client computing devices, any number of client computing devices may be supported.

The client devices may include various types of computing systems such as smart phones or other portable handheld devices, general purpose computers such as personal computers and laptops, workstation computers, smart watches, smart glasses, or other wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, Apple Watch®, Meta Quest®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 2112 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 2112 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth™, and/or any other wireless protocol), and/or any combination of these and/or other networks.

Server 2114 may be composed of one or more general purpose computers, specialized server computers (including, by way of example, PC (personal computer) servers, UNIXR servers, mid-range servers, mainframe computers, rack-mounted servers, etc.), server farms, server clusters, a Real Application Cluster (RAC), database servers, or any other appropriate arrangement and/or combination. Server 2114 can include one or more virtual machines running virtual operating systems, or other computing architectures involving virtualization such as one or more flexible pools of logical storage devices that can be virtualized to maintain virtual storage devices for the server. In various aspects, server 2114 may be adapted to run one or more services or software applications that provide the functionality described in the foregoing disclosure.

The computing systems in server 2114 may run one or more operating systems including any of those discussed above, as well as any commercially available server operating system. Server 2114 may also run any of a variety of additional server applications and/or mid-tier applications, including HTTP (hypertext transport protocol) servers, FTP (file transfer protocol) servers, CGI (common gateway interface) servers, JAVAR servers, database servers, and the like. Exemplary database servers include without limitation those commercially available from Oracle®, Microsoft®, SAP®, Amazon®, Sybase®, IBM® (International Business Machines), and the like.

In some implementations, server 2114 may include one or more applications to analyze and consolidate data feeds and/or event updates received from users of client computing devices 2102, 2104, 2106, 2108, and/or 2110. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2114 may also include one or more applications to display the data feeds and/or real-time events via one or more display devices of client computing devices 2102, 2104, 2106, 2108, and/or 2110.

Distributed system 2100 may also include one or more data repositories 2116, 2118. These data repositories may be used to store data and other information in certain aspects. For example, one or more of the data repositories 2116, 2118 may be used to store information for techniques for agent management in a cloud environment, and/or for monitoring instance heartbeat and taking actions, if needed. Data repositories 2116, 2118 may reside in a variety of locations. For example, a data repository used by server 2114 may be local to server 2114 or may be remote from server 2114 and in communication with server 2114 via a network-based or dedicated connection. Data repositories 2116, 2118 may be of different types. In certain aspects, a data repository used by server 2114 may be a database, for example, a relational database, a container database, an Exadata storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 2116, 2118 may also be used by applications to store application data. The data repositories used by applications may be of different types such as, for example, a key-value store repository, an object store repository, or a general storage repository supported by a file system.

In one embodiment, server 2114 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 22:
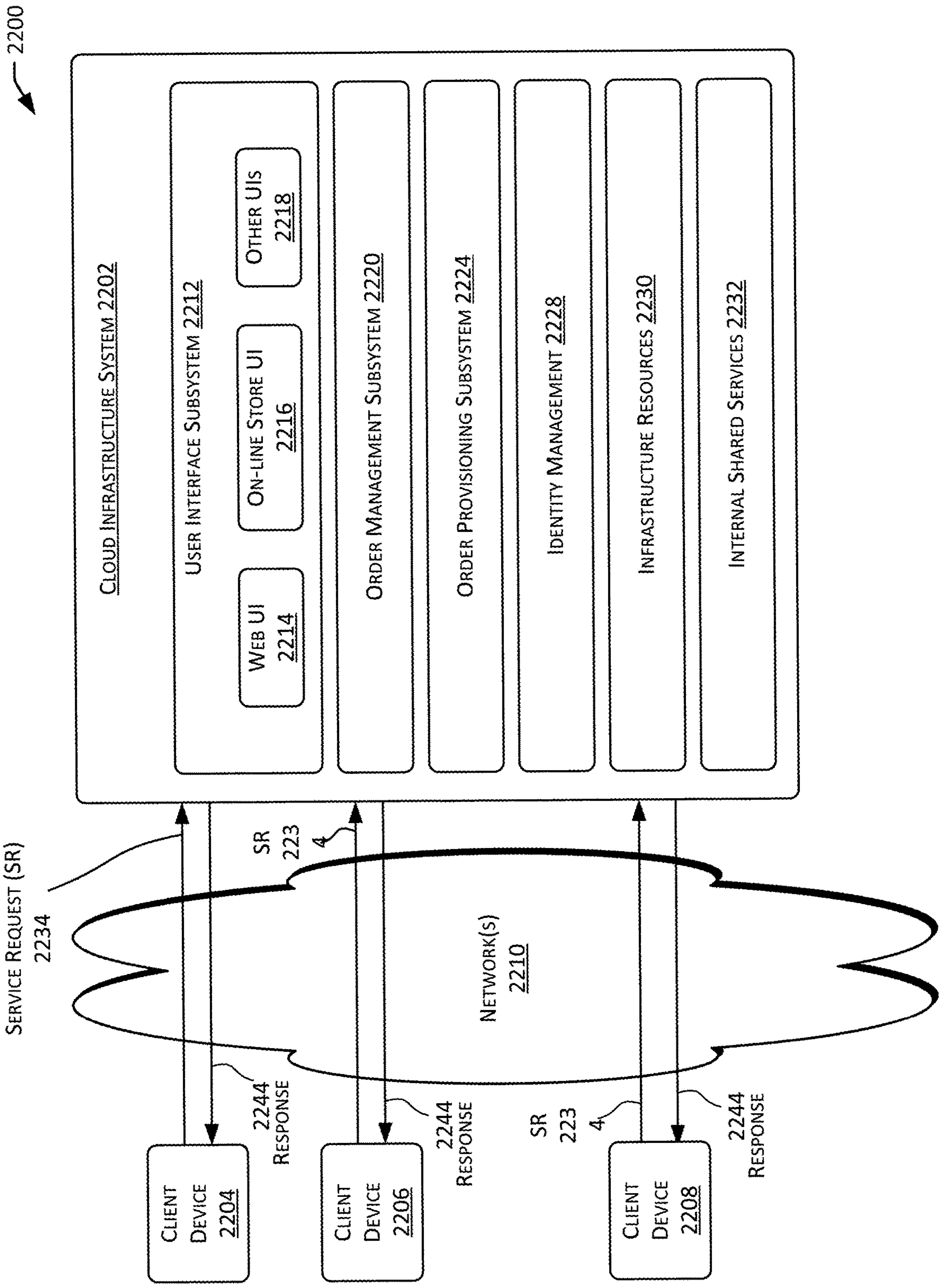
FIG. 22 is a simplified block diagram of one or more components of a system environment by which services provided by one or more components of an embodiment system may be offered as cloud services, in accordance with certain aspects.

FIG. 22 is a simplified block diagram of a cloud-based system environment in which various agent and instance monitoring services may be offered as cloud services, in accordance with certain aspects. In the embodiment depicted in FIG. 22, cloud infrastructure system 2202 may provide one or more cloud services that may be requested by users using one or more client computing devices 2204, 2206, and 2208. Cloud infrastructure system 2202 may comprise one or more computers and/or servers that may include those described above for server 2112. The computers in cloud infrastructure system 2202 may be organized as general purpose computers, specialized server computers, server farms, server clusters, or any other appropriate arrangement and/or combination.

Network(s) 2210 may facilitate communication and exchange of data between clients 2204, 2206, and 2208 and cloud infrastructure system 2202. Network(s) 2210 may include one or more networks. The networks may be of the same or different types. Network(s) 2210 may support one or more communication protocols, including wired and/or wireless protocols, for facilitating the communications.

The embodiment depicted in FIG. 22 is only one example of a cloud infrastructure system and is not intended to be limiting. It should be appreciated that, in some other aspects, cloud infrastructure system 2202 may have more or fewer components than those depicted in FIG. 22, may combine two or more components, or may have a different configuration or arrangement of components. For example, although FIG. 22 depicts three client computing devices, any number of client computing devices may be supported in alternative aspects.

The term cloud service is generally used to refer to a service that is made available to users on demand and via a communication network such as the Internet by systems (e.g., cloud infrastructure system 2202) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 2210 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as database services, middleware services, application services, and others.

In certain aspects, cloud infrastructure system 2202 may provide one or more cloud services using different models such as under a Software as a Service (SaaS) model, a Platform as a Service (PaaS) model, an Infrastructure as a Service (IaaS) model, and others, including hybrid service models. Cloud infrastructure system 2202 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 2202. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

Cloud services are generally provided on an on-demand self-service basis, subscription-based, elastically scalable, reliable, highly available, and secure manner. For example, a tenant, via a subscription order, may order one or more services provided by cloud infrastructure system 2202. Cloud infrastructure system 2202 then performs processing to provide the services requested in the tenant's subscription order. Cloud infrastructure system 2202 may be configured to provide one or even multiple cloud services.

Cloud infrastructure system 2202 may provide the cloud services via different deployment models. In a public cloud model, cloud infrastructure system 2202 may be owned by a third party cloud services provider and the cloud services are offered to any general public tenant, where the tenant can be an individual or an enterprise. In certain other aspects, under a private cloud model, cloud infrastructure system 2202 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 2202 and the services provided may be shared by several organizations in a related community. Various other models such as hybrids of the above mentioned models may also be used.

Client computing devices 2204, 2206, and 2208 may be of different types (such as devices 2102, 2104, 2106, and 2108 depicted in FIG. 21) and may be capable of operating one or more client applications. A user may use a client device to interact with cloud infrastructure system 2202, such as to request a service provided by cloud infrastructure system 2202.

In some aspects, the processing performed by cloud infrastructure system 2202 for providing Chabot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 2202 for determining the intent of an utterance. The data used for this analysis may include structured data (e.g., data stored in a database or structured according to a structured model) and/or unstructured data (e.g., data blobs (binary large objects)).

As depicted in the embodiment in FIG. 22, cloud infrastructure system 2202 may include infrastructure resources 2230 that are utilized for facilitating the provision of various cloud services offered by cloud infrastructure system 2202. Infrastructure resources 2230 may include, for example, processing resources, storage or memory resources, networking resources, and the like.

In certain aspects, to facilitate efficient provisioning of these resources for supporting the various cloud services provided by cloud infrastructure system 2202 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 2202 may itself internally use services 2232 that are shared by different components of cloud infrastructure system 2202 and which facilitate the provisioning of services by cloud infrastructure system 2202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 2202 may comprise multiple subsystems. These subsystems may be implemented in software, or hardware, or combinations thereof. As depicted in FIG. 22, the subsystems may include a user interface subsystem 2212 that enables users of cloud infrastructure system 2202 to interact with cloud infrastructure system 2202. User interface subsystem 2212 may include various different interfaces such as a web interface 2214, an online store interface 2216 where cloud services provided by cloud infrastructure system 2202 are advertised and are purchasable by a consumer, and other interfaces 2218. For example, a tenant may, using a client device, request (service request 2234) one or more services provided by cloud infrastructure system 2202 using one or more of interfaces 2214, 2216, and 2218. For example, a tenant may access the online store, browse cloud services offered by cloud infrastructure system 2202, and place a subscription order for one or more services offered by cloud infrastructure system 2202 that the tenant wishes to subscribe to. The service request may include information identifying the tenant and one or more services that the tenant desires to subscribe to. For example, a tenant may place a subscription order for a Chabot related service offered by cloud infrastructure system 2202. As part of the order, the tenant may provide information identifying for input (e.g., utterances).

In certain aspects, such as the embodiment depicted in FIG. 22, cloud infrastructure system 2202 may comprise an order management subsystem (OMS) 2220 that is configured to process the new order. As part of this processing, OMS 2220 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 2220 may then invoke the order provisioning subsystem (OPS) 2224 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 2224 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 2202 may send a response or notification 2244 to the requesting tenant to indicate when the requested service is now ready for use. In some compute instances, information (e.g., a link) may be sent to the tenant that enables the tenant to start using and availing the benefits of the requested services.

Cloud infrastructure system 2202 may provide services to multiple tenants. For each tenant, cloud infrastructure system 2202 is responsible for managing information related to one or more subscription orders received from the tenant, maintaining tenant data related to the orders, and providing the requested services to the tenant or clients of the tenant. Cloud infrastructure system 2202 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 2202 may provide services to multiple tenants in parallel. Cloud infrastructure system 2202 may store information for these tenants, including possibly proprietary information. In certain aspects, cloud infrastructure system 2202 comprises an identity management subsystem (IMS) 2228 that is configured to manage tenant's information and provide the separation of the managed information such that information related to one tenant is not accessible by another tenant. IMS 2228 may be configured to provide various security-related services such as identity services, such as information access management, authentication and authorization services, services for managing tenant identities and roles and related capabilities, and the like.

Figure 23:
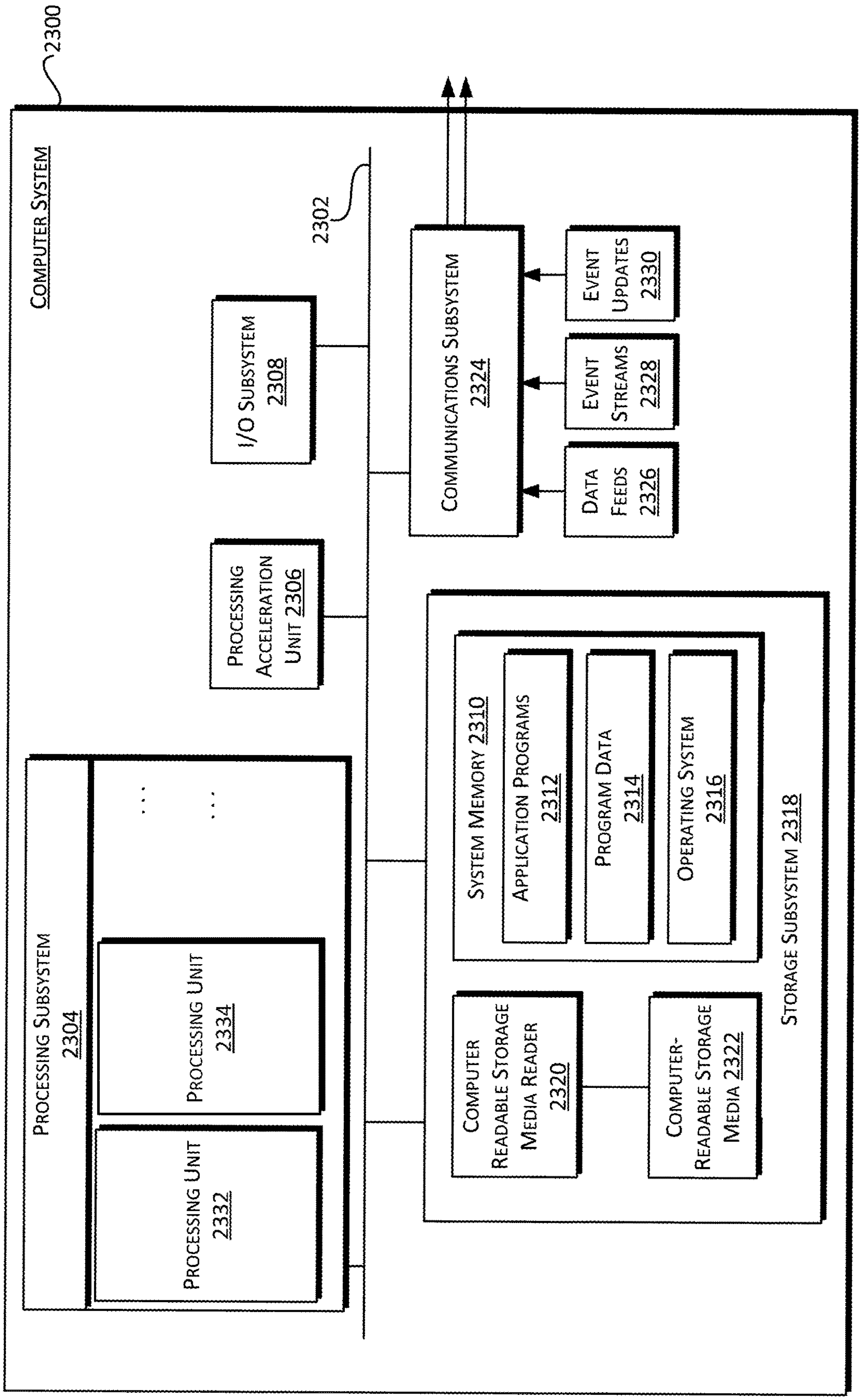
FIG. 23 illustrates an example computer system that may be used to implement certain aspects.

FIG. 23 illustrates an exemplary computer system 2300 that may be used to implement certain aspects. For example, in some aspects, computer system 2300 may be used to implement any of the systems 100 or 100 for monitoring agents and/or instance heartbeats as shown in FIGS. 1A-20 and various servers and computer systems described above. As shown in FIG. 23, computer system 2300 includes various subsystems including a processing subsystem 2304 that communicates with a number of other subsystems via a bus subsystem 2302. These other subsystems may include a processing acceleration unit 2306, an I/O subsystem 2308, a storage subsystem 2318, and a communications subsystem 2324. Storage subsystem 2318 may include non-transitory computer-readable storage media including storage media 2322 and a system memory 2310.

Bus subsystem 2302 provides a mechanism for letting the various components and subsystems of computer system 2300 communicate with each other as intended. Although bus subsystem 2302 is shown schematically as a single bus, alternative aspects of the bus subsystem may utilize multiple buses. Bus subsystem 2302 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2304 controls the operation of computer system 2300 and may comprise one or more processors, application specific integrated circuits (ASICs), or field programmable gate arrays (FPGAs). The processors may include be single core or multicore processors. The processing resources of computer system 2300 can be organized into one or more processing units 2332, 2334, etc. A processing unit may include one or more processors, one or more cores from the same or different processors, a combination of cores and processors, or other combinations of cores and processors. In some aspects, processing subsystem 2304 can include one or more special purpose co-processors such as graphics processors, digital signal processors (DSPs), or the like. In some aspects, some or all of the processing units of processing subsystem 2304 can be implemented using customized circuits, such as application specific integrated circuits (ASICs), or field programmable gate arrays (FPGAs).

In some aspects, the processing units in processing subsystem 2304 can execute instructions stored in system memory 2310 or on computer readable storage media 2322. In various aspects, the processing units can execute a variety of programs or code instructions and can maintain multiple concurrently executing programs or processes. At any given time, some or all of the program code to be executed can be resident in system memory 2310 and/or on computer-readable storage media 2322 including potentially on one or more storage devices. Through suitable programming, processing subsystem 2304 can provide various functionalities described above. In compute instances where computer system 2300 is executing one or more virtual machines, one or more processing units may be allocated to each virtual machine.

In certain aspects, a processing acceleration unit 2306 may optionally be provided for performing customized processing or for off-loading some of the processing performed by processing subsystem 2304 so as to accelerate the overall processing performed by computer system 2300.

I/O subsystem 2308 may include devices and mechanisms for inputting information to computer system 2300 and/or for outputting information from or via computer system 2300. In general, use of the term input device is intended to include all possible types of devices and mechanisms for inputting information to computer system 2300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 2300 to a user or other computer. User interface output devices may include a display subsystem, indicator lights, or non-visual displays such as audio output devices, etc. The display subsystem may be a cathode ray tube (CRT), a flat-panel device, such as that using a light emitting diode (LED) display, a liquid crystal display (LCD) or plasma display, a projection device, a touch screen, a computer monitor and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 2318 provides a repository or data store for storing information and data that is used by computer system 2300. Storage subsystem 2318 provides a tangible non-transitory computer-readable storage medium for storing the basic programming and data constructs that provide the functionality of some aspects. Storage subsystem 2318 may store software (e.g., programs, code modules, instructions) that when executed by processing subsystem 2304 provides the functionality described above. The software may be executed by one or more processing units of processing subsystem 2304. Storage subsystem 2318 may also provide a repository for storing data used in accordance with the teachings of this disclosure.

Storage subsystem 2318 may include one or more non-transitory memory devices, including volatile and non-volatile memory devices. As shown in FIG. 23, storage subsystem 2318 includes a system memory 2310 and a computer-readable storage media 2322. System memory 2310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2300, such as during start-up, may typically be stored in the ROM. The RAM typically contains data and/or program modules that are presently being operated and executed by processing subsystem 2304. In some implementations, system memory 2310 may include multiple different types of memory, such as static random access memory (SRAM), dynamic random access memory (DRAM), and the like.

By way of example, and not limitation, as depicted in FIG. 23, system memory 2310 may load application programs 2312 that are being executed, which may include various applications such as Web browsers, mid-tier applications, relational database management systems (RDBMS), etc., program data 2314, and an operating system 2316. By way of example, operating system 2316 may include various versions of Microsoft Windows®, Apple Macintosh*, and/or Linux operating systems, a variety of commercially-available UNIX® or UNIX-like operating systems (including without limitation the variety of GNU/Linux operating systems, the Google Chrome OS, and the like) and/or mobile operating systems such as iOS, Windows Phone, Android® OS, BlackBerry® OS, Palm OS operating systems, and others.

Computer-readable storage media 2322 may store programming and data constructs that provide the functionality of some aspects. Computer-readable media 2322 may provide storage of computer-readable instructions, data structures, program modules, and other data for computer system 2300. Software (programs, code modules, instructions) that, when executed by processing subsystem 2304 provides the functionality described above, may be stored in storage subsystem 2318. By way of example, computer-readable storage media 2322 may include non-volatile memory such as a hard disk drive, a magnetic disk drive, an optical disk drive such as a CD ROM, digital video disc (DVD), a Blu-Ray® disk, or other optical media. Computer-readable storage media 2322 may include, but is not limited to, Zip® drives, flash memory cards, universal serial bus (USB) flash drives, secure digital (SD) cards, DVD disks, digital video tape, and the like. Computer-readable storage media 2322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM)

SSDs, and hybrid SSDs that use a combination of DRAM and flash memory based SSDs.

In certain aspects, storage subsystem 2318 may also include a computer-readable storage media reader 2320 that can further be connected to computer-readable storage media 2322. Reader 2320 may receive and be configured to read data from a memory device such as a disk, a flash drive, etc.

In certain aspects, computer system 2300 may support virtualization technologies, including but not limited to virtualization of processing and memory resources. For example, computer system 2300 may provide support for executing one or more virtual machines. In certain aspects, computer system 2300 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 2300. Accordingly, multiple operating systems may potentially be run concurrently by computer system 2300.

Communications subsystem 2324 provides an interface to other computer systems and networks. Communications subsystem 2324 serves as an interface for receiving data from and transmitting data to other systems from computer system 2300. For example, communications subsystem 2324 may enable computer system 2300 to establish a communication channel to one or more client devices via the Internet for receiving and sending information from and to the client devices. For example, the communication subsystem may be used to transmit a response to a user regarding the inquiry for a Chabot.

Communication subsystem 2324 may support both wired and/or wireless communication protocols. For example, in certain aspects, communications subsystem 2324 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 2324 can provide wired network connectivity (e.g., Ethernet) in addition to or instead of a wireless interface.

Communication subsystem 2324 can receive and transmit data in various forms. For example, in some aspects, in addition to other forms, communications subsystem 2324 may receive input communications in the form of structured and/or unstructured data feeds 2326, event streams 2328, event updates 2330, and the like. For example, communications subsystem 2324 may be configured to receive (or send) data feeds 2326 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 2324 may be configured to receive data in the form of continuous data streams, which may include event streams 2328 of real-time events and/or event updates 2330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2324 may also be configured to communicate data from computer system 2300 to other computer systems or networks. The data may be communicated in various different forms such as structured and/or unstructured data feeds 2326, event streams 2328, event updates 2330, and the like to one or more databases that may be in communication with one or more streaming data source computers coupled to computer system 2300.

Computer system 2300 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 2300 depicted in FIG. 23 is intended only as a specific example. Many other configurations having more or fewer components than the system depicted in FIG. 23 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A method for monitoring of a plurality of agents operating within a plurality of compute instances of a tenancy of a cloud environment, the method comprising:

receiving a plurality of messages from each of the plurality of agents operating within the plurality of compute instances of the cloud environment, wherein each compute instance is a virtual machine within the tenancy of the cloud environment;

updating a table that identifies the plurality of agents and the corresponding plurality of compute instances, wherein the updating is done when any of a plurality of messages is received from any of the plurality of agents;

reading a list of compute instances, wherein each compute instance on the list of compute instances is enabled to have an agent installed therewithin;

comparing the plurality of compute instances within the table against the list of compute instances, to determine whether each compute instance within the list of compute instances is also included in the plurality of compute instances of the table;

identifying a compute instance within the list of compute instances that is missing from the plurality of compute instances identified in the table, such that (i) the identified compute instance is enabled to have an agent installed therewithin and (ii) no messages from an agent operating within the identified compute instance have been received;

transmitting a request that causes reinstallation or installation of the agent within the compute instance; and subsequent to reinstallation or installation of the agent within the compute instance, receiving one or more messages from the agent.

2. The method of claim 1, further comprising:

generating a report indicating that the compute instance is enabled to have the agent installed, without the agent being installed within the compute instance or without the agent being operational as intended.

3. The method of claim 1, wherein each of the plurality of agents is configured to perform queries respectively on each of the compute instances, and to send query results to a data plane for determining whether the query results are associated with anomalous characteristics.

4. The method of claim 1, wherein:

the compute instance is a first compute instance, and the agent is a first agent;

the plurality of messages includes a message received from a second agent operating within a second compute instance; and the message includes security related information associated with the second compute instance, which is generated based on the second agent monitoring an operation of the second compute instance.

5. The method of claim 1, wherein the plurality of compute instances are managed by a cloud customer, and transmitting the request that causes reinstallation or installation of the agent is performed by a security assurance administrator.

6. The method of claim 5, wherein the security assurance administrator is a provider of the cloud environment.

7. The method of claim 1, wherein the list is a first list, and wherein the method further comprises:

reading a second list that identifies a plurality of cloud resources of the cloud environment;

filtering the plurality of cloud resources identified in the second list, to identify a subset of the plurality of cloud resources that are enabled to have the agent installed; and updating the first list of compute instances with the identified subset of the plurality of cloud resources.

8. The method of claim 1, further comprising:

receiving an identification of a compartment of the tenancy, wherein the compartment includes one or more of compute instances;

determining that the compartment is enabled for agent installation; and updating the list of compute instances to include the one or more compute instances of the compartment.

9. The method of claim 1, wherein:

the compute instance is a first compute instance;

a message of the plurality of messages is received from a second agent operating within a second compute instance; and the message of the plurality of messages includes one or more of (i) a type of the second agent, (ii) an identifier of the second agent, (iii) a version of the second agent, and (iv) an identifier of the second compute instance within which the second agent is operating.

10. The method of claim 1, further comprising:

maintaining a timestamp for each message of the plurality of received messages.

11. The method of claim 1, wherein the compute instance is a first compute instance, wherein the agent is a first agent, and wherein the method further comprises:

reading a timestamp of a most recent message received from a second agent operating within a second compute instance of the plurality of compute instances;

determining a time difference between (i) a current time and (ii) a time indicated by the timestamp; and in response to the time difference exceeding a threshold duration of time, generating a report indicating that no message has been received from the second agent operating within the second compute instance for at least the threshold duration of time.

12. The method of claim 11, further comprising:

transmitting a request to reinstall or update the second agent within the second compute instance.

13. The method of claim 11, wherein the timestamp is a first timestamp, the time difference is a first time difference, the threshold duration of time is a first threshold duration of time, and wherein the method further comprises:

reading a second timestamp of a most recent message received from a third agent operating within the second compute instance of the plurality of compute instances;

determining a second time difference between (i) the current time and (ii) a time indicated by the second timestamp; and in response to the second time difference exceeding a second threshold duration of time, generating a report indicating that no message has been received from the third agent operating within the second compute instance for at least the second threshold duration of time, wherein the first threshold duration of time is different from the second threshold duration of time.

14. The method of claim 11, wherein:

the second agent is configured to transmit a stream of messages, such that two consecutive messages from the second agent are configured to have a first time gap;

the third agent is configured to transmit another stream of messages, such that two consecutive messages from the third agent are configured to have a second time gap;

the first time gap is less than the second time gap; and the first threshold duration of time is less than the second threshold duration of time, responsive at least in part to the first time gap being less than the second time gap.

15. The method of claim 1, wherein the compute instance is a first compute instance, and wherein the method further comprises:

reading a message of the plurality of messages that is from a second agent operating within a second compute instance;

determining an installed version number of the second agent within a second compute instance, based at least in part on reading the message;

comparing the installed version number of the second agent with one or more acceptable version numbers for the second agent;

determining that the installed version number of the second agent is not within the one or more of acceptable version numbers for the second agent;

generating a report indicating that the second agent operating within the second compute instance has to be updated; and transmitting a request to update the second agent operating within the second compute instance to one of the one or more of acceptable version numbers for the second agent.

16. The method of claim 15, wherein comparing the installed version number of the second agent with the one or more of acceptable version numbers for the second agent comprises:

reading an agent inventory information that identifies at least one acceptable version number of the second agent for each of a plurality of platform types;

determining that the second compute instance has a first platform type, based at least in part on reading the message, wherein the agent inventory information identifies the one or more acceptable version numbers for the first platform type of the second agent;

identifying the one or more acceptable version numbers of the first platform type for the second agent from the agent inventory information; and using the identified one or more acceptable version numbers of the second first platform type for the second agent for the comparison.

17. A non-transitory computer-readable medium including instructions that when executed by one or more processors, cause the one or more processors to perform operations including:

receiving a plurality of messages from each of a plurality of agents operating within a plurality of compute instances of a cloud environment, wherein each compute instance is a virtual machine within the tenancy of the cloud environment;

updating a table that identifies the plurality of agents and the corresponding plurality of compute instances, wherein the updating is done when any of a plurality of messages is received from any of the plurality of agents;

reading a list of compute instances, wherein each compute instance on the list of compute instances is enabled to have an agent installed therewithin;

comparing the plurality of compute instances within the table against the list of compute instances, to determine whether each compute instance within the list of compute instances is also included in the plurality of compute instances of the table;

identifying a compute instance within the list of compute instances that is missing from the plurality of compute instances identified in the table, such that (i) the identified compute instance is enabled to have an agent installed therewithin and (ii) no messages from an agent operating within the identified compute instance have been received;

transmitting a request that causes reinstallation or installation of the agent within the compute instance; and subsequent to reinstallation or installation of the agent within the compute instance, receiving one or more messages from the agent.

18. The non-transitory computer-readable medium of claim 17, wherein each of the plurality of agents is configured to perform queries respectively on each of the compute instances, and to send query results to a data plane for determining whether the query results are associated with anomalous characteristics.

19. A system for monitoring of a plurality of agents operating within a plurality of compute instances of a tenancy of a cloud environment, the system comprising:

one or more processors;

a storage repository for storing a list of compute instances; and one or more non-transitory computer-readable media storing instructions, which, when executed by the system, cause the system to perform a set of actions including:

receiving a plurality of messages from each of the plurality of agents operating within the plurality of compute instances of the cloud environment, wherein each compute instance is a virtual machine within the tenancy of the cloud environment;

updating a table that identifies the plurality of agents and the corresponding plurality of compute instances, wherein the updating is done when any of a plurality of messages is received from any of the plurality of agents;

reading the list of compute instances from the storage repository, wherein each compute instance on the list of compute instances is enabled to have an agent installed therewithin;

comparing the plurality of compute instances within the table against the list of compute instances, to determine whether each compute instance within the list of compute instances is also included in the plurality of compute instances of the table;

identifying a compute instance within the list of compute instances that is missing from the plurality of compute instances identified in the table, such that (i) the identified compute instance is enabled to have an agent installed therewithin and (ii) no messages from an agent operating within the identified compute instance have been received;

transmitting a request that causes reinstallation or installation of the agent within the compute instance; and subsequent to reinstallation or installation of the agent within the compute instance, receiving one or more messages from the agent.

20. The system of claim 19, wherein the set of actions further includes:

receiving an identification of a compartment of the tenancy, wherein the compartment includes one or more of compute instances;

determining that the compartment is enabled for agent installation; and updating the list of compute instances to include the one or more compute instances of the compartment.

* * * * *